United States Patent
Maeda et al.

(10) Patent No.: US 7,209,930 B2
(45) Date of Patent: Apr. 24, 2007

(54) INFORMATION PROVIDING SYSTEM AND A METHOD FOR PROVIDING INFORMATION

(75) Inventors: Kazuharu Maeda, Tokyo (JP); Susumu Takahashi, Tokyo (JP); Toshio Abe, Tokyo (JP)

(73) Assignee: Komatsu Ltd., Tokyo (JP)

( * ) Notice: Subject to any disclaimer, the term of this patent is extended or adjusted under 35 U.S.C. 154(b) by 750 days.

(21) Appl. No.: 09/842,683

(22) Filed: Apr. 27, 2001

(65) Prior Publication Data

US 2001/0056488 A1    Dec. 27, 2001

(30) Foreign Application Priority Data

| May 1, 2000 | (JP) | 2000-132386 |
| May 16, 2000 | (JP) | 2000-143486 |
| Jul. 3, 2000 | (JP) | 2000-200849 |
| Jul. 11, 2000 | (JP) | 2000-209874 |

(51) Int. Cl.
G06F 17/00 (2006.01)
G06F 7/00 (2006.01)

(52) U.S. Cl. .......... 707/104.1; 707/2; 707/10; 705/26; 705/27; 705/29

(58) Field of Classification Search .......... 707/1–5, 707/10; 705/26–27
See application file for complete search history.

(56) References Cited

U.S. PATENT DOCUMENTS

| 4,591,983 | A | * | 5/1986 | Bennett et al. ............... 706/53 |
| 4,714,992 | A | * | 12/1987 | Gladney et al. ............. 707/206 |
| 5,216,612 | A | * | 6/1993 | Cornett et al. .............. 700/96 |
| 5,317,503 | A | * | 5/1994 | Inoue .......................... 700/90 |
| 5,839,112 | A | * | 11/1998 | Schreitmueller et al. ....... 705/4 |
| 5,877,961 | A | * | 3/1999 | Moore ......................... 700/180 |
| 6,185,540 | B1 | * | 2/2001 | Schreitmueller et al. ....... 705/4 |
| 6,304,913 | B1 | * | 10/2001 | Rune .......................... 709/241 |
| 6,557,002 | B1 | * | 4/2003 | Yoshimatsu et al. ......... 707/102 |

(Continued)

FOREIGN PATENT DOCUMENTS

JP    404205061 A   *   7/1992

OTHER PUBLICATIONS

Specification of U.S. Appl. No. 60/198,562, filed Apr. 20, 2000.*

(Continued)

*Primary Examiner*—Luke S Wassum
(74) *Attorney, Agent, or Firm*—Westerman, Hattori, Daniels & Adrian, LLP.

(57) ABSTRACT

A system and method are provided which are necessary for exchanging information among a sales agent a1, user a2 and manufacturer A, for preparing a parts check list on an on-line basis, and for storing information to be provided.

If, for example, the sales agent a1 or user a2 wants to acquire information from the manufacturer A, manufacturer A will directly confer a password to sales agent a1 with whom manufacturer A directly deals with, while sales agent a1 will directly confer a password to user a2 with whom sales agent a1 directly deals with, on behalf of manufacturer A. This arrangement makes it possible to easily and securely provide, to a specified information seeker, information required by that information seeker.

7 Claims, 64 Drawing Sheets

U.S. PATENT DOCUMENTS

| | | | |
|---|---|---|---|
| 6,606,603 B1* | 8/2003 | Joseph et al. | 705/26 |
| 6,950,829 B2* | 9/2005 | Schlabach et al. | 707/104.1 |
| 2001/0029473 A1* | 10/2001 | Yamaoka et al. | 705/27 |
| 2001/0037341 A1* | 11/2001 | Kimoto et al. | 707/104.1 |
| 2001/0042030 A1* | 11/2001 | Ito et al. | 705/27 |
| 2002/0007225 A1* | 1/2002 | Costello et al. | 700/99 |
| 2002/0026383 A1* | 2/2002 | Goto et al. | 705/26 |
| 2002/0026385 A1* | 2/2002 | McCloskey et al. | 705/27 |
| 2002/0026537 A1* | 2/2002 | Schlabach et al. | 710/1 |
| 2002/0038262 A1* | 3/2002 | Fukuda et al. | 705/27 |
| 2002/0156692 A1* | 10/2002 | Squeglia et al. | 705/26 |
| 2003/0046174 A1* | 3/2003 | Goldsmith et al. | 705/26 |
| 2004/0019534 A1* | 1/2004 | Callahan et al. | 705/27 |
| 2004/0138967 A1* | 7/2004 | Ikeda et al. | 705/28 |
| 2004/0243483 A1* | 12/2004 | Baumann et al. | 705/27 |
| 2004/0254864 A1* | 12/2004 | Mitsuoka et al. | 705/29 |
| 2005/0187838 A1* | 8/2005 | Squeglia et al. | 705/29 |

OTHER PUBLICATIONS

Sears "PartsDirect website", downloaded from www.searcpartsdirect.com, May 8, 1999.*

* cited by examiner

| | A1-1 | A1-2 | A1-3 | A1-4 ... | |
|---|---|---|---|---|---|
| PRODUCT INFORMATION | CLAY | BULLDOZER | WHEEL LOADER | POWER SHOVEL | ... |
| PART INFORMATION | PART TITLE<br>A2-1 | PART NUMBER | UNIT PRICE<br>A2-2 | IMAGE DATA<br>A2-3 | ... A2-4 ...<br>... |
| DOCUMENT INFORMATION | HANDLING MANUAL | STANDARD MAINTENANCE MANUAL | SERVICE ADMINISTRATION MANUAL | GRIEVANCE REPORT | ... |
| | A3-1 | A3-2 | A3-3 | A3-4 ... | |

```
ID · PASSWORD CONFIRMATION AND
MEMORY AREA SETTING SCREEN (MAKER A)
```

| OBJECT INFORMATION | |
|---|---|
| USER ID | a1 KANAGAWA HANBAI LTD. |
| ADDRESS | KANAGAWA-KEN ··· |
| PHONE | 045 ··· |
| PASSWORD | 123 ··· |

CONFIRM

NOT CONFIRM

MEMORY AREA | A1-1,A1-2 ···

| DRAWING TITLE | DRAWING DATA FILE |
|---|---|
| TRUCK SHOE (F LAT TYPE) | ——— .BMP |
| TRUCK SHOE (TRIPLE GLOSSER WITH HOLE FLOATING TYPE)(#31152-) | ——— .BMP |
| TRUCK FRAME (#30001-32999) | ——— .BMP |
| TRUCK FRAME (#33001-) | ——— .BMP |
| TRUCK FRAME (FOR UNDER COVER)(#33001-) | ——— .BMP |
| HYDRAULIC TANK | ——— .BMP |
| FULL ROLLER GUARD | ——— .BMP |
| CENTER GUARD | ——— .BMP |

FILE EDIT BOOK ZOOM VIEW SEARCH ANNOTATE PREFERENCE HELP

| IDX | |
|---|---|
| 60 | TRUCK SHOE (FLAT TYPE) |
| 70 | TRUCK SHOE (TRIPLE GLOSSER WITH HOLE FLOATING TYPE)(#31152-) |
| 80 | TRUCK FRAME (#30001-32999) |
| 90 | TRUCK FRAME (#33001-) |
| 100 | TRUCK FRAME (FOR UNDER COVER)(#33001-) |
| 110 | HYDRAULIC TANK |
| 130 | FULL ROLLER GUARD |
| 140 | CENTER GUARD |

DRAWING TITLE

Reference

FIG. 19

NET (INFORMATION) — 220A, 241

FILE REPLY MAIL SEND EXIT

- ISSUE NO. / COMPANY NAME
- MODEL / USER NAME
- RECEIPT DATE / SERIAL NO.
- FORM NO. / SERVICE METER / PART NO.
- TITLE / PAGE NO.
- ATTACHED FILE
- WRITER / DATE/TIME 27 Mar 2000 16:56:38 +09 00
- DETAIL

ILLUSTRATION 1

ILLUSTRATION 2

FIG. 30

NET (INFORMATION) — 248

| Field | Value |
|---|---|
| ISSUE NO. | HB2000-03-27 |
| ISSUE DATE | 2000/03/27 |
| COMPANY NAME | ○○○ |
| MODEL | HD1200 |
| SERIAL NO. | 20001 |
| USER NAME | ×× × |
| RECEIPT DATE | SERVICE METER |
| FORM NO. | PAGE NO. |
| PART NO. | |
| TITLE | |
| ATTACHED FILE | |
| WRITER | DATE/TIME 27 Mar 2000 16:56:38+0900 |

ILLUSTRATION 1    ILLUSTRATION 2

DETAIL — 249

Menu: FILE  REPLY  MAILSEND  EXIT

FIG.34

| MODEL TITLE |
|---|
| CLAY |
| BULLDOZER SMALL |
| BULLDOZER LARGE |
| BULLDOZER MIDDLE |
| WHEEL LOADER SMALL |
| WHEEL LOADER LARGE |
| WHEEL LOADER MIDDLE |
| POWER SHOVEL SMALL |
| POWER SHOVEL LARGE |
| POWER SHOVEL MIDDLE |

| | OPERATOR CAB AND PERIPHERALS AND CONTROL SYSTEM | | |
|---|---|---|---|
| | ARMOR | | |
| | SWING CIRCLE AND RELEVANTS | | |
| WHEEL SYSTEM | | | |
| | DRAWING TITLE | | DRAWING DATA FILE |
| | TRUCK SHOE (FLAT TYPE) | | ___ .BMP |
| | TRUCK SHOE (TRIPLE GLOSSER WITH HOLE FLOATING TYPE)(#31152-) | | ___ .BMP |
| | TRUCK FRAME (#30001-32999) | | ___ .BMP |
| | TRUCK FRAME (#33001-) | | ___ .BMP |
| | TRUCK FRAME (FOR UNDER COVER)(#33001-) | | ___ .BMP |
| | HYDRAULIC | | ___ .BMP |
| | FULL ROLLER GUARD | | ___ .BMP |
| | CENTER GUARD | | ___ .BMP |

TRUCK FRAME (#30001-32999)

TRUCK FRAME (#33001-)

TRUCK FRAME (FOR UNDER COVER)(#33001-)

TRUCK ROLLER(#52374-)

| INDEX | PART NO. | PART TITLE |
|---|---|---|
| A | 201-30-00291 | TRUCK ROLLER ASSY |
| 1 | 201-30-00290 | TRUCK ROLLER ASSY |
| 2 | 201-30-72371 | ROLLER |
| 3 | 201-30-72370 | ROLLER |
| 4 | 201-30-72140 | BUSH |
| 5 | 201-30-72120 | SHAFT |
|  | 201-30-72160 | COLLAR |
|  | 201-30-54150 | PIN |
| ... | ... | ... |

PRICE

| PART NO. | PART TITLE | UNIT PRICE |
|---|---|---|
| 201-32-71110 | SHOE, TRUCK, TRIPLE | 4,220 |
| 112-32-11221 | NUT, SHOE (KIT) | 0 |
| 101-32-11271 | SHOOLE, DUST | 160 |
| 201-32-71140 | BUSH, REGULAR | 1,190 |
| 201-32-51130 | RINK, TRUCK, RIGHT | 1,570 |
| ... | ... | ... |

| INDEX | PART NO. | PART TITLE | DRAWING DATA FILE |
|---|---|---|---|
| A | 201-30-00291 | TRUCK ROLLER ASSY | ——.BMP |
| 1 | 201-30-00290 | TRUCK ROLLER ASSY | ——.BMP |
| 2 | 201-30-72371 | ROLLER | ——.BMP |
| 3 | 201-30-72370 | ROLLER | ——.BMP |
| 4 | 201-30-72140 | BUSH | ——.BMP |
| 5 | 201-30-72120 | SHAFT | ——.BMP |
| ... | 201-30-72160 | COLLAR | ——.BMP |
| | 201-30-54150 | PIN | ... |

FILE EDIT BOOK ZOOM VIEW SEARCH ANNOTATE PREFERENCE HELP

MEMO
DETAILED LIST · TRANSFER TO DEALER    PC300-6 S/N 30001-UP

IDX
D0  FUEL TANK AND RELEVANTS
E0  ELECTRICAL SYSTEM
H0  HYDRAULIC SYSTEM
J0  MAIN/REVOLVING FRAME AND RELEVANTS
K0  OPERATOR CAB AND PERIPHERALS
M0  AND CONTROL SYSTEM
N0  ARMOR
P0  SWING CIRCLE AND RELEVANTS

Reference

DEVICE TITLE

FILE EDIT BOOK ZOOM VIEW SEARCH ANNOTATE PREFERENCE HELP

MEMO
DETAILED LIST · TRANSFER TO DEALER

WHEEL SYSTEM

| IDX | | |
|---|---|---|
| 60 | TRUCK SHOE (FLAT TYPE) | 1 |
| 70 | TRUCK SHOE (TRIPLE GLOSSER WITH HOLE FLOATING TYPE)(#31152-) | 1 |
| 80 | TRUCK FRAME (#30001-329999) | 1 |
| 90 | TRUCK FRAME (#33001-) | 1 |
| 100 | TRUCK FRAME (FOR UNDER COVER)(#33001-) | 1 |
| 110 | HYDRAULIC | 1 |
| 130 | FULL ROLLER GUARD | 1 |
| 140 | CENTER GUARD | 1 |

Reference

DRAWING TITLE

FIG.52

| PART NO. | TITLE | QTY. | PRICE | SUM | APPLIED MACHINE | OLD NO. |
|---|---|---|---|---|---|---|
| 201-32-71110 | SHOE, TRUCK, TRIPLE | 76 | | | SN:45001-- | |
| 112-32-11221 | NUT, SHOE (KIT) | 304 | | | SN:45001-- | |
| 101-32-11271 | SHOOLE, DUST | 144 | | | SN:45001-- | |
| 201-32-71140 | BUSH, REGULAR | 72 | | | SN:45001-- | |
| 201-32-51130 | LINK, TRUCK, RIGHT | 76 | | | | |

MACHINE CODE: PC60-7  TOTAL:
MACHINE NO.:  DEALER 1:
DATE:  /  /  DEALER 2:
AUTHOR:  EDITION NO.:
COMMENT:

DETAILED PART LIST

○○ HANBAI LTD.
TOKYO OFFICE   ×△   ○○
TOTAL   :¥
MACHINE CODE: PC60-7                EDITION NO.: A102
REQUEST NO.: 100006                 AUTHOR :
COMMENT: EXCHANGE OF TRUCK・RINK

| NO. | PART NO. | TITLE | QTY | PRICE | SUM | APPLIED MACHINE | MACHINE CODE | DRAWING NO. | INDEX |
|---|---|---|---|---|---|---|---|---|---|
| 1 | 201-32-71110 | SHOE,TRUCK,TRIPLE | 76 | | | SN:45001-(-) | PC60-7 | R0500-01A0 | 1 |
| 2 | 112-32-11221 | NUT,SHOE(KIT) | 304 | | | SN:45001-(-) | PC60-7 | R0500-01A0 | 3 |
| 3 | 101-32-11271 | SHOOLE,DUST | 144 | | | SN:45001-(-) | PC60-7 | R0500-01A0 | 7 |
| 4 | 20 -32-71140 | BUSH,REGULAR | 72 | | | SN:45001-(-) | PC60-7 | R0500-01A0 | 6 |
| 5 | 201-32-51130 | LINK,TRUCK,RIGHT | 76 | | | SN:45001-(-) | PC60-7 | R0500-01A0 | 5 |
| | | TOTAL ¥ | | | | | | | |

| PART NO. | TITLE | QTY | PRICE | SUM | APPLIED MACHINE | OLD NO. |
|---|---|---|---|---|---|---|
| 201-32-71110 | SHOE,TRUCK TRIPLE | 76 | 4,220 | 320,720 | SN:45001— | |
| 112-32-11221 | NUT,SHOE(KIT) | 304 | 0 | 0 | SN:45001— | |
| 101-32-11271 | SHOOLE, DUST | 144 | 160 | 23,040 | SN:45001— | |
| 201-32-71140 | BUSH, REGULAR | 72 | 1,190 | 85,680 | SN:45001— | |
| 201-32-51130 | LINK, TRUCK, RIGHT | 76 | 1,570 | 119,320 | SN:45001— | |

DETAILED PART LIST (APPOINTED PART LIST)
FILE RECEIVE WRITE CANCEL EXIT 340A
360

MACHINE CODE PC60-7
MACHINE NO.
DATE / /
AUTHOR
COMMENT

TOTAL 548,760
SALES AGENT 1
SALES AGENT 2
EDITION NO.

DETAILED PART LIST

○○ CONSTRUCTION LTD.

TOTAL : ¥579,160
MACHINE CODE: PC60-7
REQUEST NO.: 100006A
COMMENT: EXCHANGE OF TRUCK · RINK

EDITION NO.: A102
AUTHOR :

| NO | PART NO. | TITLE | QTY | PRICE | SUM | APPLIED MACHINE | MACHINE CODE | DRAWING NO. | INDEX |
|---|---|---|---|---|---|---|---|---|---|
| 1 | 201-32-71110 | SHOE, TRUCK, TRIPLE | 76 | 4,220 | 320,720 | SN:45001— | PC60-7 | R0500-01A0 | 1 |
| 2 | 112-32-12211 | NUT, SHOE (KIT) | 304 | 100 | 30,400 | SN:45001— | PC60-7 | R0500-01A0 | 3 |
| 3 | 101-32-12711 | SHOOLE DUST | 144 | 160 | 23,040 | SN:45001— | PC60-7 | R0500-01A0 | 7 |
| 4 | 201-32-71140 | BUSH, REGULAR | 72 | 1,190 | 85,680 | SN:45001— | PC60-7 | R0500-01A0 | 6 |
| 5 | 201-32-51130 | LINK, TRUCK, RIGHT | 76 | 1,570 | 119,320 | SN:45001— | PC60-7 | R0500-01A0 | 5 |
| | | | | TOTAL | ¥579,160 | | | | |

360

PAGE : 1/1    EXIT

FIG. 58

| IDX | TYPE | PART NO. | SPAN (mm) | STUD (mm) | LENGTH (mm) | AREA (m²) | MASS (kg) |
|---|---|---|---|---|---|---|---|
| ☐KU6040 | KU6 | SYKU-KU6040 | 2400 | 2245 | 3870 | 9.29 | 950 |
| ☐KU6060 | KU6 | SYKU-KU6060 | 2400 | 2245 | 5700 | 13.68 | 1300 |
| ☐KU6080 | KU6 | SYKU-KU6080 | 2400 | 2245 | 7620 | 18.29 | 1700 |
| ☐KU7040 | KU7 | SYKU-KU7040 | 2400 | 2245 | 3870 | 9.29 | 900 |
| ☑KU7060 | KU7 | SYKU-KU7060 | 2400 | 2245 | 5700 | 13.68 | 1200 |
| ☐KU7080 | KU7 | SYKU-KU7080 | 2400 | 2245 | 7620 | 18.29 | 1500 |
| ☐KU8024 | KU8 | SYKU-KU8024 | 2150 | 2253 | 3624 | 7.79 | 650 |
| ☐KU8028 | KU8 | SYKU-KU8028 | 2150 | 2253 | 4248 | 9.13 | 700 |

Reference: KPF-M01-03        Page: 11696 kltd.sel

| TYPE | PART NO. | QTY. | PRICE | SUM | SPAN | STUD | LENGTH |
|---|---|---|---|---|---|---|---|
| KU7 | SYKU-KU7060 | | | | 2400 | 2245 | 5700 |

| DRAWING TITLE | IMAGE DATA |
|---|---|
| TRUCK SHOE (FLAT TYPE) | x x x x x . BMP |
| TRUCK SHOE (TRIPLE GLOSSER WITH HOLE FLOATING TYPE)(#31152-) | x x x x x . BMP |
| TRUCK FRAME (#30001-32999) | x x x x x . BMP |
| TRUCK FRAME (#33001-) | x x x x x . BMP |
| TRUCK FRAME (FOR UNDER COVER)(#33001-) | x x x x x . BMP |
| TRUCK ROLLER (#52374-) | x x x x x . BMP |
| FULL ROLLER GUARD | x x x x x . BMP |
| CENTER GUARD | x x x x x . BMP |
| ... | ... |

| MARK | IDX | PART NO. | TITLE | QTY. |
|------|-----|----------|-------|------|
| | | | ⋮ | ⋮ |
| A | A | 201-30-00291 | TRUCK ROLLER ASSY | 10 |
| 1 | 1 | 201-30-72371 | ·ROLLER | 1 |
| 2 | 2 | 201-30-72140 | ·BUSH | 2 |
| 3 | 3 | 201-30-72120 | ·SHAFT | 1 |
| ... | ... | ... | ... | ... |

MARK「2」→

FIG. 62

| MARK | LOCATION DATA | | | | |
|---|---|---|---|---|---|
| A | (X_A1, Y_A1) | (X_A2, Y_A2) | (X_A3, Y_A3) | (X_A4, Y_A4) | ... |
| 1 | (X_11, Y_11) | (X_12, Y_12) | (X_13, Y_13) | (X_14, Y_14) | ... |
| 2 | (X_21, Y_21) | (X_22, Y_22) | (X_23, Y_23) ← APPOINTED POSITIONING DATA (X, Y) | (X_24, Y_24) | ... |
| 3 | (X_31, Y_31) | (X_32, Y_32) | (X_33, Y_33) | (X_34, Y_34) | ... |
| ... | | | | | |

423

INFORMATION PROVIDING SYSTEM AND A METHOD FOR PROVIDING INFORMATION

BACKGROUND OF THE INVENTION

1. Field of the Invention

The present invention relates to an information providing system and method for providing information, an electronic mailing system and method for exchanging electronic mails, a parts check list preparing system and method for preparing a parts check list, an information storing system and method for storing information, and a computer program for executing those methods (medium for recording the program).

2. Description of Related Art

A variety of products have been produced, marketed, purchased and consumed. Generally, products are manufactured by manufacturers, marketed by retailers, and transported to users for consumption.

Heavy construction machines such as wheel loaders or bulldozers require replacement of parts for the fixation of disorders or as a result of the periodic inspection, and in response to such a demand, the parts are provided to the users by the same routes through which the products are provided.

The user, for ensuring the stable supply of necessary parts for the maintenance works including inspection, must obtain the information of the parts retained by the manufacturer. Conventionally, the retailer makes a list of parts in the form of paper sheets available for the user's inspection. Thus, if the user wants to get necessary parts, he must mainly resort to a communication means based on paper sheets such as order forms.

Recently, as computers and networks such as Internet spread widely among people, the manufacturers open their web sites to make the information of their products available to general public, thereby advertising those products. Communication based on electronic mails is also widely utilized: the user or the retailer contacts through electronic mails the manufacturer for questioning or consultation, or for ordering parts.

Provision of information from the manufacturer through the web site or through electronic mails, however, has a number of problems as described below For the smooth distribution of information or execution of on-line ordering, it is necessary to convert parts lists which are conventionally printed on paper sheets into electronic data, so that they may be stored and retrieved at any desired time. To achieve this, a number of problems as described below must be overcome.

[Providing Information]

Recently, companies avidly open their home pages (sites identified by URLs (Uniformed Resource Locator)) on Internet using WWW (World Wide Web) system, to distribute therewith the information of the goods they deal. It is also possible for the user to obtain the information of various products using his network terminal. Moreover, the site specialized in providing information introduces users to the home-pages of multiple enterprises (companies) that are dealing with the same products. Thus, the user can easily and quickly obtain the information of his desired products by gaining access to the home-pages of the manufacturers of those products.

However, because the home-page of a company is accessible to anyone that can use a terminal connected to the same network, the information provided by the company through its home-page must be kept at such a level as to barely satisfy the demand of general customers, and, so it is said, does not stay at a level sufficiently high to satisfy the customers more closely connected with the company.

Further, there are cases where a customer of the company has his own customers. Assume, for example, the company represents a manufacturer of a certain product; an agent assigned the sale of the product a direct customer of the company; and an end user or the user of the product a direct customer of the agent.

In this case, if the end user wants to obtain the information of the product from the manufacturer, it is customary for the user to visit the agent for the information. This is because, although it is possible for the user to gain access to the home-page of the manufacture on Internet, the information he might get from the home-page has limitations.

As is well known, there are information providing systems (services) which provide the subscribers with necessary information via a network. In this system, the information provider provides only his licensed members with detailed information. If a manufacturer constructs such a system, and its agents and the end-users connected with the agents are recognized as licensed members, it will be possible for the user or the member to obtain necessary and detailed information via the system.

Even in such an information providing system restricted to licensed members, it often occurs that the manufacturer or the information provider can not readily determine whether or not a given member is sufficiently qualified to be given intimate information of its products, because license may be given to the end-users that are not its direct customers. This is particularly important when license transaction is carried out between the license-giver and the license-receiver via terminals connected to a network, and when the license-giver can not quickly determine whether or not the license applicant is sufficiently qualified for the license.

The end user may gain access to the agent he directly deals with, and obtain the information of the manufacturer kept by that agent. However, to meet the demand of the end-user through such a route, the agent must construct a database with a vast content which will require considerable maintenance works and a great financial cost from the agent.

The object of this invention is to present an information providing system whereby the information provider can easily and securely provide a specific user with the detailed information the user seeks without requiring a great cost, a method for providing information, and a computer program (medium for recording the program) executing the information providing method.

[Electronic Mail]

Recently the electronic mailing system is avidly utilized whereby it is possible for different computer terminals connected via a network to exchange electronic mails. Such electronic mailing systems are used in a wide variety of fields for various purposes.

Let's consider how such an electronic mailing system is utilized by the people involved in the trade of construction machines. If a user finds his wheel loader or bulldozer is out of order because of the failure of certain parts, the retailer who sold the machine to the user confirms the failure, and informs the manufacturer of the failure via an electronic mail. The electronic mail transmitted from the terminal of the retailer is instantly received by the terminal of the manufacturer, which makes it possible for the manufacturer to quickly take a proper action according to the information conveyed by the mail.

However, in many cases, the electronic mail conveys information only in the form of texts, and hence the information it conveys about the failure or the situation causing the failure is not always sufficiently accurate and detailed, which may, in certain cases, cause a retarded response.

To meet this, if the information provider supplements the electronic mail with an image file carrying a drawing of the failed parts or a photo representing the failure, exchange of information based on images as well as on texts will be possible, whenever the information receiver opens this file. Through this means it will be possible for the information receiver to grasp the information more accurately by referring to the image file than would be possible if he was solely dependent on the text file.

However, because preparation of such an image file is generally performed using a dedicated software package different from the mailing software used for preparation of electronic mails, to prepare such an image file, the user must boot up such application software before he starts editing a necessary image, which will complicate the procedures, and require more labor and time than would be possible if he was solely dependent on the mailing software.

Moreover, if the information receiver's terminal did not install the same application software, he could not open the image file even if he receives the file. Thus, this mode of communication is not universally applicable.

Furthermore, such an image file contains a large quantity of data, and requires a considerable time for transmission.

The object of this invention is to provide an electronic mailing system sufficiently widely applicable whereby it is possible to easily process an image pasted to an electronic mail, and to quickly transmit such a mail in a short time, a method for transmitting/receiving electronic mails, and a computer program (medium for recording the program) for executing the method for transmitting/receiving electronic mails.

[Parts Check List]

The user of a wheel loader or a bulldozer, if he needs to replace failed parts causing a disorder or identified during periodic inspection, must purchase new parts from the retailer dealing with such construction machines. Before he buys the necessary parts, he will contact the retailer selling such construction machines to send him an estimation of the cost of the parts. When the retailer receives a request from the user for an estimation of the cost of the parts, she checks the parts stored in her warehouse or in the warehouse of the manufacturer, and the unit prices of those parts, prepares an estimation, and sends it to the user. Later, the user, based on the estimation, sends an order to the retailer.

According to certain circumstances, the user may purchase the parts directly from the manufacturer. In such cases, however, before he buys the parts, the user will usually ask the manufacturer to send him an estimation of the cost of those parts.

The request form sent by the user for estimation of the availability and cost of necessary parts usually consists of a request supplemented with a list of necessary parts, or a list of necessary parts arranged to take a request form. This parts list describes the information of necessary parts including their names, their product numbers, and required numbers.

However, to prepare such a parts list, it is necessary to locate the necessary parts in voluminous documents such as parts catalogues, and to identify their names and product numbers, This work requires much labor and time.

Moreover, the construction machine usually occurs in many different models, and each of the models is composed of a vast number of parts. Therefore, two apparently similar machines may have different model numbers, while two apparently different machines may have similar model numbers. Moreover, as the model number usually occurs as a multiple order number, the scriber may wrongly read the number, or wrongly write the number when she copies the number in the parts list.

Such problems as described above in relation to the purchase of the parts of construction machines are not limited to those construction machines. The same problems may be encountered in the trading of widely different merchandise such as machines and instruments in other fields, automobiles, houses, leisure goods, and goods required for everyday life.

The object of this invention is to provide a parts list preparing system whereby it is possible to quickly and accurately prepare a parts list.

[Storing Information]

Recently, people in such fields as machine designing, building designing and circuit designing prepare designs using a CAD system. The design prepared by the use of such a CAD system occurs as digital data, and is stored as such. Thus, it is not stored as paper sheets, and will not require cost of paper and printing, and space for storage.

However, if a design is prepared with conventional means other than the CAD system, it is necessary to store it in the form of paper sheets Which requires a cost for management. The design may be stored in a micro-film to reduce the space required for its storage, but as it does not occur as digital data, saving the cost required for its management by such means will meet a limitation.

During the preparation of an assemblage drawing of a product, it may sometimes become necessary to prepare, in addition to a drawing, a separate paper sheet on which a list of necessary parts is described. In such a case, the parts list is added to the assemblage drawing, which will cause consumption of paper sheets to increase, and their management cost to rise.

Moreover, as the data in the assemblage drawing and the data in the parts list relate with each other, their management must be devised so as to maintain the interrelation, which will require an extra labor and cost. This also applies to the case where an assemblage drawing of a product is prepared in conjunction with a parts list by the use of a CAD system. Thus, if a data file conveying the assemblage drawing of a product is not managed in close association with its accessory file conveying the parts list, the operation at the terminal based on the CAD system will become so cumbersome that retrieval of related data from the two files will not be achieved readily.

True, currently there are systems whereby it is possible to read drawings, lists of data, and various other materials occurring as documents so as to convert them into digital data. However, even if such a system is used for the management of an assemblage drawing of a product together with its parts list, the management of those data files will be still cumbersome as long as the drawing and the parts list relate with each other, and it may sometimes impossible to instantly retrieve related data from the drawing and the parts list.

The object of this invention is to provide an information storing system whereby it is possible to greatly reduce the cost required for the management of data printed on paper sheets by converting them into digital data, and to easily retrieve image data and character data related with each other in combination or independently of each other, and a method for storing information.

SUMMARY OF THE INVENTION

[Providing Information]

The information providing system of this invention is an information providing system whereby information retained by a plurality of information providers stored in a network server is provided via the network to network users who seek the information, the network server comprising a plurality of storing portions to store the data of the plurality of information providers; a key conferring means which confers a security key to a first information seeker to whom the information provider has granted permission for gaining access to the information of that provider, and confers another security key to a second information seeker provided that the first information seeker permits the second information seeker to obtain the information directly from the information provider; a key checking means to check the security keys fed by the first and second information seekers to determine whether or not the information should be delivered to them; and a information searching/retrieving means to locate the information sought by the first and second information seekers in the storing portions based on the security keys, and to retrieve the information.

According to this arrangement, the information provider can safely provide the first information seeker with more detailed information than is distributed to general audience, because the security key is conferred only to the first information seeker whom the provider has permitted to gain access to the information possessed by the provider.

Further, because the first information seeker grants permission to the second information seeker on behalf of the information provider, the provider can provide the second information seeker with the desired information based on the fact that the first information seeker with whom the provider has had a reliable relation granted permission to the second information seeker, although the provider himself has no direct relation with the second information seeker. Through this arrangement, it is possible for the information provider to be relieved of cumbersome license transactions with the second information seeker, and to provide the second information seeker with the information as detailed as that given to the first information seeker.

Subsequent to this session, the second information seeker is granted a security directly by the information provider, so that the seeker may obtain information directly from the provider succeeding sessions. Therefore, it will become unnecessary for the second information seeker to obtain information from the first information seeker, and will be possible for the first information seeker to save a cost required for the construction of a database.

According to the information providing system of this invention, the storing portion has a plurality of storing areas, and the first and second information seekers are preferably allowed to gain access to some of the storing areas the information provider selected for them.

With this system, it is possible for the information provider to rank the first and second information seekers according to the confidentiality of information permitted to them. For example, the information provider can permit the second information seeker to gain access to a limited number of storing areas out of the storing areas permitted to the first information seeker.

Restriction of the storing areas to which the second information seeker is permitted to gain access may be made by the information provider, or by the first information seeker.

According to the information providing system of this invention, the information may comprise at least image data, and character data related with characters contained in that image data.

The image data consists, for example, of the graphics and images of a product and its parts handled by the information provider. The character data consists, for example, of the names of the product and its parts, and the numbers of parts, and their unit prices. According to the present system, it is possible to display on the terminals of information seekers, the drawings of a product and its parts required by the seekers, and the character data related with characters described in the drawings.

The information providing method of this invention is a method for providing information provided by a plurality of information providers and stored in a network server, to information seekers via a network, comprising the steps of storing information provided by the plurality of information providers separately; conferring not only a security to an information seeker who seeks information from the information provider who gave the permission to that seeker to gain access to his information, but also another security to a second information seeker who was given permission from the first information seeker to directly obtain information from the provider in question; checking based on the securities fed by the first and second information seekers whether provision of the information to those information seekers is legal or not; and retrieving, if provision of information to those seekers is decided to be legal, the information required by the first and second information seekers from the storing portion in accordance with the securities.

Such an information providing method is achievable using the information providing system described above, which meets the object of this invention.

[Electronic Mail]

The mailing system of this invention is an electronic mailing system in which electronic mails are exchanged between network terminals connected via a network, characterized in that each network terminal is provided with an image processing means to process an image appearing on the display required for the preparation of an electronic mail, a compressing means to compress the file containing the electronic mail with the processed image attached, and a decompressing means to decompress the compressed file.

According to this system configured as described above, it is possible for each terminal to easily process an image attached to an electronic mail without requiring any special application software for processing images, as long as the mailing software required for the operation of this system is installed in both of the terminal to send a mail and the terminal to receive the mail.

Because this system relieves both the sender and receiver of a mail of the need for special application software for image processing, it has a sufficiently high universal applicability.

Further, according to this system, a mail is prepared as a file to be compressed later. Therefore, this system is free from the problem otherwise encountered, that is, transmission of data will require a considerable time.

According to the electronic mailing system of this invention, the means are based on respective software packages, and the network terminal to send a mail is preferably provided with a means to distribute these software packages to the receivers of the mail.

Among the terminals to receive, for the first time, a mail prepared by the present electronic mailing system, there may be some that depend on a conventional electronic mailing system which only allows the user to prepare a mail for transmission and to receive a mail. Such a terminal, even if it receives an electronic mail prepared by the present system, can not open the mail to see its content.

To meet such a situation, according to this invention, when a mail is sent for the first time to such a terminal as described above, a software package operable on this system is also sent to the terminal together with the electronic mail. If the receiver installs the software he has received in his terminal, the present system will start in his terminal, which will allow the receiver to receive and open the electronic mail, and further to prepare his own mail to be sent to other terminals, or to process the image contained in the mail he has received.

According to the electronic mailing system of this invention, each network terminal is preferably provided with a mailing history display means for displaying, for a given mail, a list of the sender and the receivers thereof.

Because this means allows, for a given mail, a list of the sender and the receivers thereof to be registered in each of the involved terminals, it is possible for each of the involved terminals to easily follow by whom the mail was dispatched and by whom it was received.

According to the electronic mailing system of this invention, each network terminal is preferably provided with an image display switching means for switching the enlarged display of image to the contracted display thereof, and vice versa.

This means allows, if it is switched to the enlarged display of image, the user to see the detail of an image attached to an electronic mail, or if it is switched to the contracted display of image, to display, for example, the texts of the mail on the extra space of the screen produced as a result of contraction of the image.

The method of this invention for transmitting/receiving an electronic mail is an electronic mail transmitting/receiving system in which electronic mails are exchanged between network terminals connected via a network, characterized in that a mail sender prepares an electronic mail by processing on the screen an image to be attached to the mail, compresses the file containing the mail with the processed image attached before she sends the mail from her terminal, and the receiver of the mail decompresses the compressed file at his terminal before he opens the mail.

Such a mail transmitting/receiving method is achievable based on the electronic mailing system as described above, and realization of the method will meet the object of this invention.

The computer program of this invention (or medium to record the program) is capable of achieving the mail transmitting/receiving method as described above.

Realization of the aforementioned electronic mailing system based on the use of such a program as described above will meet the object of this invention.

[Parts Check List]

The parts check list preparing system of this invention comprises a means to store a database containing graphics data of the parts of a product, and the data of each part; a means to retrieve the graphics data of the parts required for the preparation of a parts check list; a means to put on display graphics based on the graphics data thus retrieved; a means to select the graphics of the required parts from among the graphics put on display; a means to retrieve the data of the parts correspondent with the graphics selected on display; a means to arrange the data of the parts thus retrieved into a list, and to put the list on display together with the graphics of the parts; and a means to automatically prepare a parts check list based on the parts list.

The "graphics data" used herein contain image data. Accordingly, the "graphics data" contain images existing as image data. This also applies to layout data and drawings described later.

According to the invention of this Application, in order to prepare a parts check list, it is only necessary for the user to retrieve the graphics data of necessary parts from the database, put them on display, and select the graphics of the necessary parts and prepare a parts check list on display. Thus, the user is relieved of the needs for identifying the product numbers of the necessary parts by searching through catalogues, to copy them on a sheet of paper, and it will become possible for the user to quickly and accurately prepare a parts check list.

Preferably the parts check list preparing system of this invention comprising a network server and network terminals connected via a network, wherein the network server comprises (A) a server side memory means to store the titles of drawings of parts, and the graphics data of the drawings and the information of the parts, (B) a drawing title identifying means to identify the title of a drawing selected by a network terminal, (C) an information searching means to locate, in the server side memory means, the graphics data correspondent with the drawing title, and the information of the parts drawn in the drawing having the identified title, and to retrieve those data, and (D) an information delivering means to deliver the retrieved graphics data and the information of parts as output from the network terminal, and wherein the network terminal comprises (a) a terminal side memory means to store the graphics data and the information of parts transmitted by the network server, (b) a graphics information acquiring means to acquire graphics data of the parts selected by that terminal from the drawing presented on its display, (c) a parts list displaying means to locate the information of the parts correspondent with the graphics data in the terminal side memory means, (d) a parts check list delivering means to put the information of the parts thus located on display, and to insert the information into a parts list displayed in conjunction with said drawing, and (e) a parts check list preparing means to prepare a parts check list based on the parts information in said parts list.

The network server configured as above delivers the graphics data of a drawing selected by a user to the network terminal of that user, and allows the user to exhibit the data, for example, on the screen of a display at the user's network terminal. The user locates the necessary parts on the drawing put on display, and selects them by clicking the mouse. Then, the terminal machine locates and retrieves the information of those parts based on the graphics data of those parts on display, and the user puts the retrieved data of those parts on display as a parts list, and prepares a parts check list based on the list.

On the terminal, the user only selects necessary parts on a drawing put on display to prepare a parts list which then serves as a material of a parts check list, and thus the user will be relieved of a cumbersome work of identifying the product numbers of those parts, and protected against such blunders as choosing or copying wrong product numbers. Therefore, parts check lists will be quickly and accurately prepared, and the efficiency of works required for preparing estimates will be also improved.

If the parts check list thus prepared is transmitted to the network server, it will be possible for the retailer or the manufacturer to receive the list via its terminal Then, the retailer or the manufacturer will be able to efficiently prepare an estimate in response to a request from the customer.

The parts check list preparing system of this invention preferably includes a means to prevent the user from obtaining the information of parts in a duplicate manner: if there are the information of plural parts, and the information of an assembly article comprising the plural parts, and a user selects both information, the means will prevent the user from obtaining only the latter information.

The plural parts constituting an assembly article are so-called elementary parts. If the user selects, in addition to the information of elementary parts, the information of an assembly particle comprising the elementary parts, he will selects the elementary particles in a duplicate manner.

To meet such a situation, the system of this invention is so configured as to allow the user, if he selects the information both of elementary parts and of their assembly article, to obtain only the information of the assembly article. This arrangement will prevent the user from gaining elementary parts in a duplicate manner, and ensure the preparation of a reliable parts check list and secure distribution of required parts.

Preferably, according to the parts check list preparing system of this invention, the server side memory means stores a price table containing prices classified by parts, and an inventory, and the network server comprises a response information inserting means to locate, in the price table and inventory, the price and stock information of the products to be listed in a parts check list, and to insert the information into the parts check list.

According to this arrangement, the stock and price information will be quickly retrieved from the memory means at the network server, to be inserted into a parts check list. Therefore, for example, an estimate will be easily prepared in response to a request.

The parts check list preparing system of this invention preferably comprises at least two network servers having different transmission distances from the network terminals, and the network terminal preferably gains access to the nearest network server.

According to this arrangement, because this system is utilized by the network terminal and the network server close to each other, the response of the system will be improved, and the speed of putting a drawing on display will be accelerated. If the two servers are allowed to have similar functions, it will be possible, even if one of them fails, for the other to compensate for the failed one without interrupting the normal operation.

Preferably, according to the parts check list preparing system of this invention, a nearby network server monitors whether the graphics data and/or parts information stored at a distant network server is altered, and if it detects any alteration, it updates its own graphics data and/or parts information in association with the alteration.

According to this arrangement, because any nearby network server a network terminal accesses always updates its own graphics data and parts information, the user will be able to securely have the latest information of the parts he desires inserted in a parts list, by only selecting the necessary parts on a drawing presented on his display, even if parts information has been altered.

Preferably, according to the parts check list preparing system of this invention, the parts may include the constitutive parts of construction machines.

Because the construction machine is constituted of a vast number of parts, and the part information including the production numbers of those parts is very complicated, utilization of this system for the management of the parts of construction machines will be particularly profitable for the improvement of clerk works.

The parts check list preparing method of this invention comprises the steps of retrieving graphics data of the parts required for the preparation of a parts check list from a database containing the graphics data of the parts and the information of those parts, putting a drawing based on the graphics data on display, selecting the parts on the drawing on display, retrieving the parts information correspondent with the graphics data of the selected parts, arranging the parts information into a list to put the list on display together with the drawing, and automatically preparing a parts check list based on the parts list.

Such a method as above is achievable using the parts check list preparing system described above, which meets the object of this invention.

The computer program of this invention (or medium to record the program) is characterized by allowing a computer system to execute said parts check list preparing method.

Preparation of a parts check list based on the use of such a program as described above will meet the object of this invention.

[Storing Information]

The information storing system of this invention comprises an image data acquiring means to acquire information from a printed sheet as image data, a character data feeding means to feed, as input, character data related with the characters contained in the image data, a character reading means to read the characters contained in the image data, and a memory means to store a conversion table which contains the characters read by the character reading means, and the character data correspondent with those characters in a form mutually convertible.

According to this arrangement, if image data such as a layout for assembling related parts, and character data such as the data of the parts are printed on a sheet of paper, the image data acquiring means acquires the image data by converting it into digital data, and the character data feeding means feeds the character data as digital data, which will dispense with the need for the cost required for the purchase of paper, printing, and storage of printed paper, thereby greatly reduce the cost.

Further, if the system allows the character reading means to read characters including symbols in the image data, and the characters and character data thus read to be mutually connected through a conversion table, the characters and the character data will be easily related with each other. Therefore, it will be possible to easily identify the character data correspondent with characters in image data, and, on the contrary, to easily identify the image data containing the characters correspondent with the character data.

Preferably, the information storing system of this invention further comprises a nominating means to nominate characters in an image conveyed by image data; a nominated position defining means to define the nominated position by converting the nominated position of characters on the image into coordinate data; and an information delivering means to locate the character data whose coordinate data approximate said coordinate data in the memory means, and to retrieve the character data, the memory means storing, in addition to said conversion table, another conversion table through which groups of characters having correspondent coordinate data may be related with each other.

This arrangement will make it possible, if the user nominates characters inserted in an image as its accessory by pointing with a mouse, to cause characters having coordinate data similar to the coordinate data of the nominated characters to be fetched based on the additive conversion table, and character data correspondent with the characters thus fetched to be fetched based on the original conversion table, or, in summing up, allow the user to automatically obtain, by simply selecting characters on display, the character data closely related with those characters. Fetching necessary information will be achieved by the information delivering means.

Preferably, according to the information storing system of this invention, the coordinate data defined by the character position defining means are determined as two dimensional area information defining a section surrounding the nominated characters.

According to this arrangement, an area necessary for defining nominated characters in an image may be considerably large, and thus, if the user wants to nominate characters, he may simply surround the characters and does not need to precisely define the area. Therefore, necessary characters will be easily and quickly nominated.

The information storing system of this invention further comprises a nominating means to nominate character data displayed as an image; a character data identifying means to identify the character data nominated by the nominating means; a nominated position defining means to define the nominated position in terms of coordinate data; and an information delivering means to locate the information whose coordinate data approximate said coordinate data in the memory means, and to retrieve that information, the memory means storing, in addition to said conversion table, another conversion table through which groups of characters having correspondent coordinate data may be related with each other.

This arrangement will make it possible, contrary to above, if the user initially nominates character data, to cause characters having coordinate data similar to the coordinate data of the nominated characters to be fetched based on the initial conversion table (of claim 1), and coordinate information of the characters displayed in an image to be fetched based on the other conversion table, or, in summing up, allow the user to obtain, by simply selecting character data on display, the position data of corresponding characters in an image as coordinate data. Fetching the necessary information will be achieved by the information delivering means.

The information accumulating method of this invention comprises the steps of acquiring information on a printed sheet as image data, feeding the character data related with the characters in an image of the image data, reading the characters in the image data, and a memory means to relate the characters read by the character reading means with the character data and to store them related with each other.

The above information providing method is achievable by the use of such an information accumulating system, which will meet an object of this invention.

The computer program of this invention (or medium to record the program) is characterized by allowing a computer system to execute said information accumulating method.

Implementing such an information accumulation system as described above using a program as described above will meet an object of this invention.

BRIEF DESCRIPTION OF THE DRAWINGS

FIG. 3 is a schematic diagram to show a memory portion of the first embodiment.

FIG. 8 illustrates how an information provider gives an ID/password to the applicant, and puts aside a memory area for the applicant in the first embodiment.

FIG. 10 illustrates how search results are given on display in the first embodiment.

FIG. 14 shows the content of a memory kept at a network server used in the second embodiment.

FIG. 17 illustrates how the title of a drawing is displayed on a transmitting network terminal in the second embodiment.

FIG. 19 illustrates how a mail is prepared on a terminal in the second embodiment.

FIG. 30 illustrates how a response mail is prepared at a receiver's terminal in the second embodiment.

FIG. 34 is a schematic diagram to show a model table stored at the retailer server in the third embodiment.

FIG. 37 is a schematic diagram to show a drawing table stored at the retailer server in the third embodiment.

FIG. 38 is a schematic diagram to show a parts table stored at the retailer server in the third embodiment.

FIG. 41 is a schematic diagram to show a price table stored by the host computer of the third embodiment.

FIG. 43 is a schematic diagram to show an information table stored at the client terminal in the third embodiment.

FIG. 49 illustrates how module names are displayed in the third embodiment.

FIG. 50 illustrates how drawing titles are displayed in the third embodiment.

FIG. 52 illustrates how a parts check list is displayed on a user's terminal in the third embodiment.

FIG. 53 shows a preview display of a parts check list displayed on a user's terminal before the list is printed in the third embodiment.

FIG. 54 illustrates how a parts check list is displayed on a retailer's terminal in the third embodiment.

FIG. 55 shows a preview display of a parts check list displayed on a retailer's terminal before the list is printed in the third embodiment.

FIG. 58 is the same variant of FIG. 56 to show how goods are selected on display.

FIG. 60 is a schematic diagram to show a table of drawings stored in a memory means of the fourth embodiment.

FIG. 61 is a schematic diagram to show a table for the conversion of symbol/character data stored in the memory means of the fourth embodiment.

FIG. 62 is a schematic diagram to show a table for the conversion of symbol/coordinate information stored in the memory means of the fourth embodiment.

DETAILED DESCRIPTION OF PREFERRED EMBODIMENT(S)

The preferred embodiments of this invention will be described with reference to attached drawings.

[First Embodiment]

FIGS. 1–12 show an information providing system 101 based on this invention and representing a first embodiment of this invention.

Figure 1:
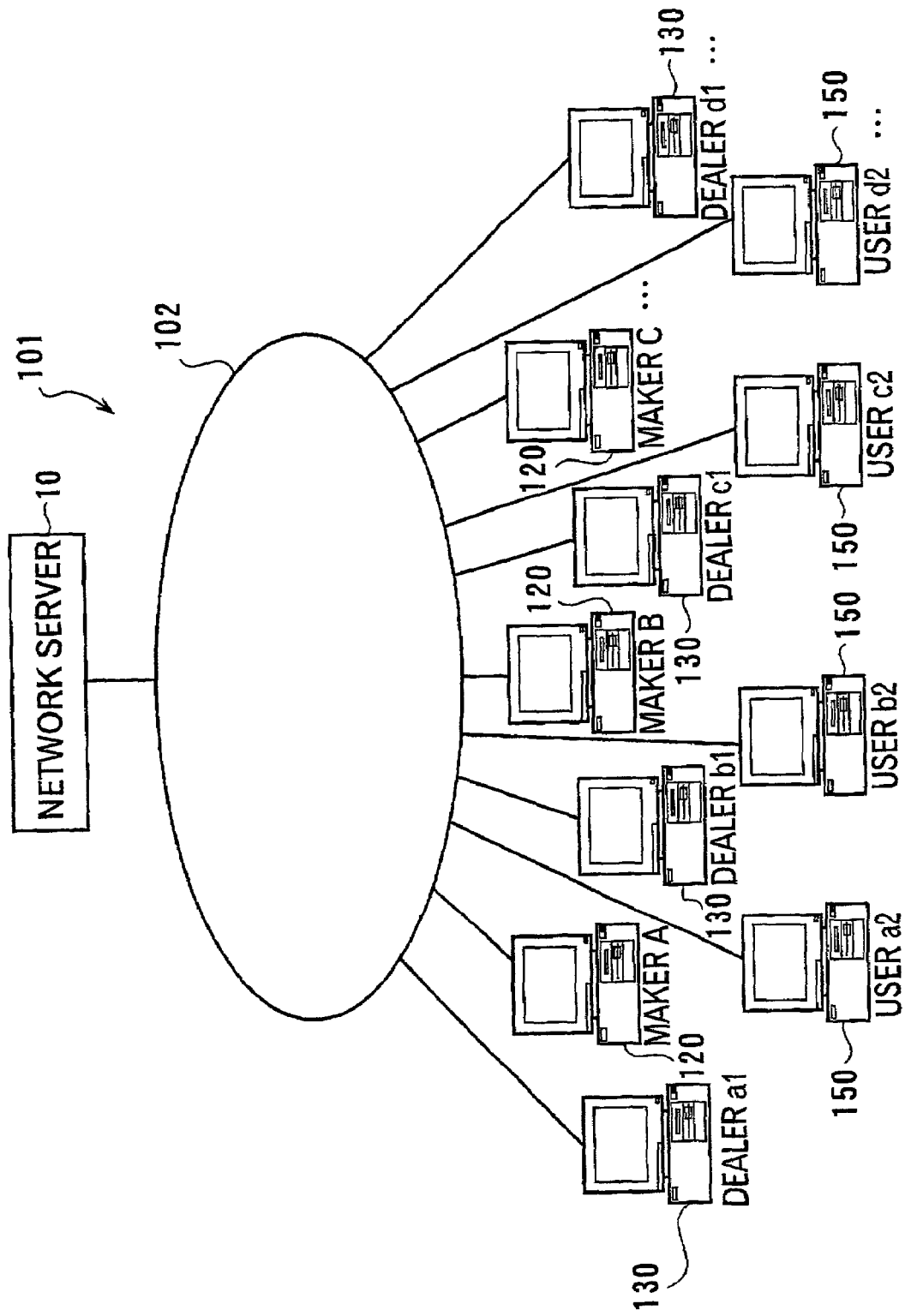
FIG. 1 is a diagram to illustrate the outline of an information providing system representing a first embodiment of this invention.

In FIG. 1, the information providing system 101 is constructed based on network computer technology, so that information of the products made by manufacturers (companies) A, B, C . . . is stored as a database at a network server of a network 102 such as Internet, and the information is directly provided by the network server to sales agents a1, b1, c1, d1 . . . , or to consumers (end-users) a2, b2, c2, d2 . . .

The manufacturers A to C or information providers confer in advance passwords to the sales agent a1 to d1 or first information seekers as security keys, while the sales agents a1 to d1 confer in advance user IDs and other passwords than above to the end-users a2 to d2 or second information seekers on behalf of the information providers. The sales agents a1 to d1, or the end-users a2 to d2 can gain access only to the information of the manufacturers as admitted by the password conferred to them.

Figure 2:
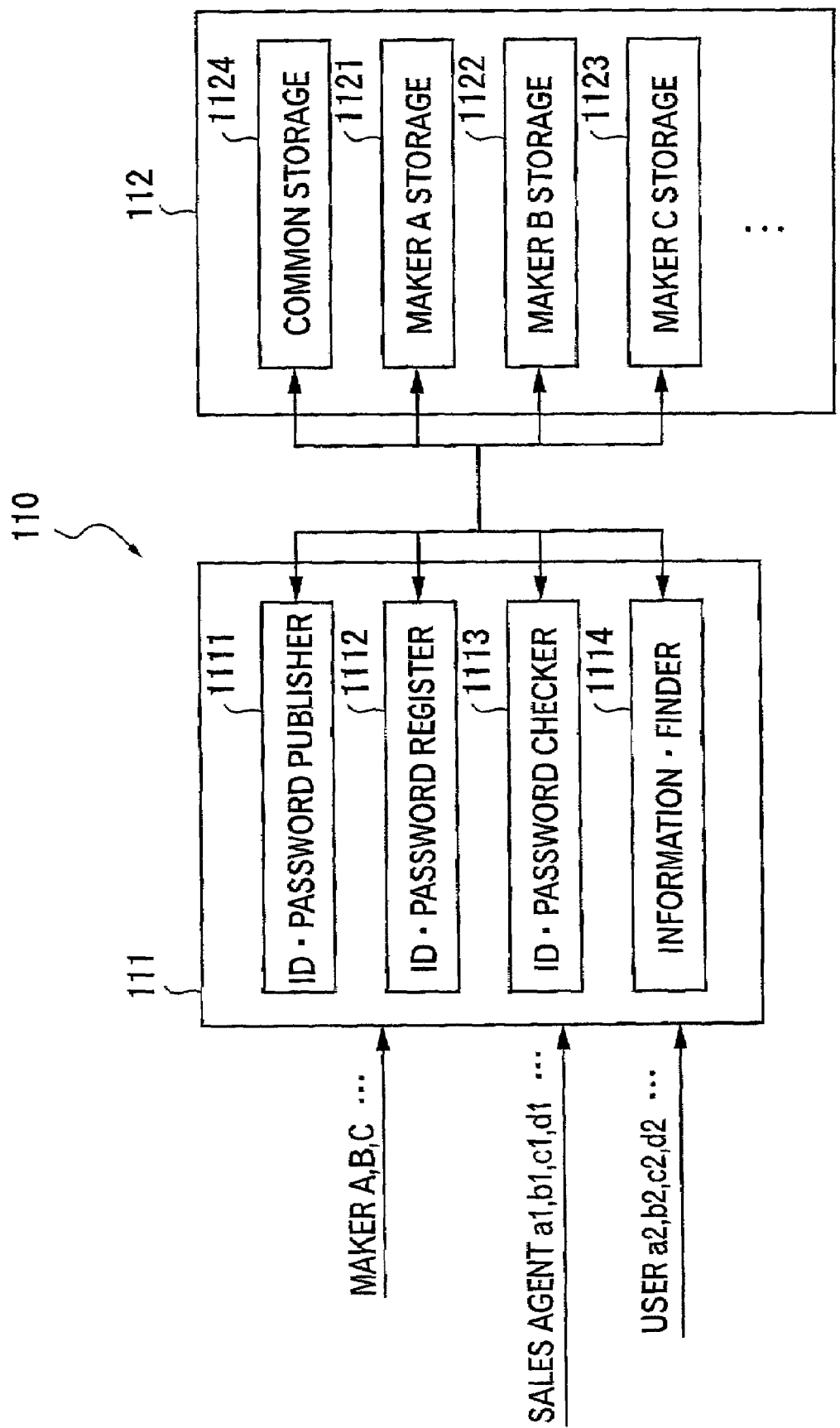
FIG. 2 is a block diagram to show a network server in the first embodiment.

As shown in FIG. 2, the network server 110 comprises a control means 111 consisting of a CPU and memory, and a memory means 112 consisting of a hard disk or a temporary recording medium, and can exchange information via the network 102 with the terminals 120 of manufacturers A, B, C . . . , terminals 130 of sales agents a1, b1, c1, d1 . . . , and terminals 150 of end-users a2, b2, c2, d2 . . . of FIG. 1. The terminals 120, 130 and 150 may include, in addition to those connected through cables with the network 102, various wireless mobile tools such as portable telephones, PHSs, personal computers with a wireless communication function.

The control means 111 of network server 110 comprises an ID/password conferring means 1111 based on a software package achievable by the CPU, an ID/password writing means 1112, an ID/password checking means, and an information searching/acquiring means 1114.

The memory means 112 comprises a storage portion 1121 allocated to manufacturer A, storage portion 1122 allocated to manufacture B, storage portion 1123 allocated to manufacturer C (other storage portions may be added as needed), and a common storage portion 1124.

The ID/password conferring means 1111 of control means 111 has a function to check, if any one of the sales agents a1 to d1 or of the end-users a2 to d2 connected to this system 101 gains access to the home-page of any one of manufacturers A to C, with a view to obtain information of that manufacturer, whether or not it is the first access for the sales agent or the end-user.

Further, the ID/password conferring means 1111, if it finds the access is firstly made by any one of the sales agent a1 to d1, assigns the judgement whether or not the access should be permitted, to manufacturers A to C. The same means, if it finds the access is firstly made by any one of the end-users a2 to d2, assigns the judgement whether or the access should be permitted, to sales agents a1 to d1. If the means is informed of the access by the sales agent or by the end-user being permissible, it will confer an user ID and password to the sales agent or to the end-user so that the sales agent or the end-user may obtain information directly from the manufacturer.

The ID/password writing means 1112 has a function to relate, if any one of the sales agents a1 to d1, or of the end-users a2 to d2 is permitted to gain access to the information of one of the manufacturers) and is given a user ID and password, the sales agent or the end-user given a unique ID and password with the manufacturer, and register these related data into a common storage portion 1124.

The ID/password checking means 1113 has a function to compare, if any one of the sales agents a1 to d1, or of the end-users a2 to d2 who has given a user ID and password gains access to the home-page of one of the manufacturers to obtain information, the user ID and password, and the name of the manufacturer to which access is made fed by the sales agent or the end-user, with the previously registered corresponding data stored in the common storage portion 1124.

The information searching/acquiring means 1114 has a function to locate, if the user ID and password, and the name of the manufacturer to which access is made fed by the sales agent or by the end-user proved to be valid, the information sought by the sales agent or by the end-user in the storage portion allocated to the manufacturer, and to fetch the information.

The storage portions 1121 to 1123 of the memory means 112 allocated to the manufacturers store information the manufacturers A to C make available to network users. For example, the storage portion 1121 allocated to manufacturer A of construction machines is shown in FIG. 3. The data of products such as drays, bulldozers, wheel loaders, hydraulic shovels, etc. are stored in storage areas A1-1, A1-2, A1-3 . . . ; the data of constitutive parts such as the names, identification Nos., unit prices, graphics data of those parts in storage areas A2-1, A2-2, A2-3 . . . ; and the document data such as instruction manuals of the products, standard manuals of maintenance works, manuals for service management, reports of service request, etc. in storage areas A3-1, A3-2, A3-3 . . . . In the storage portions 1122 and 1123 allocated to manufacturers B and C, the stored data, though different in their contents, are similarly divided into a number of packets, and placed in appropriate storage areas.

The common storage portion 1124 stores, as mentioned above, the user IDs and passwords conferred to sales agents a1 to d1, and to end-users a2 to d2 (information seekers), and the IDs of manufacturers related with the IDs and passwords of the information seekers.

The password conferred by the manufacturer to the sales agent the manufacturer directly deals with is coupled with a license notifying what kinds of information may be permitted to the sales agent, and is stored as such in the storage area allocated to the manufacturer. According to this arrangement, it is possible, for example, for manufacturer A to permit sales agent a1 to gain access, with regard to the information of products and documents, to storage areas A1-1, A1-2, A1-3 and A1-4, and A3-1, A3-2, A3-3 and A3-4 out of the storage areas allocated to him, and restrict the agent's access, with regard to the information of parts, to storage areas A2-1, A2-2 and A2-4, prohibiting the agent's access to storage area A2-3 which stores the price information of parts which requires higher secrecy.

The password conferred by the sales agent to the end-user the sales agent directly deals with is also coupled with a license notifying what kinds of information may be permitted to the end-user, and is stored as such in the storage area allocated to the manufacturer to which the access by the end-user is permitted. According to this arrangement, it is possible, for example, for sales agent a1 to permit end-user a2 to gain access, with regard to the information of products and parts, to storage areas A1-1, A1-2, A1-3 and A1-4, and A2-1, A2-2, A2-3 and A2-4 according to the license given in advance by the manufacturer, and restrict the end user's access, with regard to the information of documents, to storage areas A3-1, A3-2 and A3-3, prohibiting the end user's access to storage area A3-4 which stores the information of service requests which should be shared only by the manufacturer and the sales agent a1.

According to this arrangement, even if sales agent a1 tries to obtain information from manufacturer A using a password given to him by manufacturer A, he could not obtain information of the price of parts. However, the information stored in storage area A2-3 which requires high secrecy may be accessible from a number of terminals within the premise of manufacturer A, and may be shared by several different departments of manufacturer A.

If end-user a2 tries to obtain information from manufacturer A using a password given to him by sales agent a1, she could not obtain information of the service requests, as well as information of the unit prices of parts.

For a given sales agent or end-user, his pass-word and the storage areas of manufacturer to which his access is permitted are stored in the common storage portion 1124.

[Operation of First Embodiment]

The flow of information between the manufacturer and the sales agent according to this system 101 will be described below with reference to the flowchart of FIG. 4, and to the monitor screens of the sales agent terminal 130 shown in FIGS. 5 to 10. For the convenience of illustration, let's assume manufacturer A of construction machines represents an information provider, and sales agent a1 who is assigned the sale of A's products represents an information receiver, and the storage portions 1121 to 1123 at server 110 allocated to the manufacturers completed the registration of necessary data.

Figure 4:
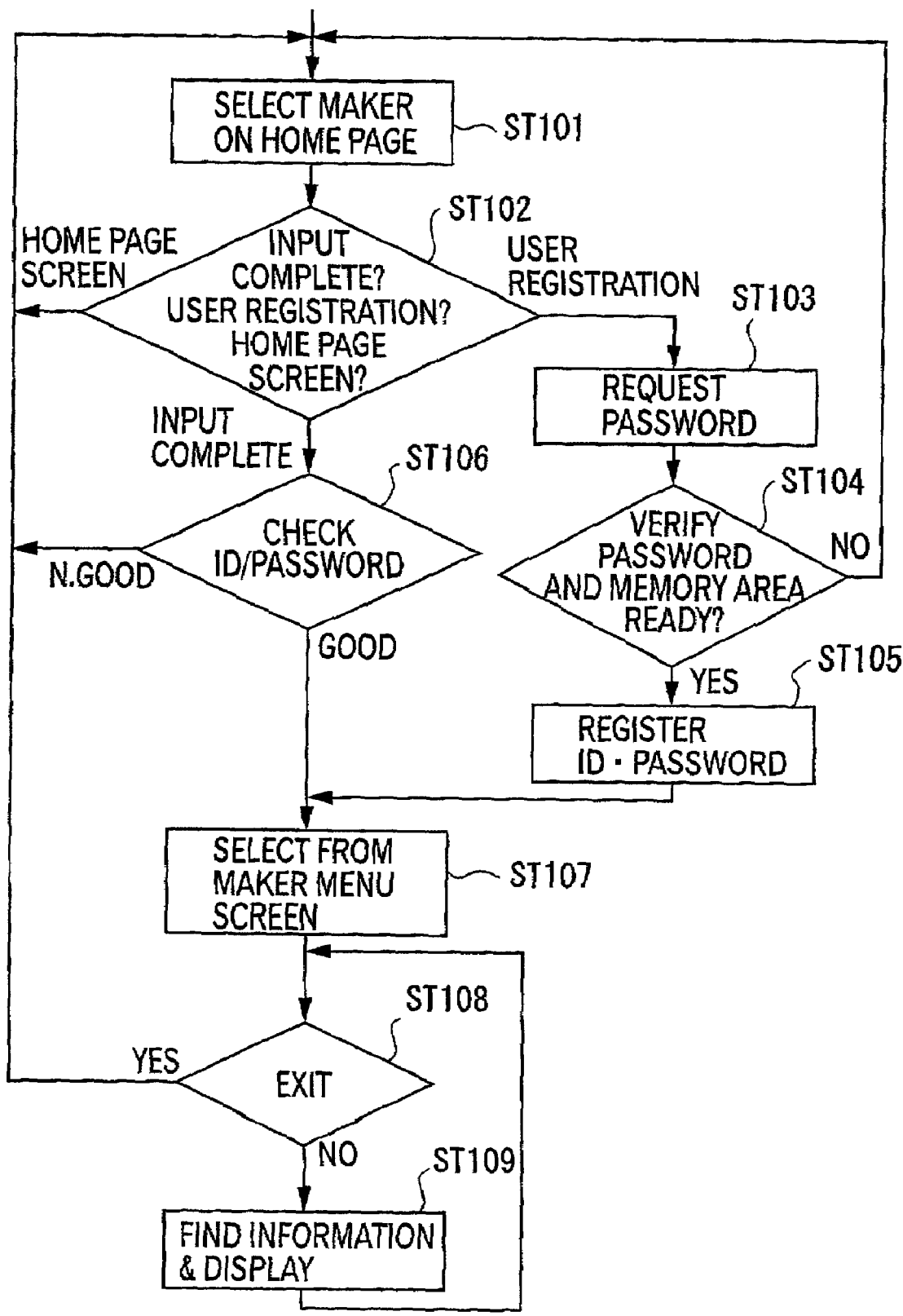
FIG. 4 is a flowchart to show the steps required for acquisition of necessary information in the first embodiment.
Figure 5:
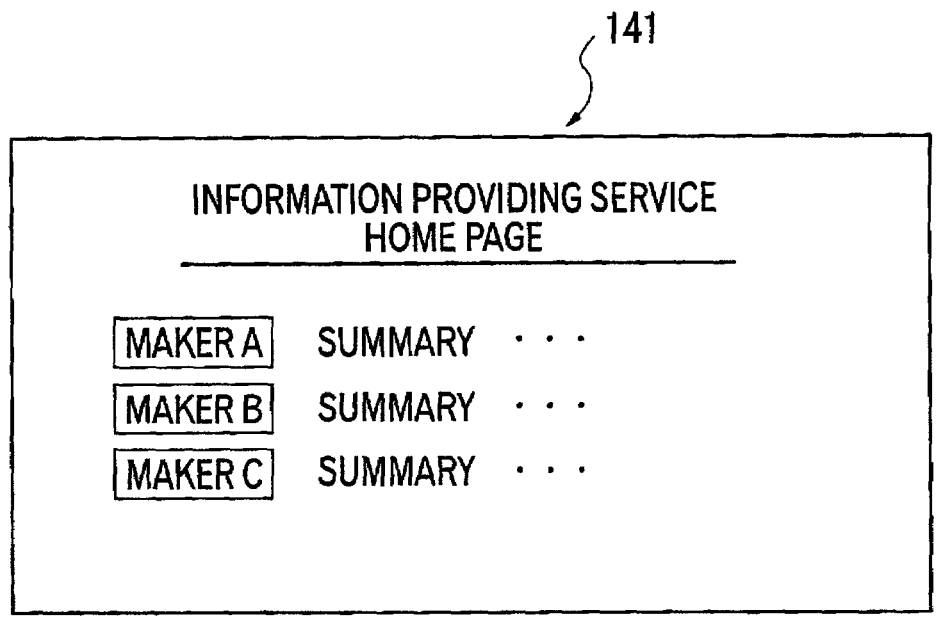
FIG. 5 illustrates a home-page exhibited in the first embodiment.

At ST (step) 101 of FIG. 4, sales agent a1 gains access to the home-page of this system 101 via Internet, and then network server 110 causes the terminal 130 of sales agent a1 to present the home-page display as shown in FIG. 5. Next, sales agent a1, thinking he can get necessary information from manufacturer A, selects "manufacturer A" by clicking a mouse.

Actually, display data to give a display 141 are fetched from the common storage portion 1124, and stored temporarily in a memory within the server 110, and the terminal 130 receives it via network 102 and puts it to display using viewer software. Following displays are obtained in a similar manner. A hard disk at the terminal 130 to store the viewer software or a commercially available CD-ROM to store the viewer software is also included in the recording medium of this invention.

Figure 6:
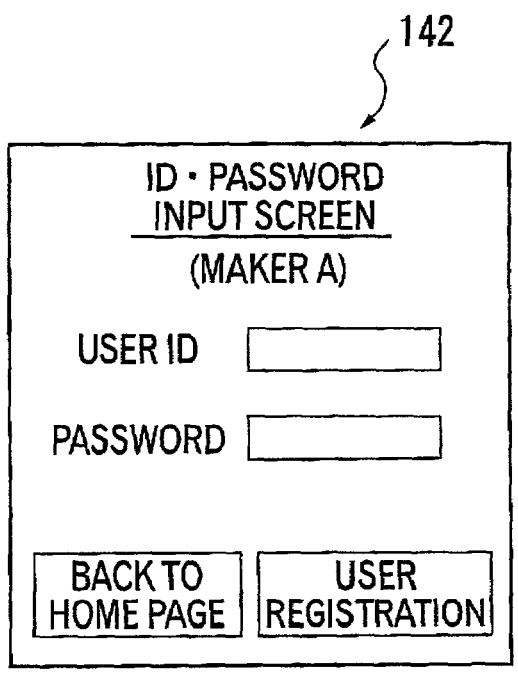
FIG. 6 illustrates a screen through which the user feeds his ID/password in the first embodiment.

At ST 102, the ID/password conferring means of network server 110 causes the terminal 130 of sales agent to present a display through which the ID/password is fed as shown in FIG. 6. If sales agent a1 tries to gain access to manufacturer A for the first time, the agent has no user ID and password, and thus will give up the trial and return to the homepage display 141, or make a user registration to be given a user ID and password from manufacturer A. If sales agent a1 is already given an ID and password from manufacturer A, he feeds the ID and password.

Figure 7:
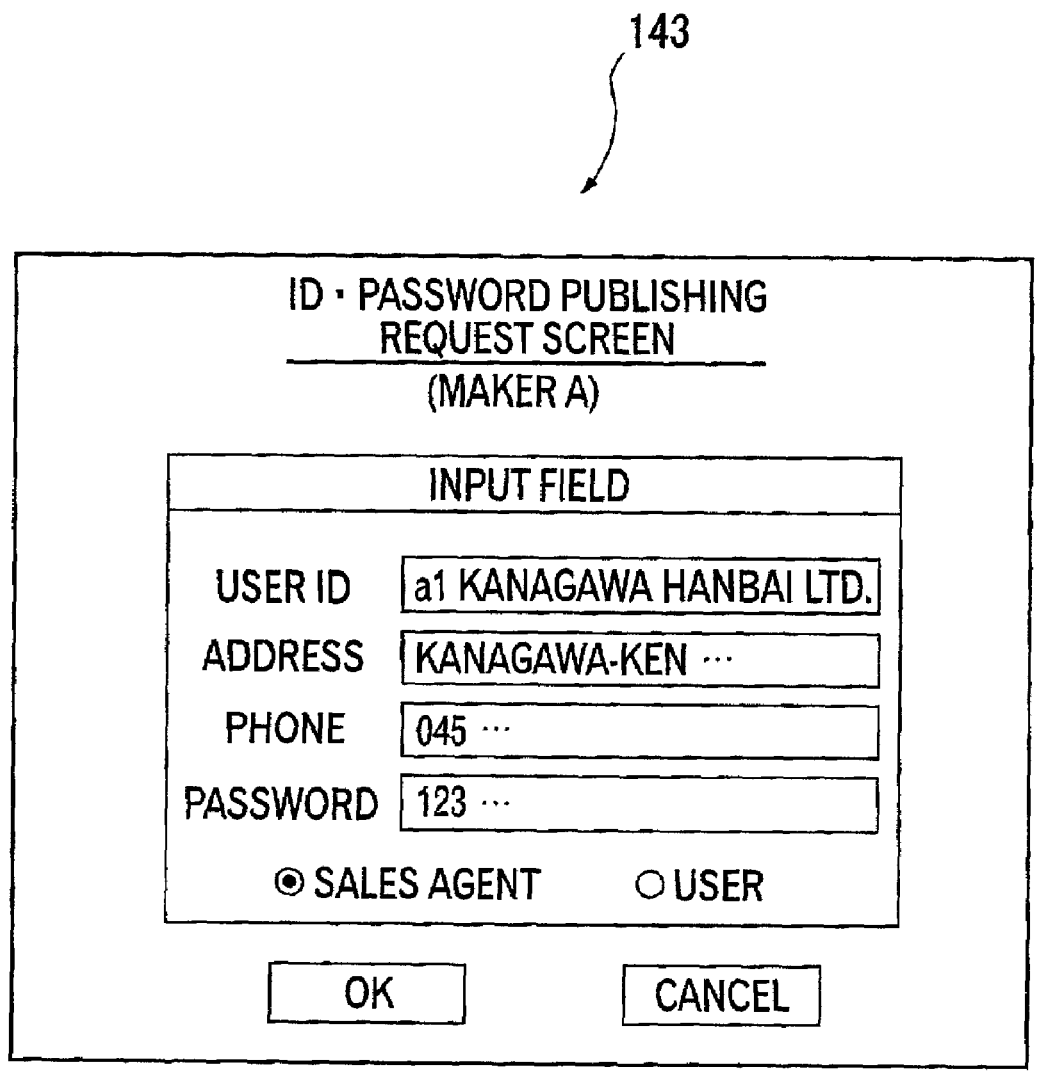
FIG. 7 illustrates how a first information seeker applies for an ID/password in the first embodiment.

ST 103 shows a step sales agent a1 takes, if he wants manufacturer A to register him as a user of the information provided by manufacturer A, and selects "user registration" on display 142. Then, the ID/password conferring means 1111 causes the sales agent's terminal 130 to present a display 143 through which request for ID/password is fed as shown in FIG. 7. Sales agent a1 feeds desirable user ID and password, and the address and telephone number of the applicant in the appropriate spaces of the display 143, gives a check mark on the block representing sales agent, and selects "OK." Then, the ID/password conferring means 11 causes the terminal 120 of manufacturer A to present a display 144 containing the same content as the data fed via the display 143 as well as the content of corresponding storage area containing the requested ID/password.

At ST 104, manufacturer A determines, based on the data presented on the display 144, whether or not provision of information to sales agent al should be permitted. If manufacturer A determines no permission will be given to sales agent a1, he selects "no permission." Then, the ID/password conferring means 1111 causes the terminal 130 of sales agent al to return to the home-page 141 where a message of "no permission" is also displayed. On the other hand, if manufacturer A decides to give permission to sales agent a1 for gaining access to his information, manufacturer A determines appropriate storage areas to which sales agent al should be permitted to gain access, and informs sales agent a1 of the permitted storage areas via display 144.

Manufacturer A, before giving permission to sales agent a1 for gaining access to his information, refers to a table stored in his terminal 120 which contains the sales agents he is dealing with, and checks whether or not sales agent a1 really exists in the table.

At ST 105, permission is actually given to sales agent a1. Here, the ID/password writing means 1112 writes the authorized user ID and password of sales agent a1 into the common storage portion 1124 which serve as a token when sales agent a1 wants to obtain information directly from manufacturer A. Moreover, the ID/password writing means 1112 informs sales agent a1 through display of the latter's terminal 130 of his application being accepted by manufacturer A as well as of the authorized user ID and password. Now, conferring of a user ID and password to sales agent a1 by manufacturer A is completed. Then, the procedure will advance to ST 107.

Turning back to ST 102, if sales agent a1 is already given an ID and password by manufacturer A, sales agent a1 feeds the ID and password in appropriate spaces on display 142 of FIG. 6.

At ST 106, the ID/password checking means 1113 compares the ID and password fed by sales agent a1 with the data stored in the common storage portion 1124, thereby to check whether sales agent a1 is rightly qualified for gaining access to the information of manufacturer A. If the means finds sales agent a1 is not rightly qualified, the means informs sales agent a1 of it through the display of terminal 130 of sales agent a1, and prompts the reentry of necessary data. If the means finds sales agent a1 is rightly qualified, the procedure will advance to ST 107.

Figure 9:
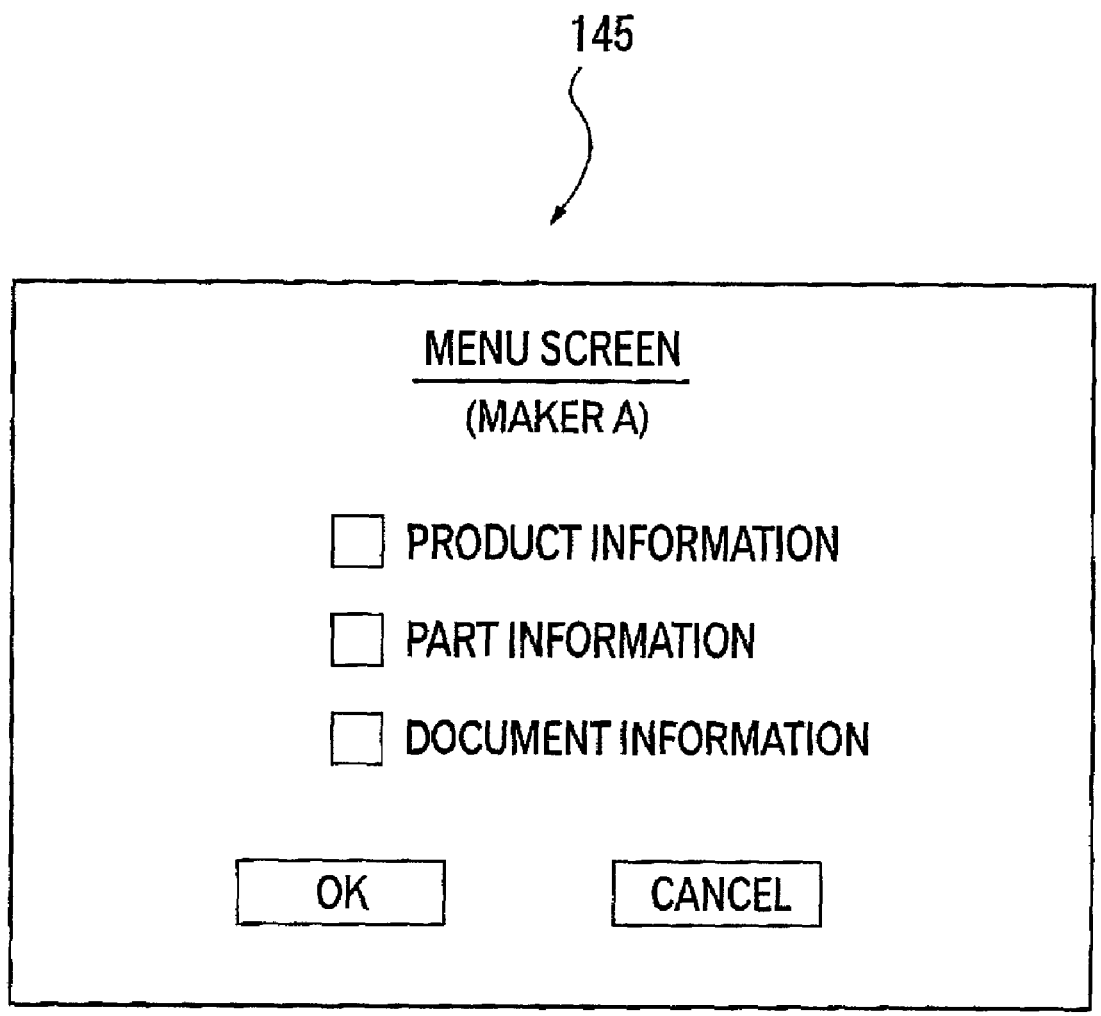
FIG. 9 shows a menu display of the first embodiment.
Figure 11:
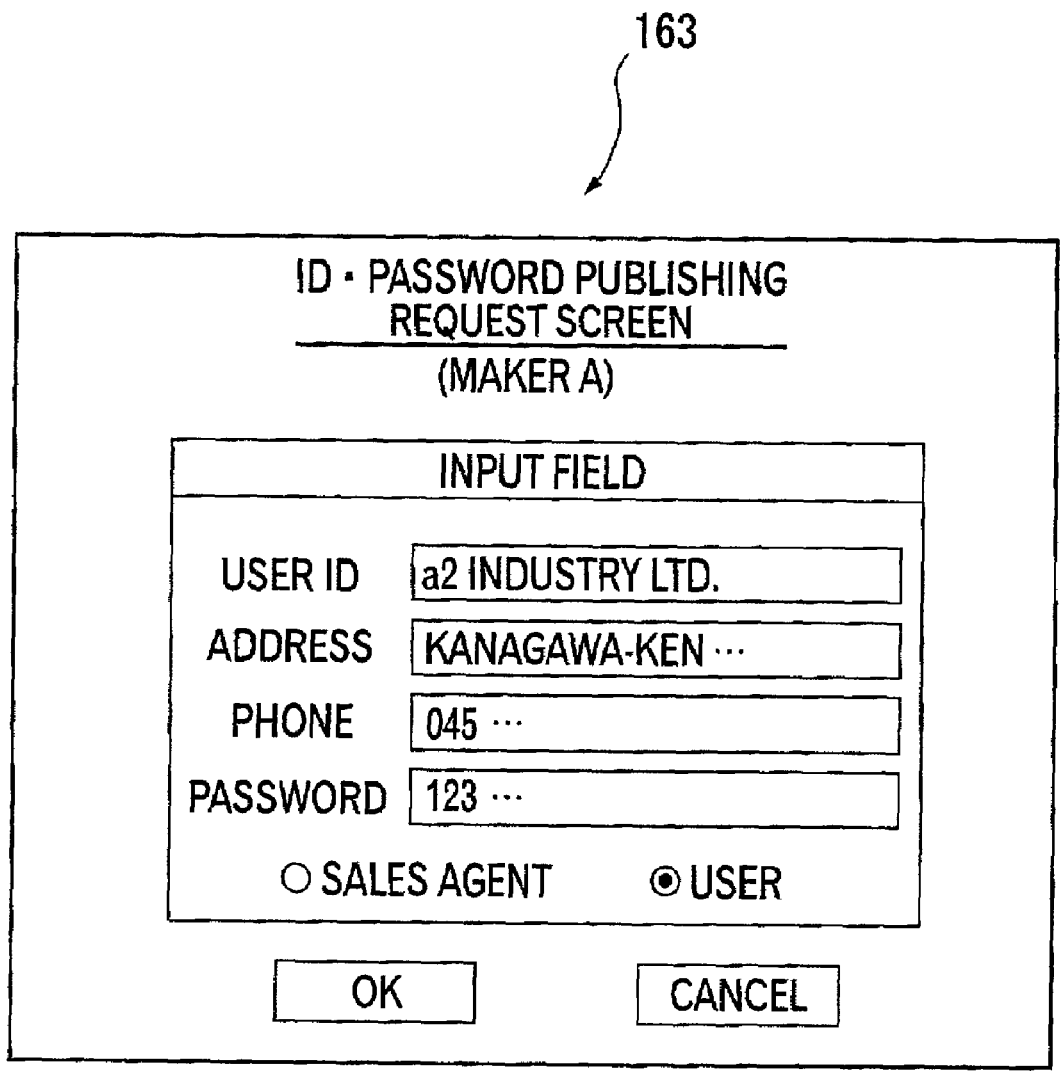
FIG. 11 illustrates how a second information seeker applies for an ID/password in the first embodiment.
Figure 12:
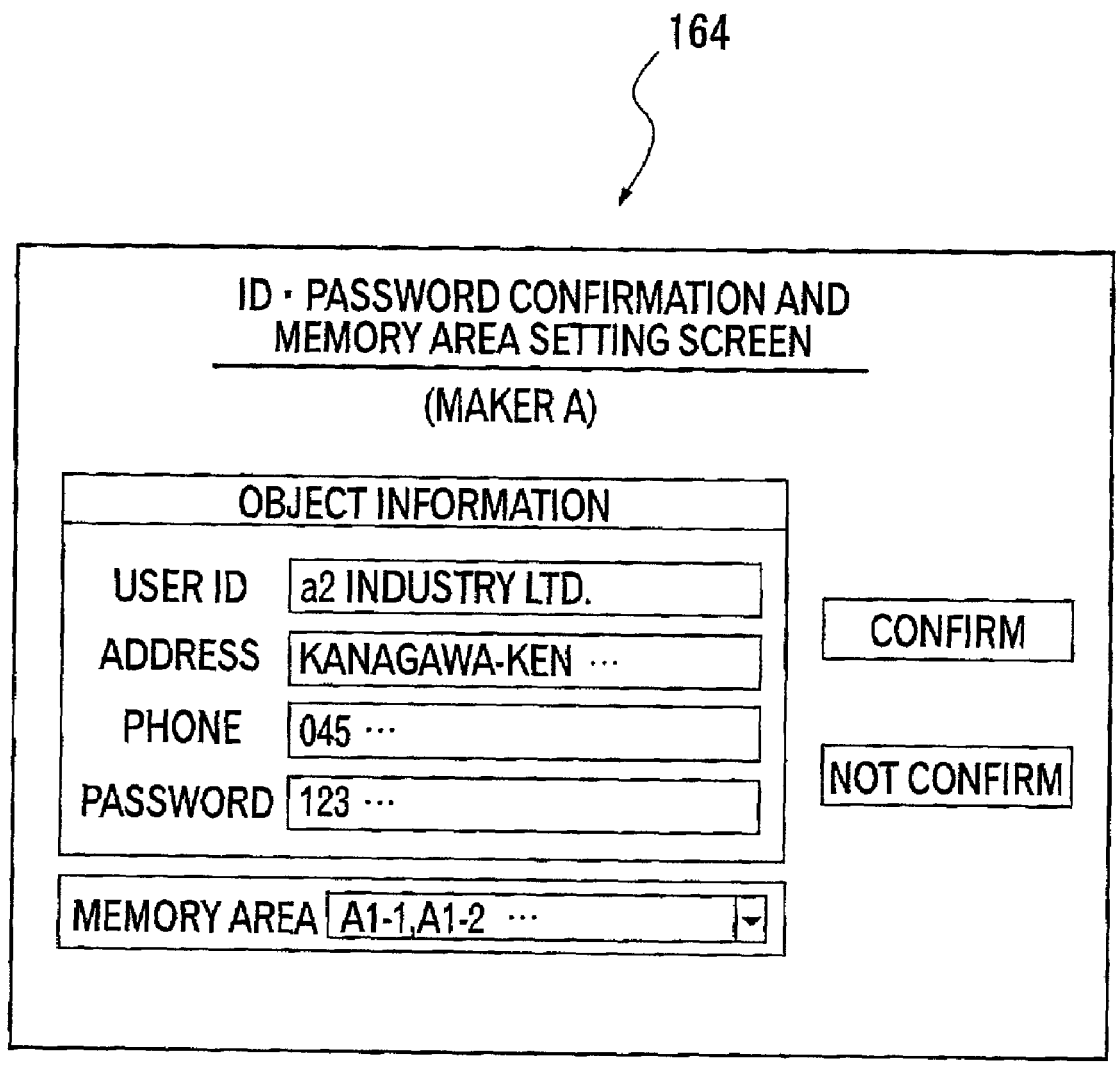
FIG. 12 illustrates how the first information seeker gives an ID/password to the applicant, and puts aside a memory area for the applicant.

At ST 107, the information searching/acquiring means 1114 of server 110 causes the display 130 of sales agent a1 to present a menu display 145 as shown in FIG. 9. Sales agent a1 selects one among the product information, parts information and document information manufacturer A is ready to provide. Let's assume sales agent a1 selects "parts information." Then, the information searching/acquiring means 1114 presents a display carrying spaces to receive words or items (not illustrated here) by which one can locate necessary data, and prompts sales agent a1 to feed appropriate words such as the name or ID No. of parts.

At ST 108, if sales agent a1 wants to discontinue the search, he may select "cancel" on the menu display 145. Then, the information searching/acquiring means 1114 will cause the display of terminal 130 to return to home-page display 141.

Figure 10:
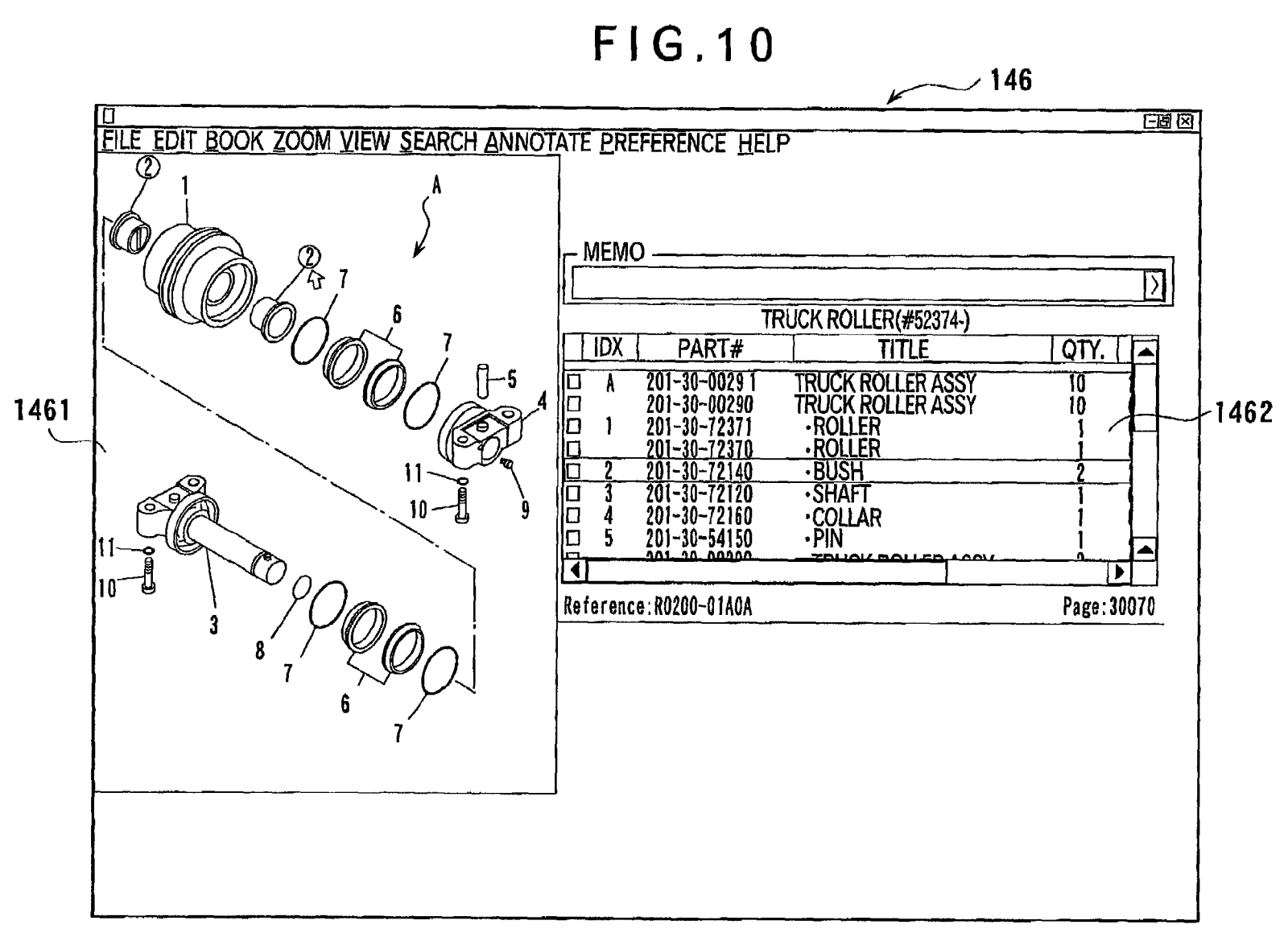

At ST 109, if the information searching/acquiring means 1114 finds appropriate words are fed by sales agent a1, it will search the data including those words through the storage portion 1121 allocated to manufacturer A, fetch the data and cause the terminal 130 to display the data. FIG. 10 illustrates how "201-30-72140" is fed as the ID number of a part whose information is desired on a search display, and how the search result is presented on display 146.

As shown in display 146 of FIG. 10, according to this embodiment, if the ID number of a part is fed, a drawing of a module containing the part identified by that number, and a list of all the parts contained in the module are displayed simultaneously on the display of terminal 130.

Here, the drawing 1461 comprises image data in the form of a bit map file, and characters or symbols attached to the parts of drawing 1461 correspond with index (IDX) numbers in the parts list 1462. Thus, if the user selects, for example, a part with a number "2" in drawing 1461 by pointing and clicking a mouse, the number "2" will turn to "(1)," and the parts information of a part in the parts list whose IDX number is 2 will be automatically highlighted, for example, by changing their color. The ID No. of the part in drawing 1461 may be converted from "2" to "(2)" in association.

This will be achieved by allowing an OCR (optical character reader) to read characters attached to each part existing as image data (display 1461), and to relate the thus deciphered characters with the IDX number, ID number, and name of the part, its use number, and its unit price. A software package required for this function is stored in the memory means 112, and put into action under the control of control means 111.

As described above, when sales agent a1 obtains necessary information such as the data of parts on search result display 146, he may click the check mark at the upper right corner of display to return to search start display (not illustrated here), and restart a search as needed, or end the search to return to home-page 141.

If sales agent a1 deals with manufacturers B and C, as well as with manufacturer A, he can obtain information from those manufactures through the same procedures as are taken with regard to manufacturer A, and sales agents b1 to d1 can similarly obtain information from manufacturers they are directly dealing with. Thus, no further description will be given on this point.

Next, turn to the flow of information between the manufacturer and the end-user according to this system 101. Here description will be given only about ST 102 to 105 out of ST 101 to 109. This is because ST 101 and ST 106 to 109 will be easily understood by substituting sales agent a1 in the above explanation for end-user a2.

At ST 102 of FIG. 4, the ID/password conferring means 1111 at network server 110 causes the end-user's terminal 150 to present a display 142 prompting the entry of ID and password (FIG. 6). If end-user a2 tries to gain access to manufacturer A for the first time, the end-user has no user ID and password, and thus will give up the trial and return to the homepage display 141, or make a user registration to be given a user ID and password from sales agent a1. If end-user a2 is already given an ID and password from sales agent a1, she feeds the ID and password.

At ST 103, if end-user a2 wants sales agent a1 to register her as a user of the information provided by manufacturer A, and selects "user registration" on display 142, the ID/password conferring means 1111 causes the end-user's terminal 150 to present a display 163 through which request for ID/password is fed as shown in FIG. 9. End-user a2 feeds desirable user ID and password, and her address and telephone number in the appropriate spaces of the display 163, gives a check mark on the block representing the user of products, and selects "OK." Then, the ID/password conferring means 11, in response to the check mark given to the block representing the user of products, causes the terminal 130 of sales agent a1 to present a display 164 informing that the ID/password is accepted, and accessible storage areas are determined as shown in FIG. 10.

At ST 104, sales agent a1 determines, based on the data presented on display 164, whether or not provision of information to end-user a2 should be permitted. If sales agent a1 determines no permission will be given to end-user a2, he selects "no permission." Then, the ID/password conferring means 1111 causes the terminal 150 of end-user a2 to return to the home-page 141 where a message of "no permission" is also displayed. On the other hand, if sales agent a1 decides to give permission to end-user a2 for gaining access to the information, sales agent a1 determines appropriate storage areas to which end-user a2 should be permitted to gain access, and informs end-user a2 of the permitted storage areas via display 164.

Sales agent a1, before giving permission to end-user a2 for gaining access to the information, refers to a table stored in his terminal 130 which contains the customers he is dealing with, and checks whether or not end-user a2 really exists in the table. Further, sales agent a1 determines storage areas to be accessed by end-user a2 by selecting as appropriate from among the storage areas to which his access is permitted by manufacturer A.

At ST 105, permission is actually given to end-user a2. Here, the ID/password writing means 1112 writes the authorized user ID and password of end-user a2 into the common storage portion 1124 which serve as a token when end-user a2 wants to obtain information directly from manufacturer A. Moreover, the ID/password writing means 1112 informs end-user a2 through display of the latter's terminal 150 of her application being accepted by sales agent a1 as well as of the authorized user ID and password. Now, conferring of a user ID and password to end-user a2 by sales agent a1 is completed. Then, the procedure will advance to ST 107.

Turning back to ST 102, if end-user a2 is already given an ID and password by sales agent a1, end-user a2 may feed the ID and password in appropriate spaces on display 142 (FIG. 6).

If end-user a2 deals with sales agents b1 to d1, as well as with sales agent a1, she can obtain information directly from the manufacturers with which those sales agents are dealing by receiving user IDs and passwords from those sales agents. End-users b2 to d2 can similarly obtain information from manufacturers. Thus, no further description will be given on this point.

[Advantages of First Embodiment]

This embodiment having features as described above will ensure following advantages.

(1) According to the information providing system 101, only the sales agents (a1–d1) that are selected by the manufacturer (A–C) are given passwords which serve as a security key, and thus it is possible for the manufacturer to provide more detailed information to those selected sales agent than is possible with the case where information is open to general public, and thus to more greatly satisfy the need of the sales agents (a1–d1).

(2) Further, the sales agent (a1–d1) can confer, to the end-user (a2–d2), a license or a password for gaining access to information of the manufacturer (A–C) on behalf of the manufacturer, and thus it is possible for the manufacturer (A–C) to provide information to the end-user (a2–d2) based on his trust towards the sales agent (a1–d1) cultivated through direct business relations, in spite of his not having any direct business relation with the end-user (a2–d2). This arrangement makes it possible for the manufacturer (A–C) to dispense with the need for performing complicated clerk works required for conferring a license, and to provide to the end-user (a2–d2) information as detailed as that permitted to the sales agent (a1–d1).

(3) Then, because the end-user (a2–d2) is given a password through which she can directly gain access to information of the manufacturer (A–C), the end-user will be relieved of the necessity for gaining access to the sales agent (a1–d1) having direct business relation with the manufacturer in order to obtain information of the manufacturer (A–C), and the sales agent (a1–d1) will be relieved of the necessity for building a database which will require a cost.

(4) If a plurality of sales agents (a1–d1) or end-users (a2–d2) want to gain access to information of a plurality of manufacturers (A–C) via network 102, they will be able to fetch necessary information from the storage portions 1121–1123 allocated to the manufacturers (A–C) using the information searching/acquiring means 1114 working on the same software, namely, the sales agents (a1–d1) or the end-users (a2–d2) can obtain information from different manufacturers (A–C) through the same operation of their terminals. Accordingly, the sales agent or the end-user is relieved of complicated operations which would be otherwise required, and thus can more easily obtain necessary information.

(5) The storage portions 1121–1123 at server 110 allocated to the manufacturers include a plurality of areas each (for example, the storage portion 1121 allocated to manufacturer A includes storage areas A1-1, A1-2, A1-3, . . . , A2-3, . . . , A3-1, A3-2, A3-3, . . . ), and the sales agent (a1–d1) can gain access only to the areas that are permitted by the manufacturer (A–C), and the end-user (a2–d2) only to the areas that are permitted by the sales agent (a1–d1). Thus, it will be possible for the manufacturer (A) to provide different levels of information in secrecy ranking to the sales agent (a1–d1) and to the end-user (a2–d2). To put this according to this embodiment, manufacturer A can permit sales agent a1 to gain access to the information of service requests, while prohibiting the access to the same. information by end-user a2.

(6) Because each storage portion includes a plurality of storage areas (A1-1, A1-2, A1-3, . . . , A2-1, A2-2, A2-3, . . . , A3-1, A3-2, A3-3, A3-4 . . . ), it will be possible for the manufacturer (A–C) to store highly confidential information such as reports of service request, unit prices of parts, etc., in those areas to which access is rarely made, and thus to prevent such highly confidential information from leaking through the access by sales agents (a1–d1) and end-users (a2–d2).

(7) Because even highly confidential information can be stored in the storage portion (1121–1123) allocated to the manufacturer, it will be possible, for example, for the different departments of manufacturer A to gain access to the confidential information of their company from their terminals. This encourages the sharing of common information by the different departments of a company.

(8) The parts information of a part includes the image data thereof extracted from a drawing 1461 which includes the part in addition to many others, and parts data such as the ID No., name and used number of that part identified from the symbol attached to the image data. Thus, drawing 1461, and the parts data of a part related with the selected symbol in drawing 1461 are simultaneously displayed, such that the sales agent (a1–d1) or the end-user (a2–d2) could have a more accurate information of that part than would be otherwise possible.

(9) Because network server 110 can manage all data accumulated in its memory, it will be possible for the manufacturer (A–C) to avoid the necessity of managing his own stored data which will contribute to a great reduction of cost. Further, because all information exists as digital data, cost required for printing, mailing to sales agents (a1–d1) Or to end-users (a2–d2) which would be required if the information is printed on the sheets of paper will be saved, which will also contribute to a reduction of cost.

[Variant of First Embodiment]

The information providing system/method of this invention is not limited to the first embodiment, but may include other variants such as the following one.

According to the first embodiment, manufacturer A provides information only to sales agent a1 and end-user a2. But, it is also possible for manufacturer A to provide information or give a license to a plurality of sales agents and end-users, or for a sales agent to obtain information from a plurality of manufacturers.

According to the aforementioned embodiment, each of the storage portions 1121 to 1123 allocated to the manufacturers includes a plurality of storage areas. However, even if the system is based on a storage portion which is not divided into any definable areas, the system is also included in this invention. However, the system is preferably based on a storage portion including a plurality of definable areas, because then the advantages as mentioned in (5) and (6) above will be ensured.

Moreover, the information provider, first information seeker, and second information seeker are not restricted to the manufacturer, sales agent and end-user, respectively. They may be represented by any other arbitrarily chosen companies and private persons. Information provided may be of any kind, and is not restricted to the information related with the parts of construction machines as in the above embodiment. The mode of display at the terminal may be modified in any desired way to facilitate visibility and input feeding, and is not restricted to what is shown in FIGS. 5 to 12,

[Second Embodiment]

FIGS. 13 to 31 show an electronic mailing system 201 representing a second embodiment of this invention.

Figure 13:
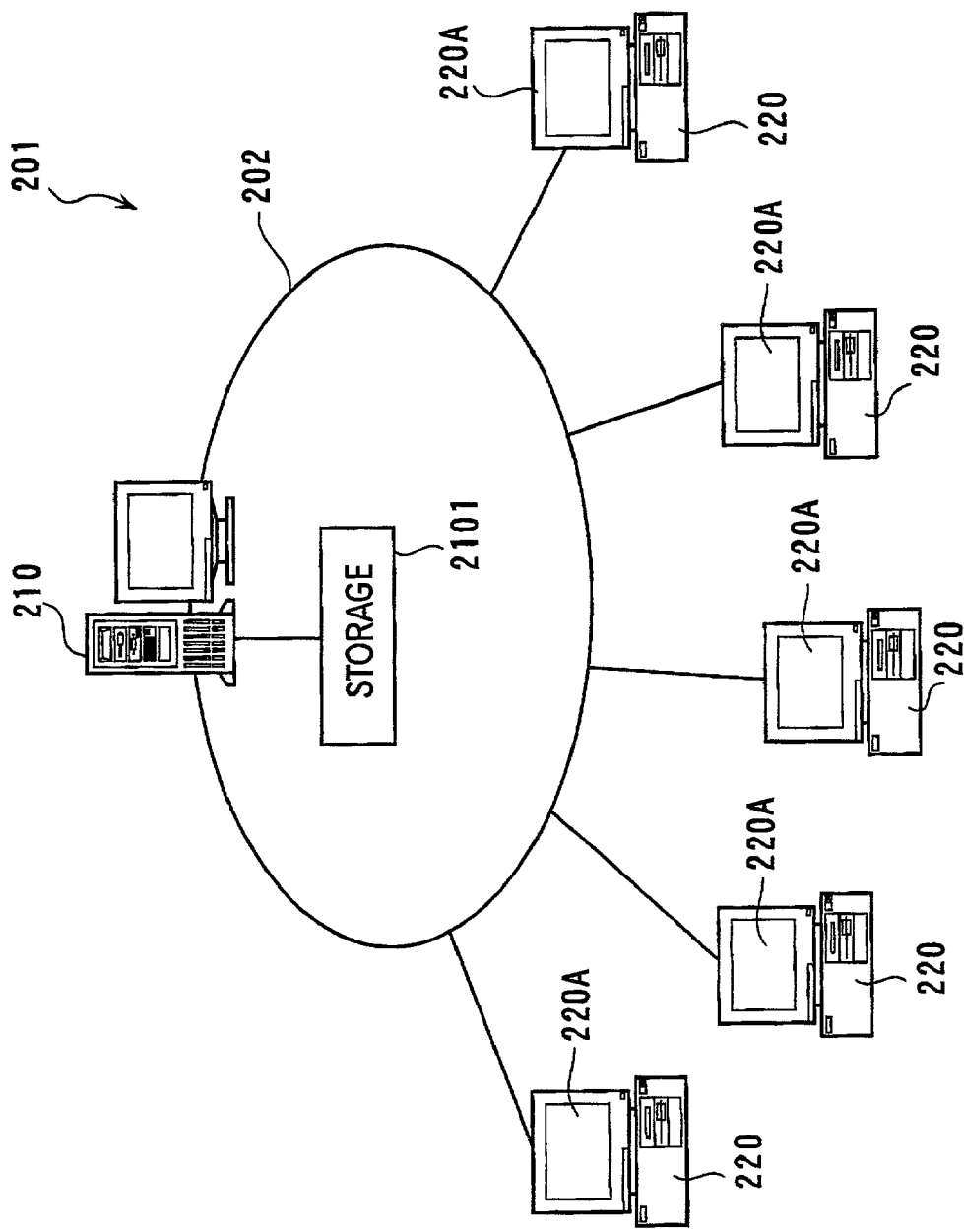
FIG. 13 is a schematic diagram to show the overview of an electronic mailing system representing a second embodiment of this invention.

The electronic mailing system 201 shown in FIG. 13 is based on computer network technology, and is used in this particular embodiment to exchange electronic mails between a manufacturer of construction machines and a plurality of sales agents assigned the sale of those construction machines.

This electronic mailing system 201 consists of a network server on the side of the manufacturer and a plurality of network terminals 220 on the side of sales agents connected with each other via a network 202 such as Intranet or Internet. To the network server 210 is connected the network terminal (not illustrated here) of the manufacturer.

The network server 210 serves as the mail server on the network 201, and comprises a memory means 101 consisting of, for example, a hard disk (actually the memory means is incorporated in the server 210). The memory means 101 stores a table of drawings 2102 as depicted in FIG. 14.

The drawing table 2102 stores the titles of drawings carrying the graphics (image) data of articles and parts constituting construction machines, and the graphics data (image data) related with the drawing title as files based on a bit map format.

Figure 15:
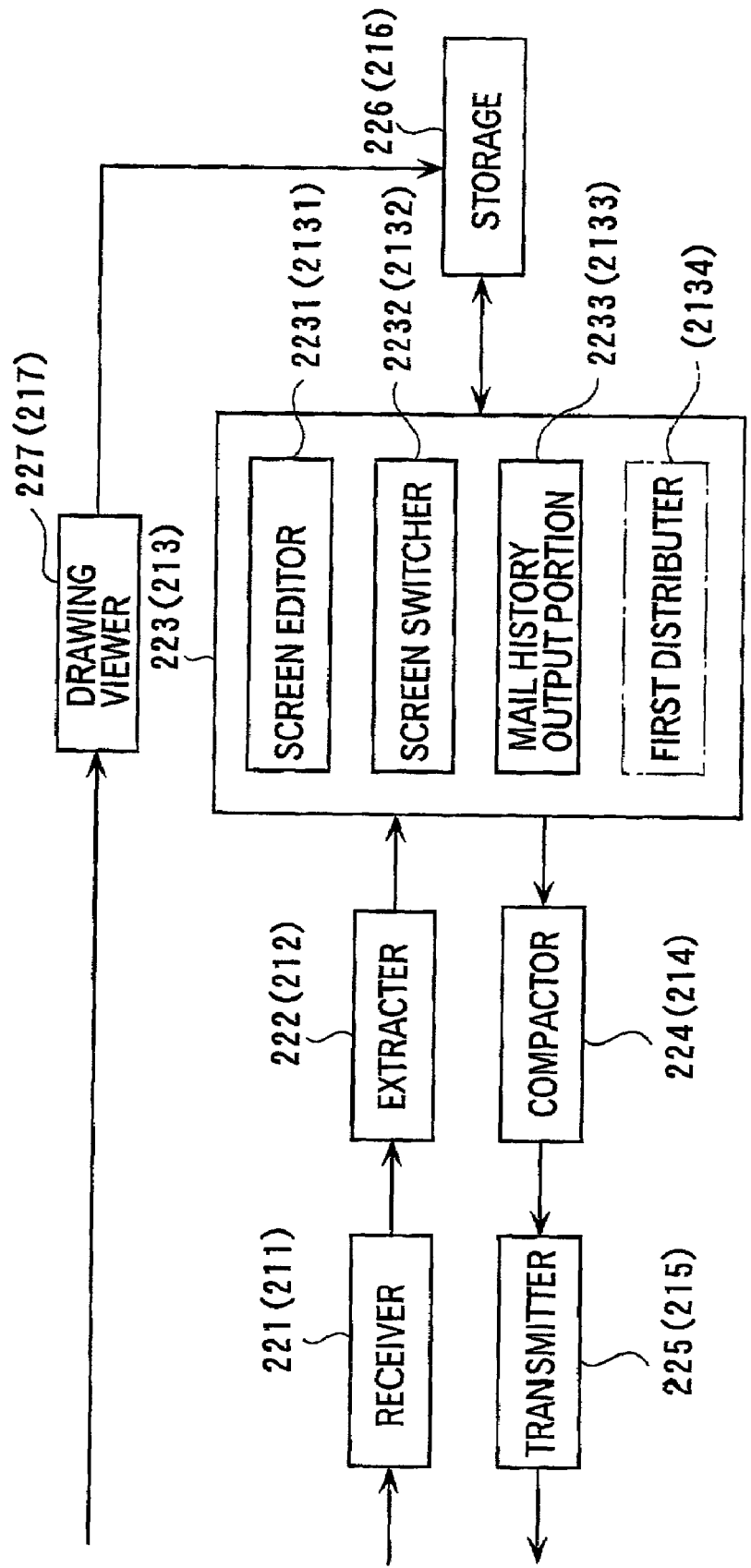
FIG. 15 is a block diagram to show network terminals used in the second embodiment.

The network terminal 220 is constituted of a personal computer including a mouse and key-board, in addition to a display 220A. As shown in FIG. 15, the network terminal 220 comprises a mail receiving means 221 to receive an electronic mail from server 210 via network 202; a mail decompressing means to decompress an electronic mail received; a mail preparing means to prepare an electronic mail, or to prepare a return mail in response to a mail received; a compressing means to compress a file-converted electronic mail; a transmitting means 225 to send the electronic mail to the server 210; and a memory means 226 to serve as a recording medium consisting, for example, of a hard disk.

The mail preparing means 223 comprises an image processing means 2231, image display switching means 2232 and mail history displaying means 2233, in addition to the means to execute basic mail function. The functions of those means 2231 to 2233 will be described later.

The means 221 to 225, and 2231 to 2233 consist of software packages stored in the memory means 226, and are fetched as appropriate to be executed on CPU. The mail software (mailer) used in this system 201 is constituted of those software packages.

The network terminal 220 comprises a drawing display means 227. The drawing display means 227 is a software package which, if provided with the title of a drawing, locates the drawing in the drawing table 2102 stored in server 210, and causes the display 220A to present the drawing, or, if the user selects any desired title of drawing, locates the drawing in the drawing table 2102 and causes the display 220A to present it.

The network terminal (not illustrate here) of the manufacturer also comprises the means 211 to 217 and 2131 to 2133 same in basic functions with those attached to the terminal 220 of the sales agent (FIG. 15), and further comprises an initial software delivering means 2134 attached to the mail preparing means 213 as shown by the dot-dash line of FIG. 15. The function of this initial software delivering means will also be described later.

[Operation of the Second Embodiment]

Figure 16:
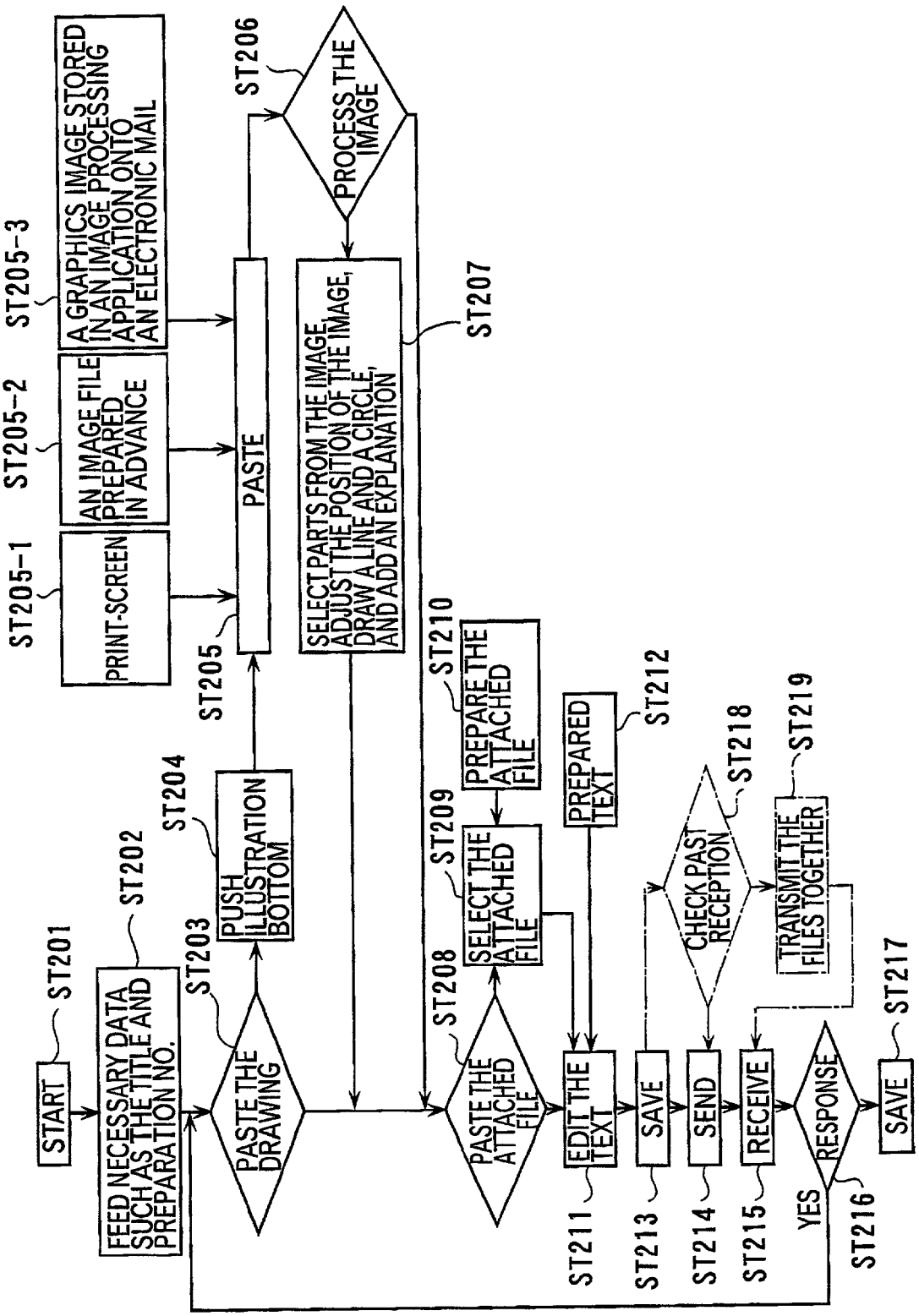
FIG. 16 is a flowchart to show the flow of signals during the preparation, transmission and receipt of an electronic mail in the second embodiment.

FIG. 16 shows a flowchart of the main procedures required for the exchange of electronic mails. FIGS. 17 to 29 show the contents presented on the display 220A of the sales agent, while FIG. 30 the contents displayed at the manufacturer's terminal.

Description will be given below with reference to FIGS. 16 to 30 based on a case, for illustration, where a user finds a failed part in her construction machine, and the sales agent who sold her the machine tries to inform the manufacturer of the machine of the failure by sending him an electronic mail via this system 201.

Figure 25:
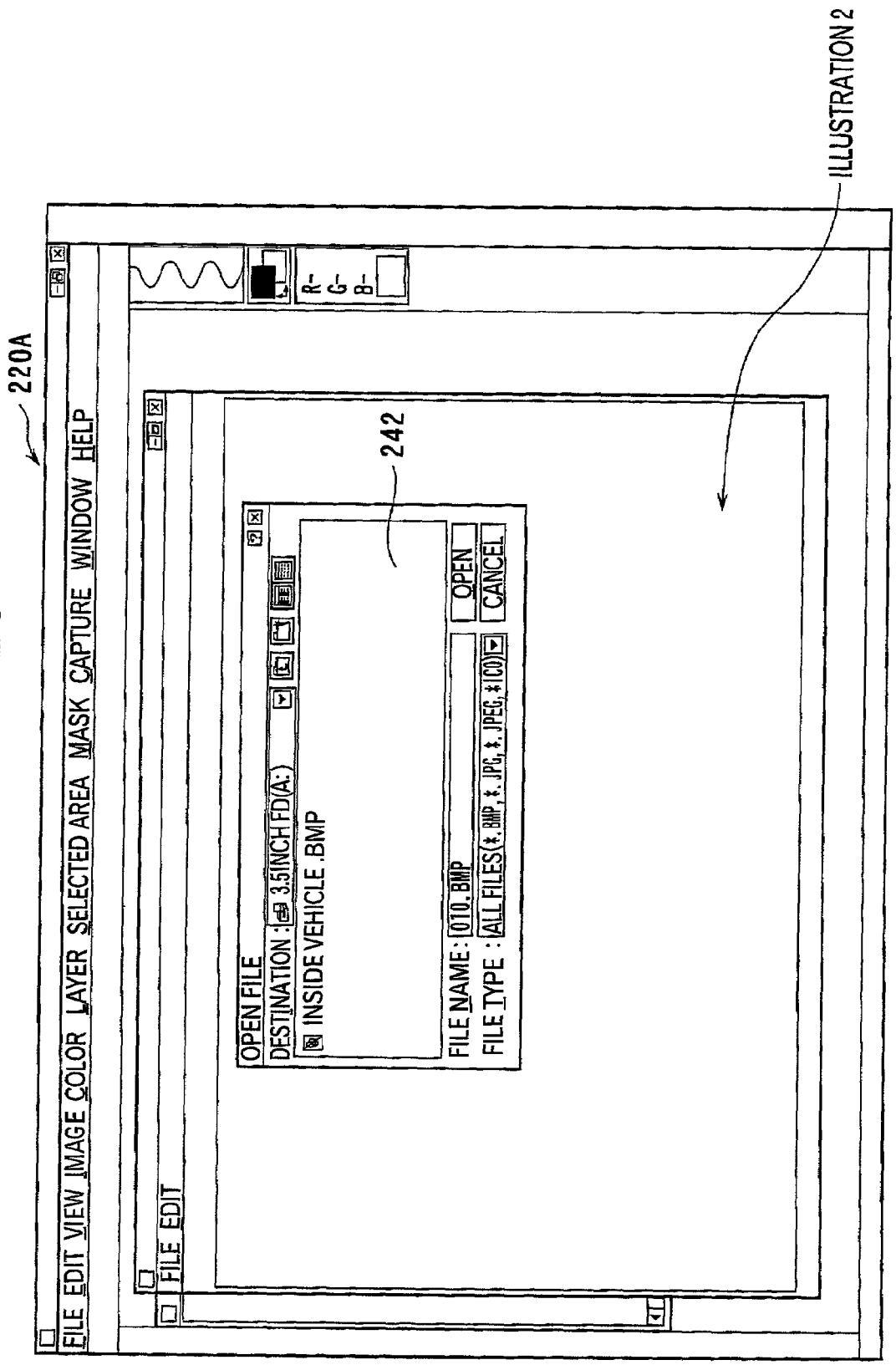
FIG. 25 illustrates how an existent image file is pasted onto another image applicable area at a terminal in the second embodiment.

The customer service personnel of the sales agent checks the failure by, for example, visiting the user and watching the failure himself, and then tries to have a drawing containing the graphics image of the failed part on the display 220A of the network terminal 220, before he prepares an electronic mail about the failure. For this purpose, he boots up the drawing displaying means 227 at the network terminal 220 (FIG. 25).

The drawing displaying means 227 gains access to the network server 210, locates the title of the desired drawing in the drawing table 2102 stored in the memory means 101, fetches the graphics data related with the title, and causes the display 220A to present the graphics image of the drawing specified by that title. Next, the customer service personnel finds the graphic image of a part giving the same profile with that of the failed part, identifies the name of the failed part by reading the name attached to the graphics image, and selects the name by pointing and clicking with a mouse. FIG. 17 shows how "hydraulic tank" is selected as the name of a desired part.

Then, the drawing displaying means 227 downloads the graphics data corresponding with the selected name from the drawing table 2102 at server 210, and stores them in its memory means 226, and causes display 220A to present the drawing 230 carrying the graphics data.

According to this embodiment, the parts data of all the parts depicted in drawing 230 are also displayed as included in the parts table 231 together with drawing 230. Namely, the data of a part including the ID No. and name of that part are stored in advance in the parts table of the drawing which contains the graphic data of that part; and when the name of that part is selected, the parts information correspondent with that name is also displayed as listed in a parts table 231.

Figure 18:
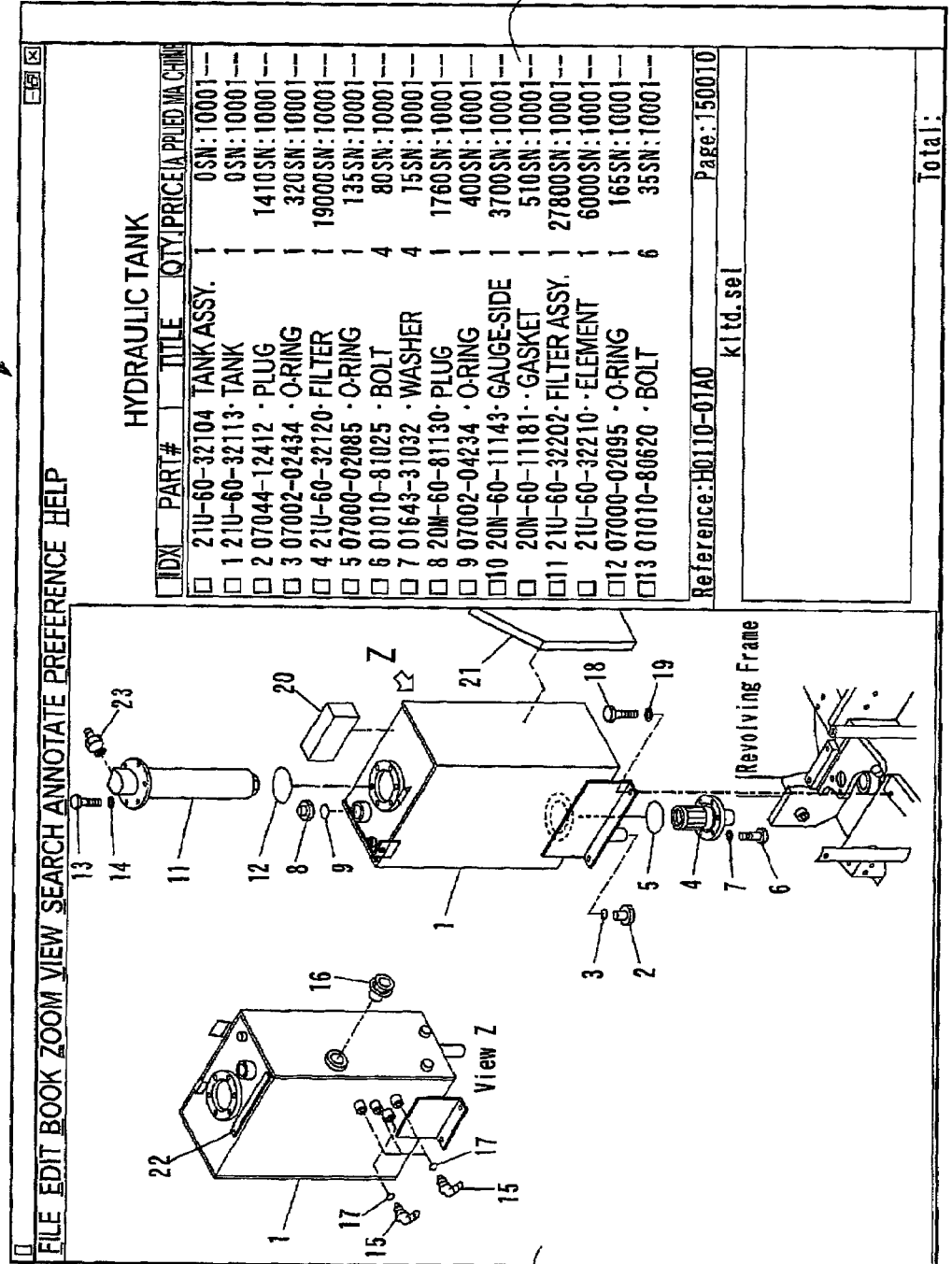
FIG. 18 illustrates how a drawing is displayed on a terminal in the second embodiment.

When a print-screen-button (not illustrated here) is pressed at the state as depicted in FIG. 18, the display is temporarily stored as an image data in a memory means 226 (for example, in a clip-board).

What is described above is a preparatory step necessary for making an electronic mail. The system which causes the display 220A of the sales agent to present drawings is not solely for the preparation of electronic mails, but is based on an existent system such as a drawing searching system or parts information searching system commonly utilizable between the manufacturer and the sales agent. This system incorporates such an existing system for preparing electronic mails.

Accordingly, if the system does not incorporate such a system, it will be necessary for the sales agent to search through documents such as parts catalogues, locate the image of a required part, read the image with a scanner to convert it into digital data, and store the data into the memory means 226.

However, if the sales agent sketches himself the outline of a desired part on a mail preparing display as described later, the above preparatory steps will be omitted.

At ST 1 of FIG. 16 ("step" will be represented by "ST" in the following figures and texts), an electronic mailing system is booted up; "preparing a new mail" is selected; and then a mail preparation display 241 appears on the monitor 220A as shown in FIG. 19.

On this display, the customer service personnel of the sales agent feeds necessary data such as the title, preparation No., date of preparation, name of company, etc. (ST 202 of FIG. 17).

If he wants to paste an image of the part extracted from the drawing onto the mail, the customer service personnel selects "Illustration 1" or "Illustration 2" on the bottom of the display (ST 203).

In this embodiment, description will be given on the assumption that "Illustration 2" is selected.

Figure 20:
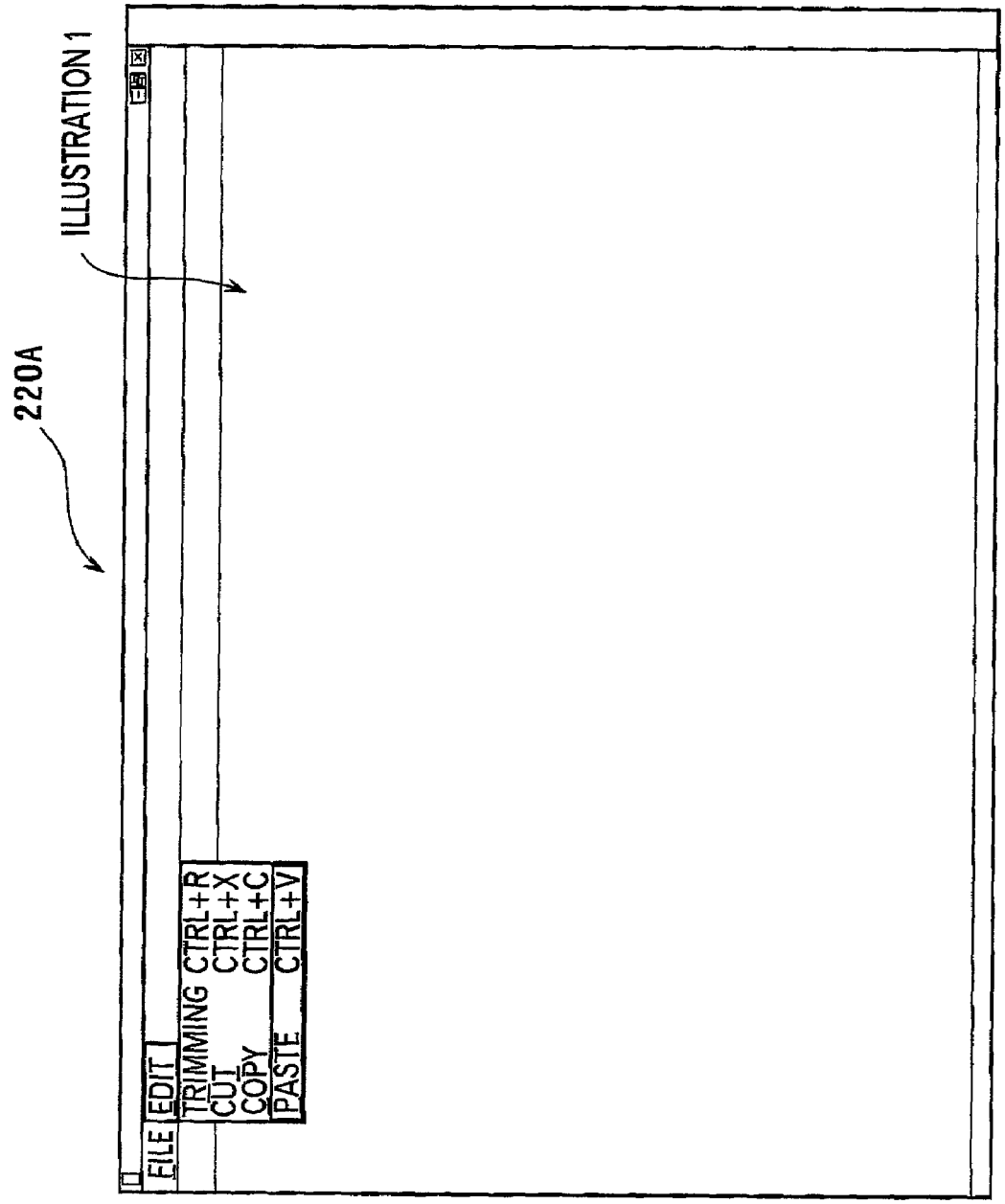
FIG. 20 illustrates how an area to which an image is to be pasted is expanded at a terminal in the second embodiment.
Figure 21:
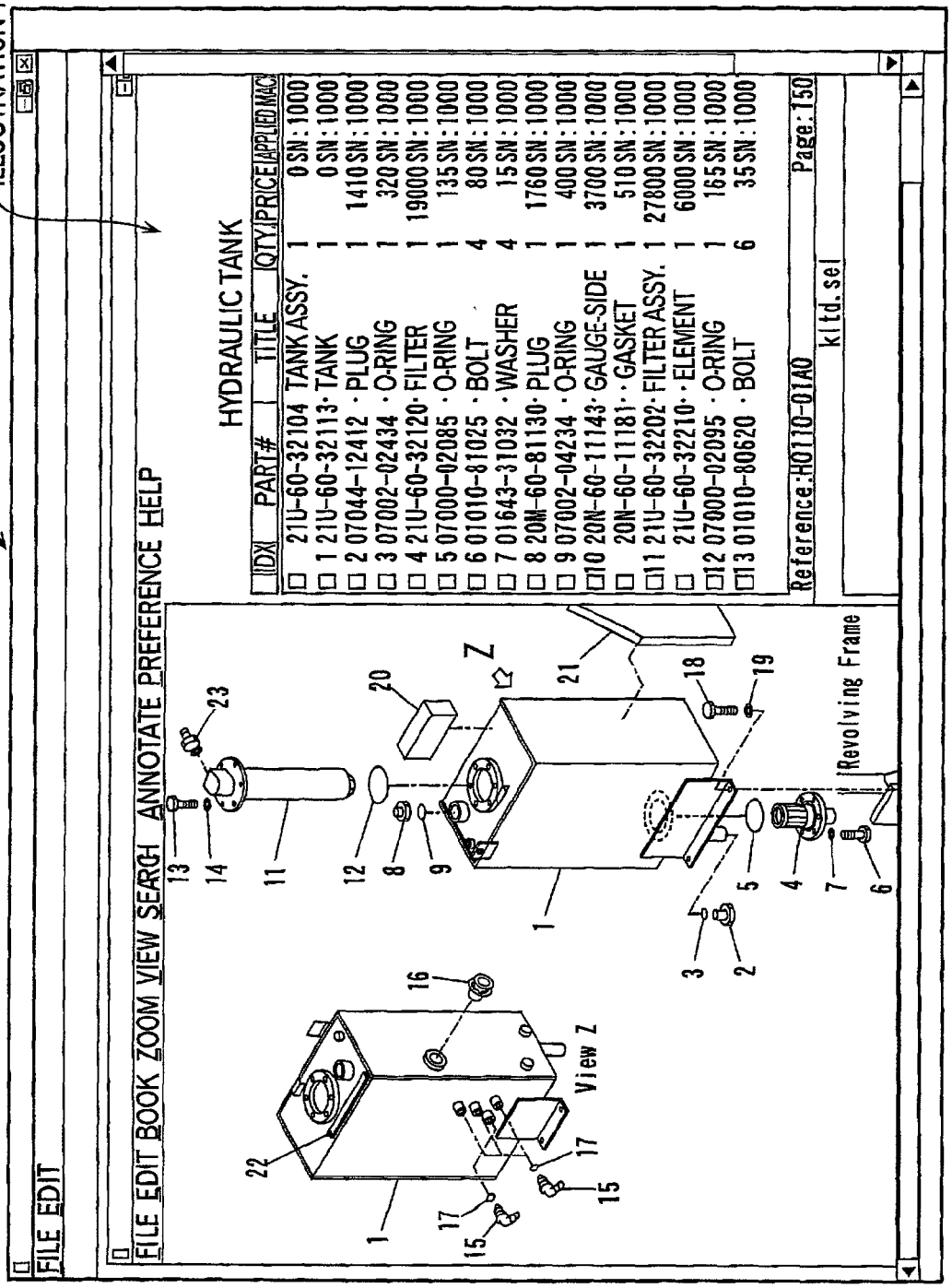
FIG. 21 illustrates how an edited drawing is pasted onto the image applicable area in the second embodiment.

When "Illustration 2" is selected, the image display switching means 2232 of the mail preparing means 223 expands the display area of "Illustration 2" as shown in FIG. 20. The customer service personnel selects "Pasting (P)" from "Editing" of the menu bar.

Then, the image processing means 2231 fetches the graphics data stored in the memory means 226 and places the graphic image in the display area to automatically paste the image onto the mail (ST 205, ST 205-1).

Later, the personnel determines whether or not the image (graphics) displayed in "Illustration 1" should be processed.

Figure 22:
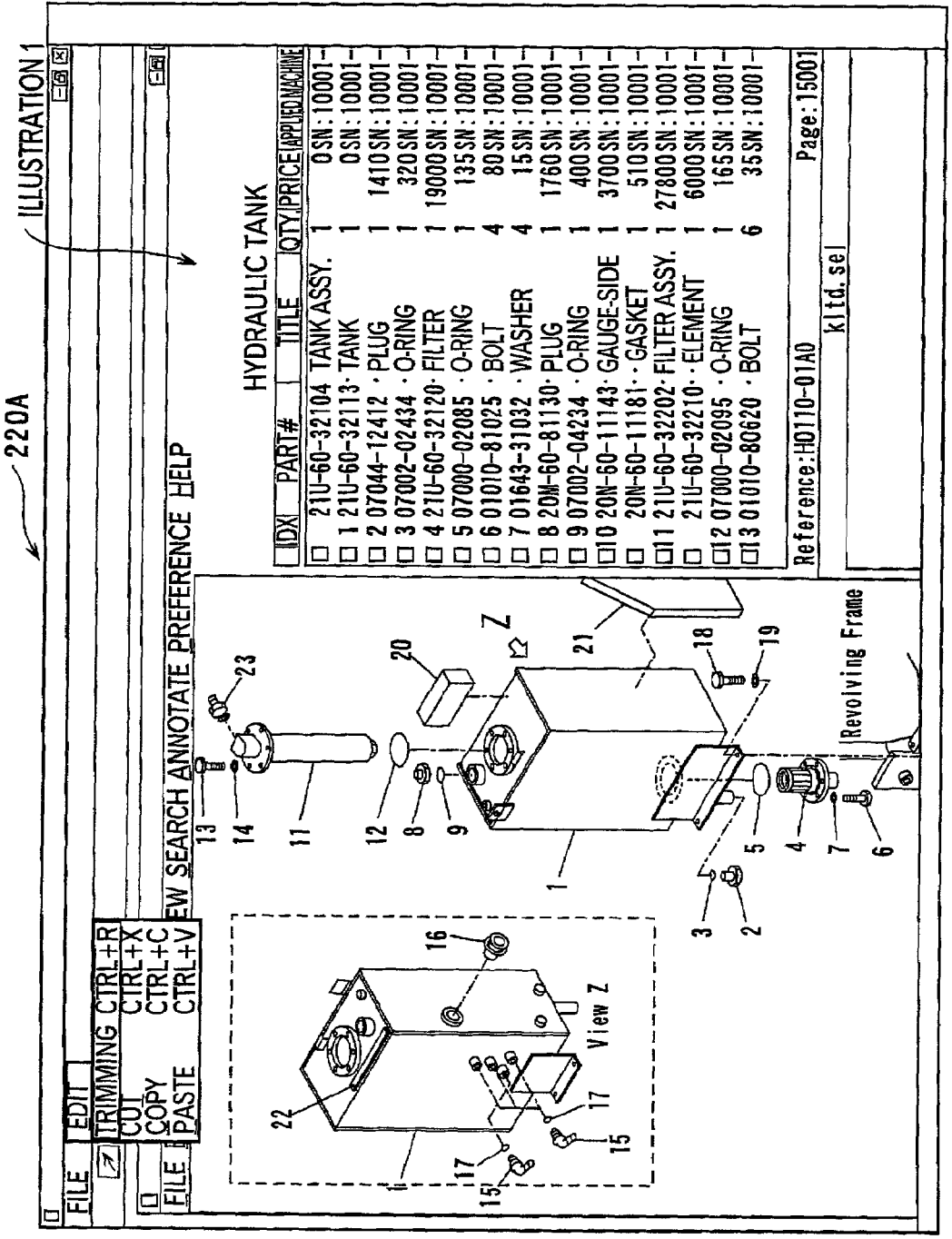
FIG. 22 illustrates how the drawing is trimmed on the screen at a terminal in the second embodiment.
Figure 23:
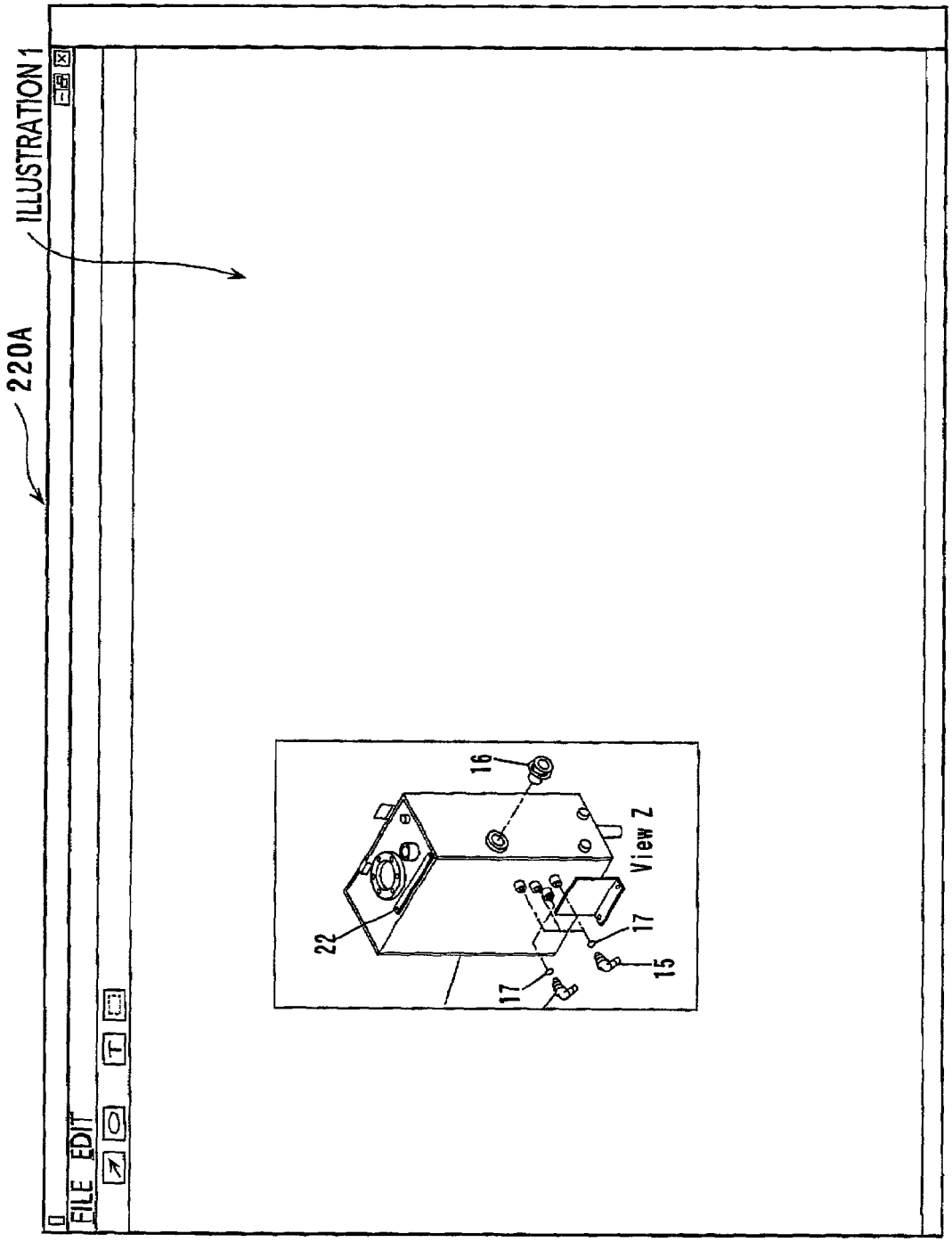
FIG. 23 illustrates how the trimmed drawing appears on the screen at a terminal in the second embodiment.

If the personnel wants to process the image, for example, to extract necessary parts from the image, thereby removing unnecessary parts, he may surround necessary parts with dotted lines using a function as represented in the tool bar, and select "Trimming (R)" from the menu bar "Editing" as shown in FIG. 22. Through this operation, only an image of the part that gives the same profile with the failed part is left as shown in FIG. 23. Then, the personnel, using the functions derivable from the tool bar, surrounds the failed site with dots, or adds an explanation of the failure with arrows introduced as needed (ST 207).

Figure 26:
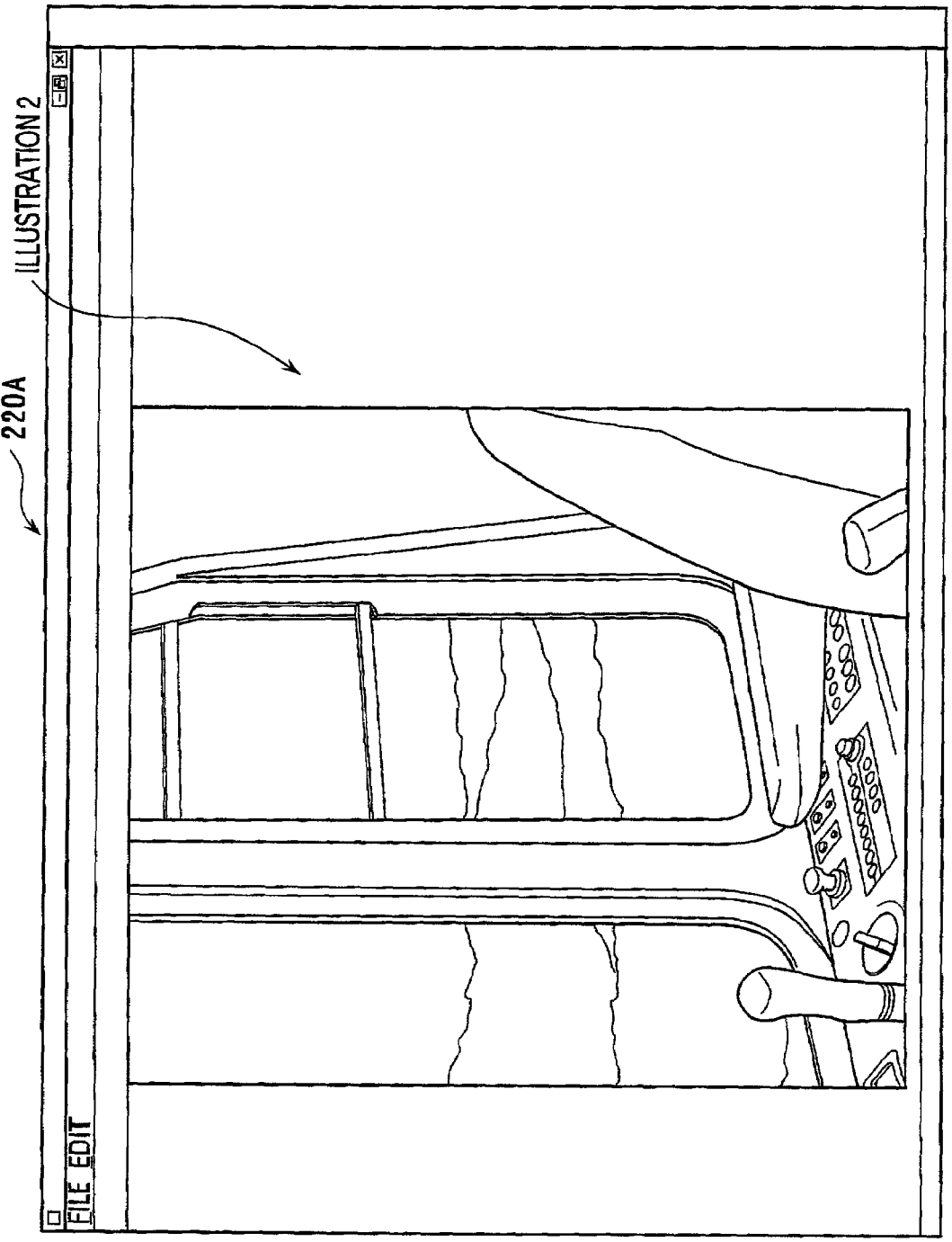
FIG. 26 illustrates how a processed image is pasted on another image applicable area in the second embodiment.

As shown at ST 205-2 and ST 205-3, it is possible to paste an image file prepared in advance, or a graphics image stored in an image processing application onto an electronic mail. FIG. 25 shows a case where an image stored in advance in the memory means 226 is pasted on "Illustration 2." Firstly, the personnel selects "Illustration 2" on the display as shown in FIG. 19, to expands it, and then fetches an image file "Insidecoach.bmp" from its storage place. Then, as shown in FIG. 26, an image based on the fetched image file is automatically pasted on the display area. Then, the image is processed as appropriate.

Figure 24:
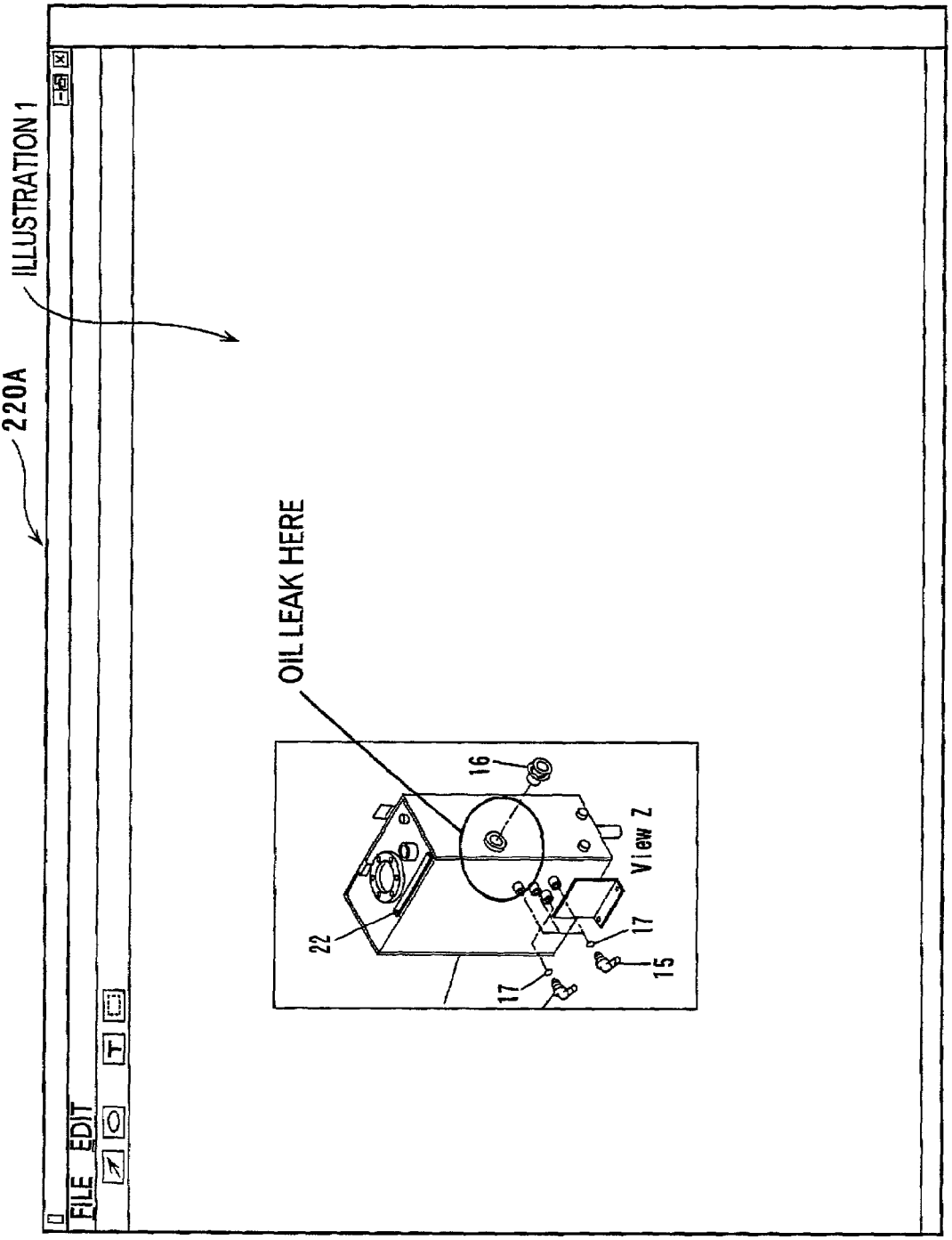
FIG. 24 illustrates how the edited drawing appears on the screen at a terminal in the second embodiment.
Figure 27:
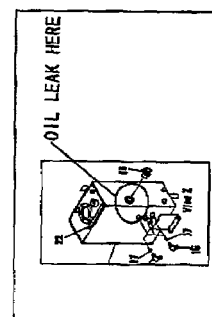
FIG. 27 illustrates how a mail is prepared which includes the edited drawing and processed image at a terminal in the second embodiment.

When pasting and processing of the image is completed, and the personnel selects "Completion" from "File" of the menu bar, the image processing means 2231 causes the monitor to present the original mail preparing display 241 as shown in FIG. 27. However, the display areas "Illustration 1" and "Illustration 2" now reduced in size by the image display switching means 2232 represent the pasted images as they are reduced in size. Such miniature display is achieved by extracting part of the original image data. The contracted image is often undefinable in details. So, if the personnel selects any one desired display area, the image display switching means 2232 expands the image in the selected display area as shown in FIGS. 24 and 26 (so-called thumb-nail function).

If the personnel wants to attach a previously prepared file to an electronic mail (different from the simultaneous delivery as described in claim 2), he may drag the file into a file attachment port 243 on the mail preparing display 241 using a mouse (STs 208, 209 and 210).

The personnel may write a comment in a text preparation port 244 of FIG. 27 such as a description of the failure of the part. Introduction of a comment may occur at any timing. Namely, it may occur before the processing of the image is introduced. A comment chosen from a previously prepared file may be pasted onto the text preparing port 244 (STs 211 and 212).

Figure 28:
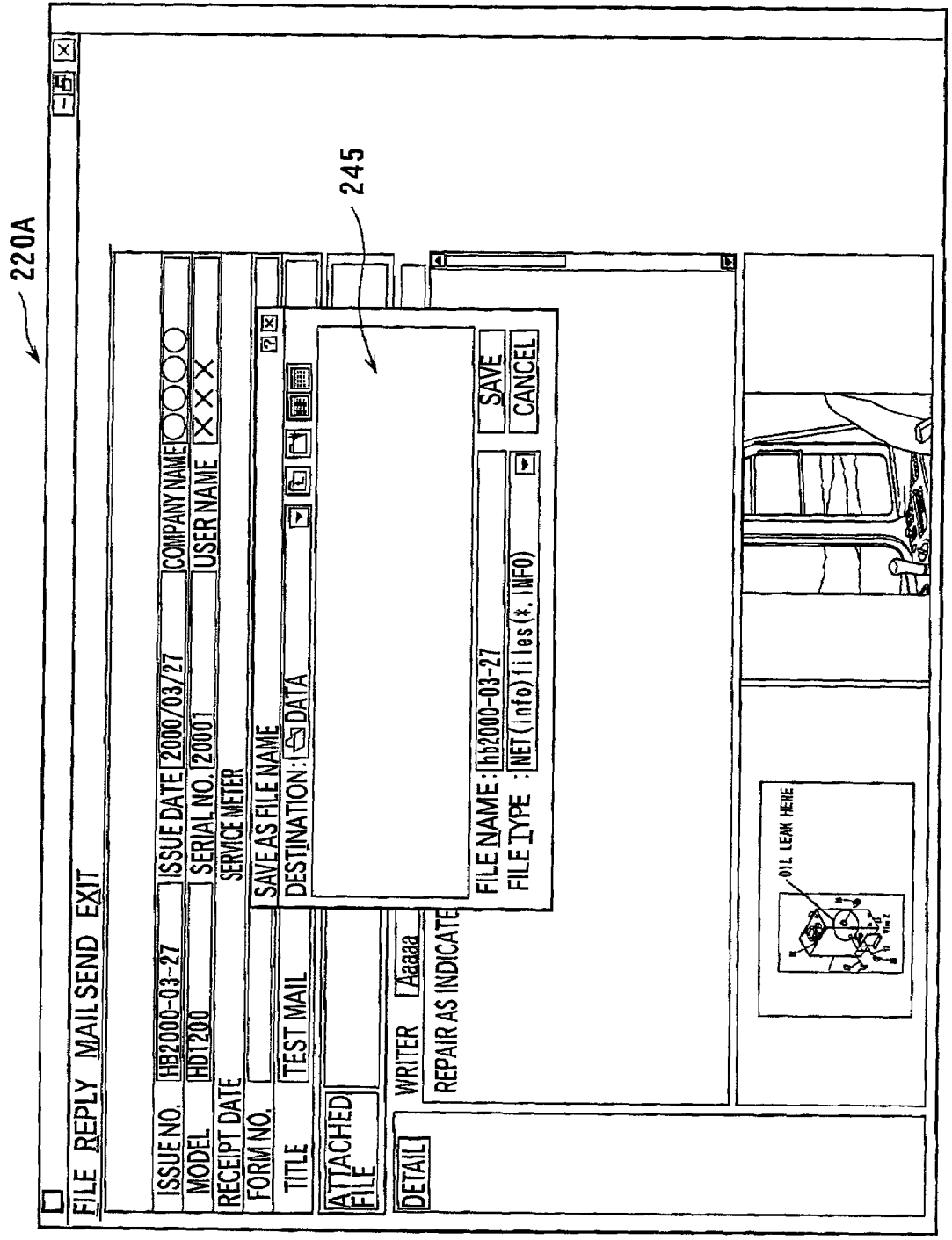
FIG. 28 illustrates how the content of the mail prepared as above is stored in the second embodiment.

If the personnel prepares a draft of mail, he selects "Mail transmission (M)" of the menu bar, and performs necessary operations for transmission. Then, as shown in FIG. 28, a window 245 for file saving is opened. The personnel attaches an appropriate name to the text just prepared, to convert it to a file, and stores it in the memory means 226 (ST 213).

Figure 29:
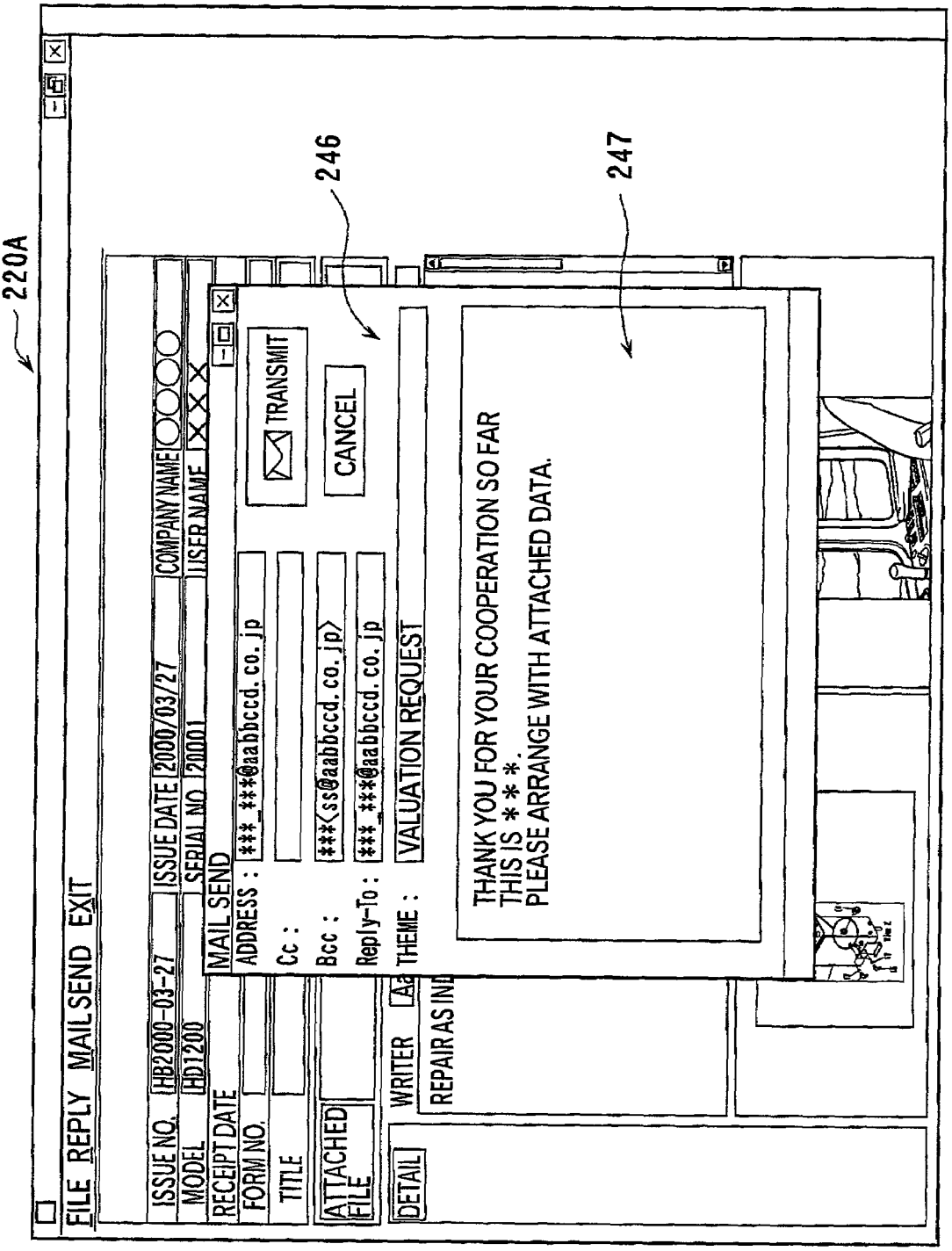
FIG. 29 illustrates how a mail is transmitted in the second embodiment.
Figure 31:
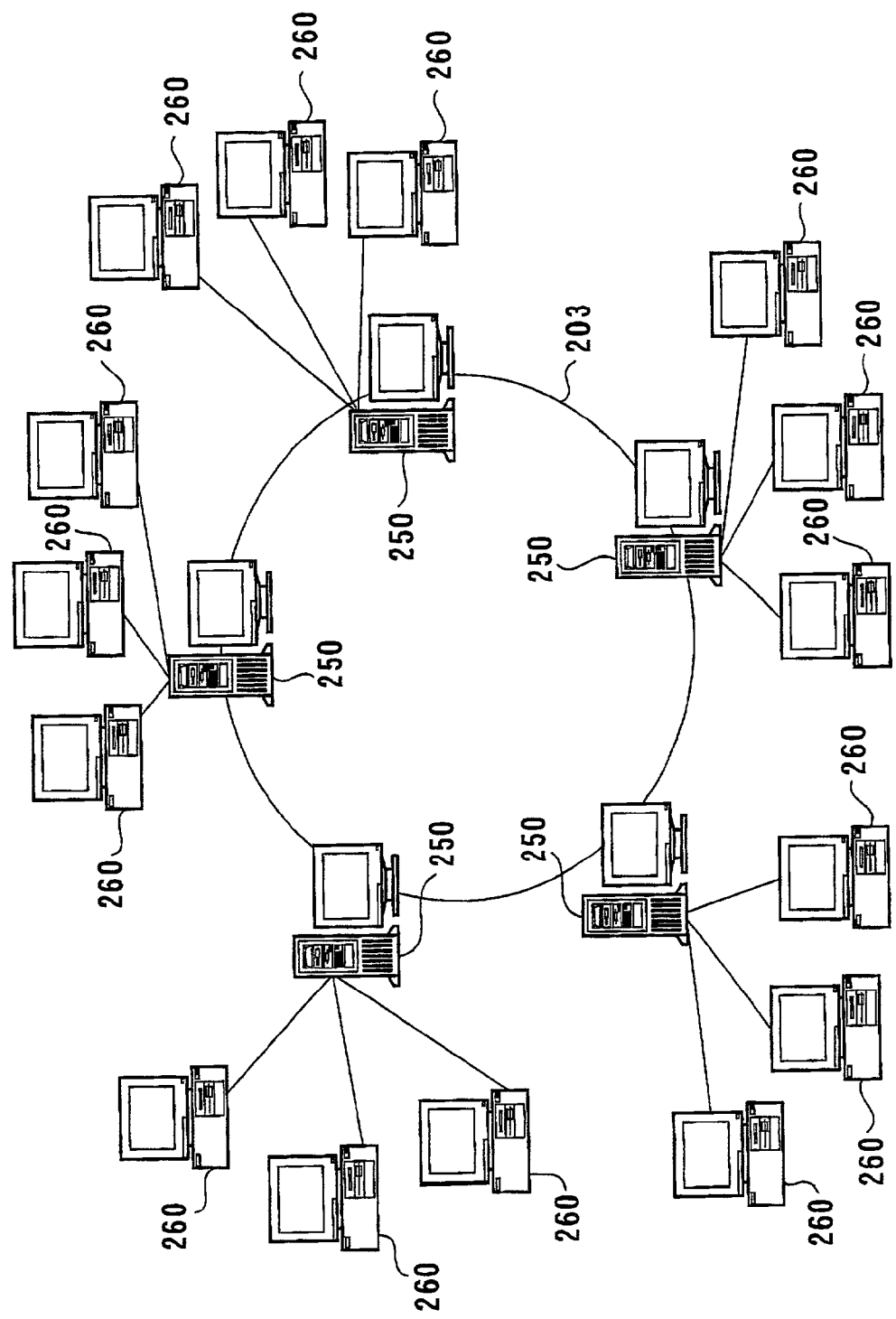
FIG. 31 is a schematic diagram to show a variant of the second embodiment.

Then as shown in FIG. 29, a window 246 is opened by which the header of the mail is prepared. The personnel enters necessary data such as the address of the receiver, the theme of the mail, etc. in the window. The window 246 may store the addresses of customers. If the sender has a limited number of customers, and has registered the addresses of those customers in the window, it will be possible for the sender to obtain necessary data by opening the window, and to dispense with the need for entering the necessary data each time he must send a mail to his customer. The window 246 has a salutation preparing port 247, and the personnel writes a salutation into this port 247.

Then, the personnel selects "Transmission" in window 246, the electronic mail is delivered to the address of the receiver stored in server 210 (ST 214).

Before delivery, the electronic mail converted to a file at ST 213 is compressed by the compressing means 224 as shown in FIG. 15; and the compressed file has the header as presented in window 246 attached. The transmission log of the electronic mail is stored in the memory means 226.

These are the steps the sender of a mail or the sales agent must take before he sends an electronic mail.

Then, the terminal of the mail receiver or the manufacturer, if it finds a mail in its mailbox at server 210, receives the mail from server 210 and opens it (ST 215).

During this operation, the mail receiving means 211 and decompressing means 212 at the manufacturer's terminal are booted up; the compressed file is automatically decompressed; and the electronic mail as shown in FIG. 27 is displayed subsequent to the header.

The sales personnel of the manufacturer reads the text of mail, studies the images in "Illustration 1" and "Illustration 2" by expanding them, understands the failure accurately, and finds a proper solution.

Then, the staff of the manufacturer discuss whether or not a response should be sent to the sender or the sales agent (ST 216).

If they decide not to send a response, the mail is stored as it has been received (ST 217).

If they decide to send a response, the sales personnel selects "Preparing a response" of the menu bar. Then, the mail preparing means 213 at the manufacturer's terminal causes the monitor to present a return mail preparing display 248.

The mail history displaying means 2133 causes the mail preparing display 248 to give a mail data port 249, and to write "Return mail-1" in that port to indicate the currently prepared mail is the first return mail. The mail history displaying means 2133 attaches "Return mail-2," "Return mail-3," in order to subsequent return mails each time they are dispatched, and if the user selects, for example, "Return mail-1," using a mouse, the corresponding electronic mail will be displayed.

Turning back to ST 203 of FIG. 16, a return mail is prepared by the same procedures as described above, and the resulting mail is sent to the sales agent.

When the manufacturer sends an electronic mail to the sales agent, the initial mail delivery means 2134 is booted up. The initial mail delivery means 2134 asks through display to the sales personnel of the manufacturer whether or not the sales agent or the receiver of the mail has received a mail from the manufacturer (represented by a dot-dash line of FIG. 16, ST 218).

If the sales personnel finds the sales agent has received a mail from the manufacturer, he selects "Yes" on display. In this case, the electronic mail is delivered to the address of the sales agent stored in server 210.

If the sales personnel selects "No" on display, the initial mail delivery means 2134 delivers, as well as the electronic mail, software packages equivalent in function with the decompressing means 212, mail preparing means 213 and compressing means 214, and software necessary for installing those packages (ST 219).

The sales agent, provided that he installs the software packages thus delivered into his terminal, will be able not only to open the electronic mail, but to freely utilize the present system 201. Incidentally, the sales agent can safely receive such software packages using a conventional electronic mailing system he employs.

[Advantages of Second Embodiment]

This embodiment having features as described above will ensure following advantages.

(1) According to the electronic mailing system 201, the mail preparing system 213, 223 comprises an image processing means 2131, 2231, and thus it is possible for the system to easily process an image on the mail preparing display 241, 248, even if it has no application software specially adapted for image processing.

Further, because even a network terminal having no such application software can easily process an image, this system has a sufficiently universal applicability.

According to this system with such a feature, it is possible for the sales agent to quickly and accurately inform the manufacturer of the failure such that the manufacturer can take a proper action promptly.

(2) Because the electronic mailing system 201 comprises a decompressing means 212, 222 to decompress a file-formatted electronic mail, and a compressing means 214, 224, the mail will be speedily transmitted or received by being simply compressed as a file, and will be securely opened by the receiver.

(3) Because the manufacturer's terminal comprises the initial software delivering means 2134, it will be possible even for the sales agent that has no experience in receiving electronic mails, to open a mail received through this system, by installing software packages delivered together with the mail via the initial software delivering means 2134, and to henceforth transmit/receive electronic mails on this system with an ability to freely process an image attached to the mail.

(4) Because the electronic mailing system 201 comprises the mail history displaying means 2133, 2233, it is possible to cause the mail data port 249 on the mail preparing display 241, 248 to present the history of electronic mails.

Further, because the mail data port 249 allows the sales agent to select any previously dispatched mail (for example "Return mail-1") displayed in it, so that the sales agent can confirm the content of the mail, and thus can instantly confirm the mails exchanged in the past with the manufacturer, it improves the convenience of this system 201.

(5) Because an image, for example, of a failed part pasted in "Illustration 1, 2" on the mail preparing display 241 is freely enlarged or contracted by the image display switching means 2132, it is possible to enlarge the image sufficiently to allow the viewer to accurately grasp the detail of the failure, and to contract the image sufficiently not to lie over the text preparing block 244 so that the viewer can read the text in the block without being disturbed by the image.

(6) Because the image pasted in "Illustration 1, 2" is an image derived from graphics data downloaded from the memory of server 210, or from a file fetched from the memory means 226, it will be unnecessary to prepare a photo or drawing, and apply a scanner onto it to convert it into digital data, or to draw an image by hand in "Illustration 1, 2," which will make it easy to insert an image in the text of a mail.

(7) Because at ST 205-3 of FIG. 15, it is possible to extract image data from a digital camera or from a digital video camera to paste them in "Illustration 1" or "Illustration 2" on the mail preparing display 241, it will be possible for the sales agent to take a photo of the failed part using such a camera or video camera, and to insert the image data therefrom into the mail. This will make it possible for the sales agent to send a more real image of the failure so that the manufacturer can take a more proper action for it.

[Variant of Second Embodiment]

The electronic mailing system of this invention and method for transmitting/receiving mails is not limited to the second embodiment, but may include other variants such as the following one.

In the above embodiment, the mail preparing display includes two areas where pasting of images is achieved, that is, "Illustration 1" and "Illustration 2." However, such areas may be one or three or more, or any desired number appropriately selected.

In the above embodiment, description was given with respect to the system where the terminals 220 of a plurality of sales agents and the terminals (not illustrated here) of a plurality of manufacturers are connected to a server 210 on the side of the manufacturers, and mails are exchanged between the sales agents and the manufacturers. This mailing system 201, however, may be used for the exchange of mails between different sales agents.

The electronic mailing system of this invention may comprise a plurality of network servers 250 distributed over a wider network 3, each server 250 comprising a plurality of network terminals.

On the contrary, this system constructed between two personal computers connected with each other on an on-line basis is included in this invention.

In summing up, provided that a plurality of terminals are connected with each other via a network; and the mailing software according to this invention is installed in every terminal thereby forming the system of this invention, the resulting system is included in this invention, regardless of the size and shape of the network.

Accordingly, the image to be processed may be from any desired product, and any image other than that of a product can be pasted on the electronic mail.

The network terminal to be connected to the electronic mailing system of this invention may include, in addition to personal computers, for example, portable telephones and PDAs (portable digital assistants) having a browser function. Such a terminal allows the user to gain access to the network to utilize the present system, even if the user is at a construction site where no commercial communication lines or power lines are available.

The recording medium to be incorporated in this invention may include, in addition to a hard disk to form a memory means of a network terminal, an optical disk which may be used for storing programs to be installed in the hard disk, or, in short, any recording medium that can store the computer programs necessary for running this system.

[Third Embodiment]

FIGS. 32–55 show a parts check list preparing system representing a third embodiment of this invention.

Outline of the System

Figure 32:
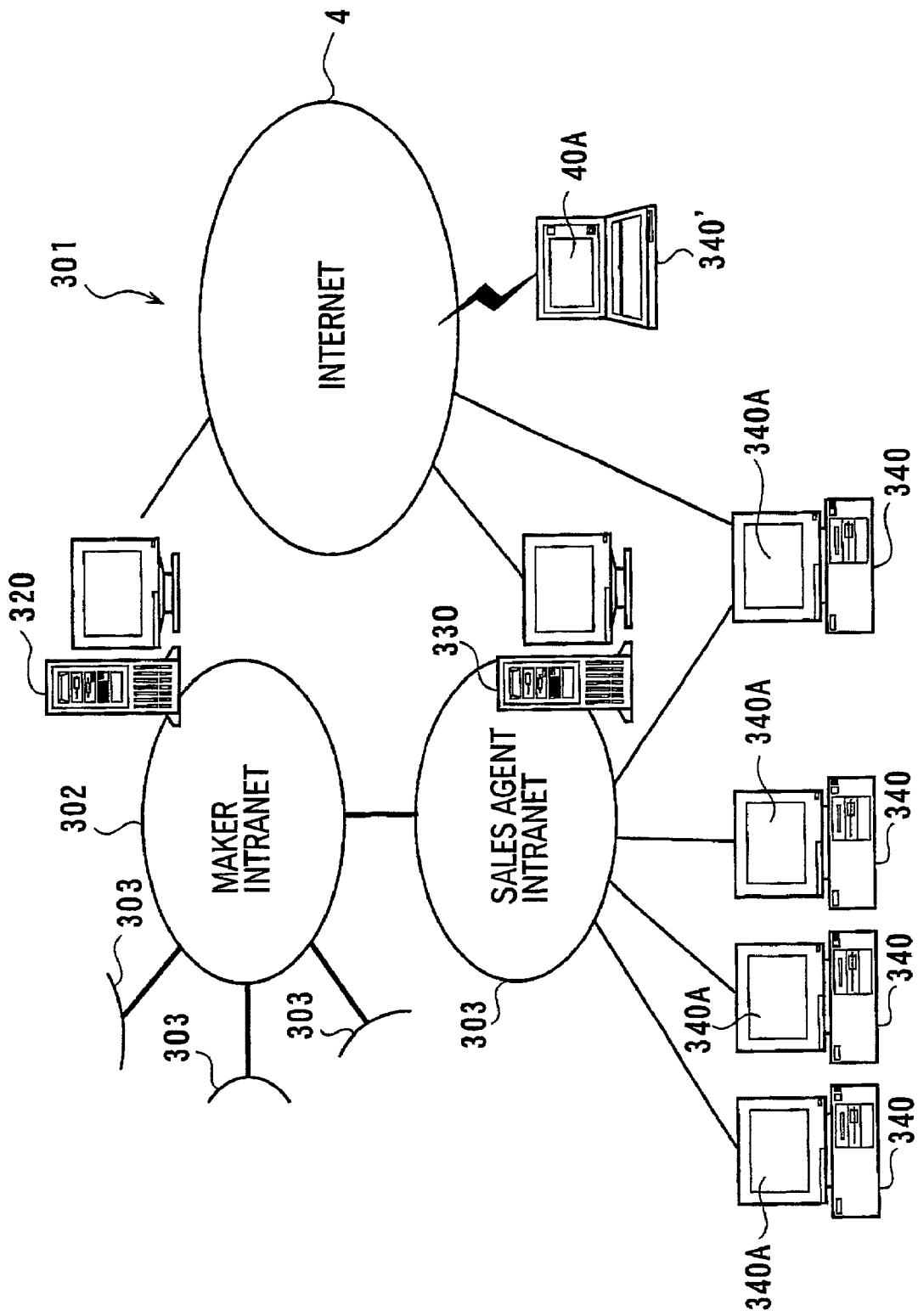
FIG. 32 is a schematic diagram to show the outline of a parts check list preparing system representing a third embodiment of this invention.

The parts check list preparing system 301 shown in FIG. 32 is a system by which to prepare a parts check list of the parts of a construction machine, and is intended for the user having a construction machine, and the sales agent dealing with the sale of such construction machines and their parts. Specifically, the user uses this system for preparing a parts check list when requesting an estimate or giving an order, while the sales agent uses this system for preparing a parts check list when being asked to give an estimate from a user, or when ordering parts from the manufacturer.

The parts check list preparing system 301 works based on a computer network comprising an intranet 302 or in-house network established in the premise of manufacturer, an intranet 3 or similar in-house network established in the premise of sales agent, and Internet 304 established over the public telecommunication lines.

To the manufacturer's intranet 302 are connected a manufacturer's host computer 320 and the intranets 3 of a plurality of sales agents. The host computer 320 serves as the network server of the manufacturer's intranet 302 to provide data necessary for running the parts check list preparing system 301. To the manufacturer's intranet 302 are connected a plurality of manufacturer's network terminals (not illustrated here).

To the agent's intranet 3 are connected an agent's server 330 serving as the network server, and a plurality of user's network terminals 40 (user terminals hereinafter). The agent server 330 also serves as an agent to provide data necessary for running the parts check list preparing system 301, and achieves similar functions as does the host computer 320. To this agent's intranet 3 are connected a plurality of agent's network terminals (not illustrated here).

The host computer 320 is more apart from the user terminal 340 in terms of the communication distance while the agent's server 330 more close to the user terminal 340. The user terminal usually gains access to the agent's server 330 more close in communication distance. Namely, usually the agent's server 330 serves, for the user terminal, as a so-called clone server of the host computer 320, which makes it possible for a parts check list to be prepared under a communication state ensuring a good response.

The host computer 320, agent's server 330, and user terminal 340 all contain a browser (viewer) applicable to the networks. Therefore, provided that the user terminal 340 has a password authorizing the entry to this system, and contains the browser and software necessary for preparing a parts check list, that terminal, even if it is not connected to the intranets 302 and 303 but only to Internet, will be able to utilize the present parts check list preparing system 301 by gaining access via its provider to the host computer 320 and agent's server 330.

The host computer 320 and agent's server 330 further have a mail server function. Manufacturer's terminals, agent's terminals and user terminals (not illustrated here) connected to the intranets 302 and 303 all contain a mailing software package, and thus a parts check list prepared by a given terminal can be transmitted to any other terminals.

Agent's Server

The composition and the functions of the agent's server 330 to which accesses from user terminals 340 are principally made will be described at first.

Figure 33:
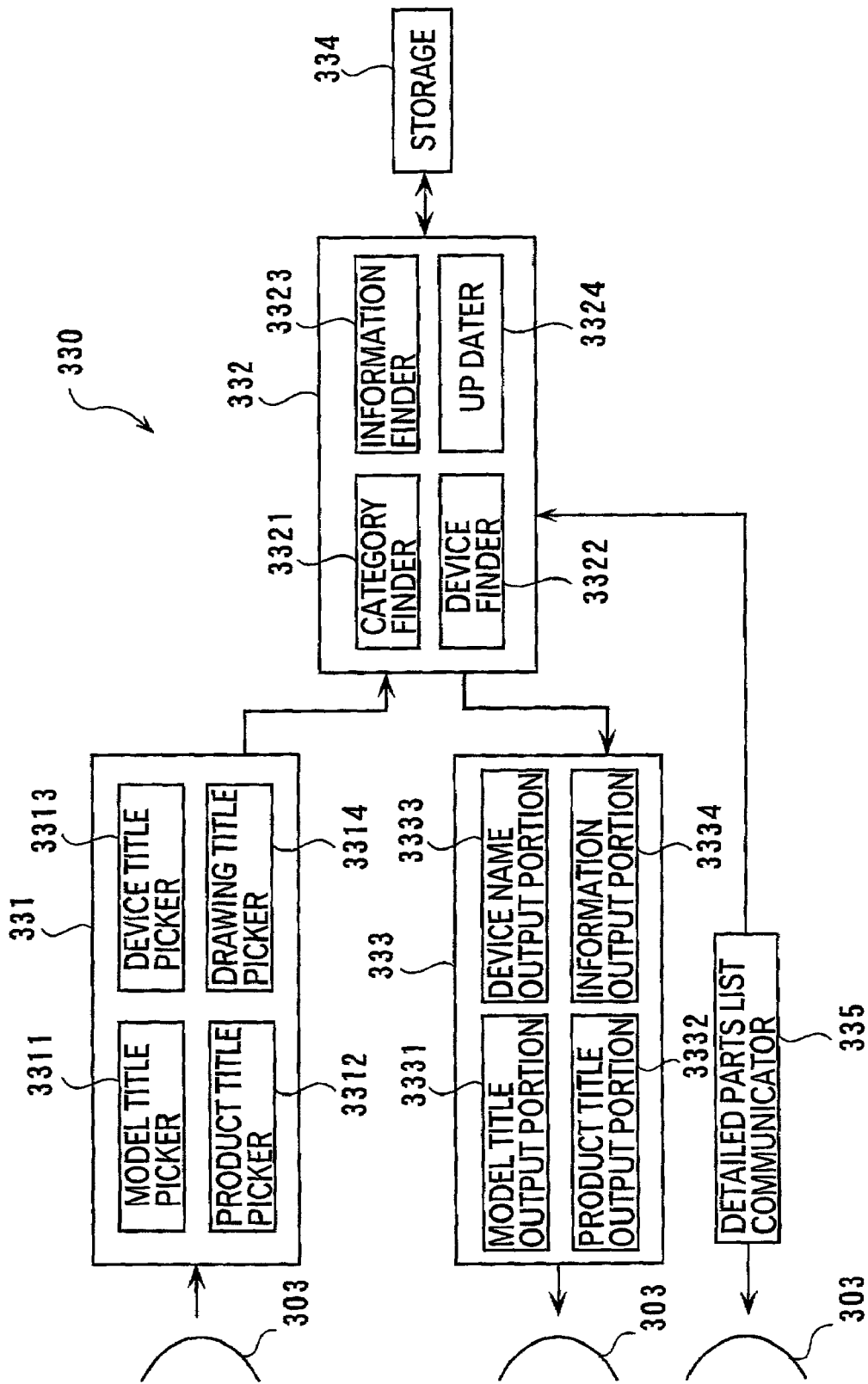
FIG. 33 is a block diagram to show a retailer server in the third embodiment.
Figure 35:
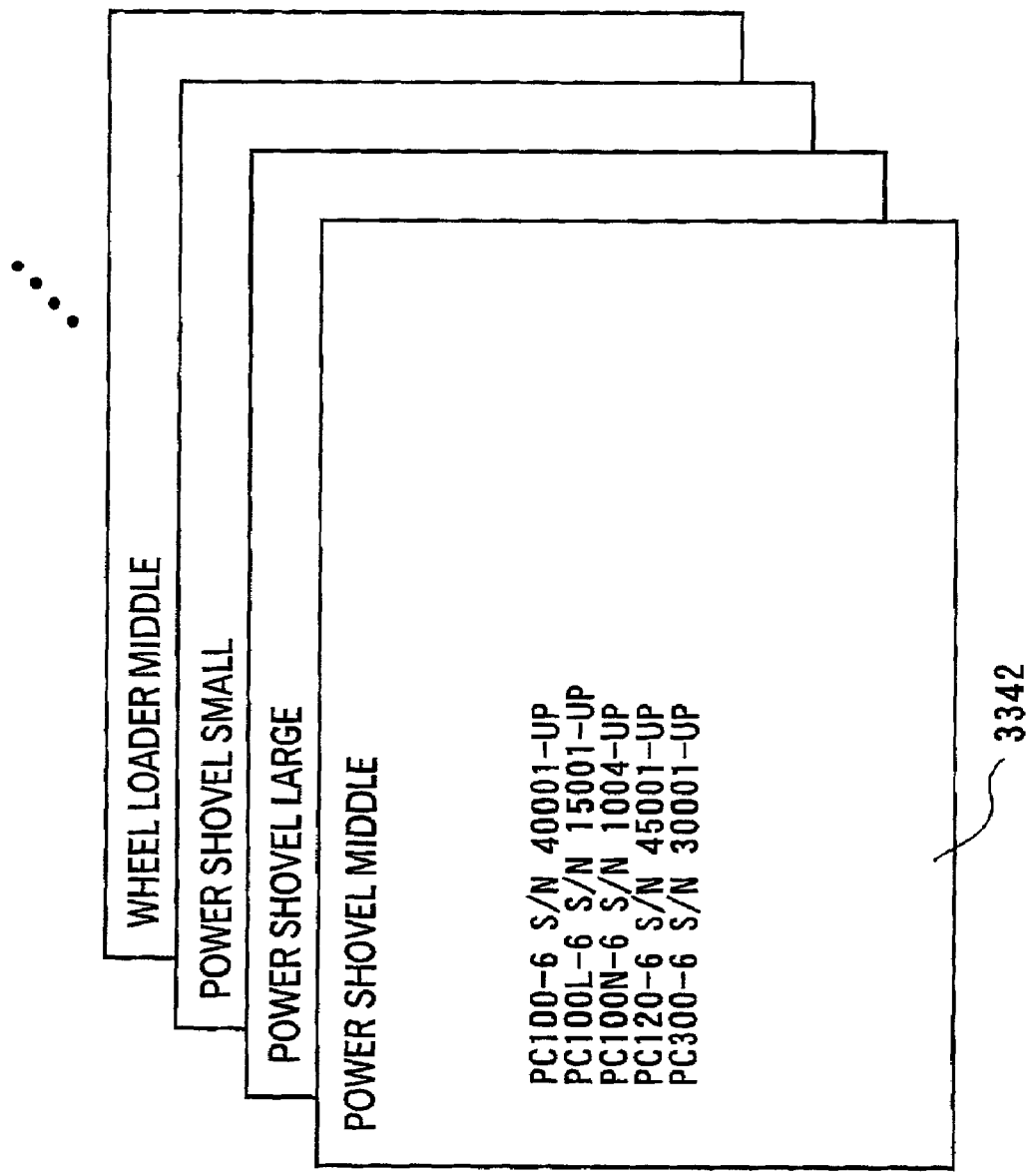
FIG. 35 is a schematic diagram to show a type table stored at the retailer server in the third embodiment.

The agent's server 330 shown in FIG. 33 comprises a means 331 for acquiring signals via a network; a control means 332 for achieving specified controls according to the signal received by the signal acquiring means 331; a means for delivering output signals via a network according to the result obtained by the control means 332; a memory means for storing various data and programs; and a parts check list transmitting/receiving means for transmitting/receiving parts check lists prepared. Out of those means, the signal acquiring means 331, control means 332 and output delivering means 333 consist of computer programs (software) executed by a CPU or the like, while the parts check list transmitting/receiving means 335 consists of the aforementioned mailing software.

As a feature characteristic with this embodiment, the signal acquiring means 331 comprises a model name acquiring means 3311, type name acquiring means 3312, module name acquiring means 3313, and drawing name acquiring means 3314.

The control means 332 comprises a type searching means 3321, module searching means 3322, data searching means 3323, and updating means 3324.

The output delivering means 333 comprises a model name delivering means 3331, type name delivering means 3332, module name delivering means 3333, and data delivering means 3334.

The function of these means will be described later.

The memory means 334 consists of a recording medium such as a hard disk. The recording medium stores the data conventionally contained in parts catalogues as electronic data. The data characteristic with this embodiment may include, as shown in FIGS. 35 to 39, the tables of models 3341, types 3342, modules 3343, drawings 3344, parts 3345, and assemblies 3346.

In addition, the memory means 334 stores the means 331, 332, 333 and 335 which are all computer programs.

The model table 3341 shown in FIG. 34 stores the model names of construction machines such as "Dray," "Small bulldozer," "Big bulldozer," etc. The type table 3342 shown in FIG. 35 stores the types for each model: for example, under the model of "Middle-sized hydraulic shovel," there are types of "PC100-6 S/N4001-UP," "PC100L-6 S/N 15001-UP," . . . .

Figure 36:
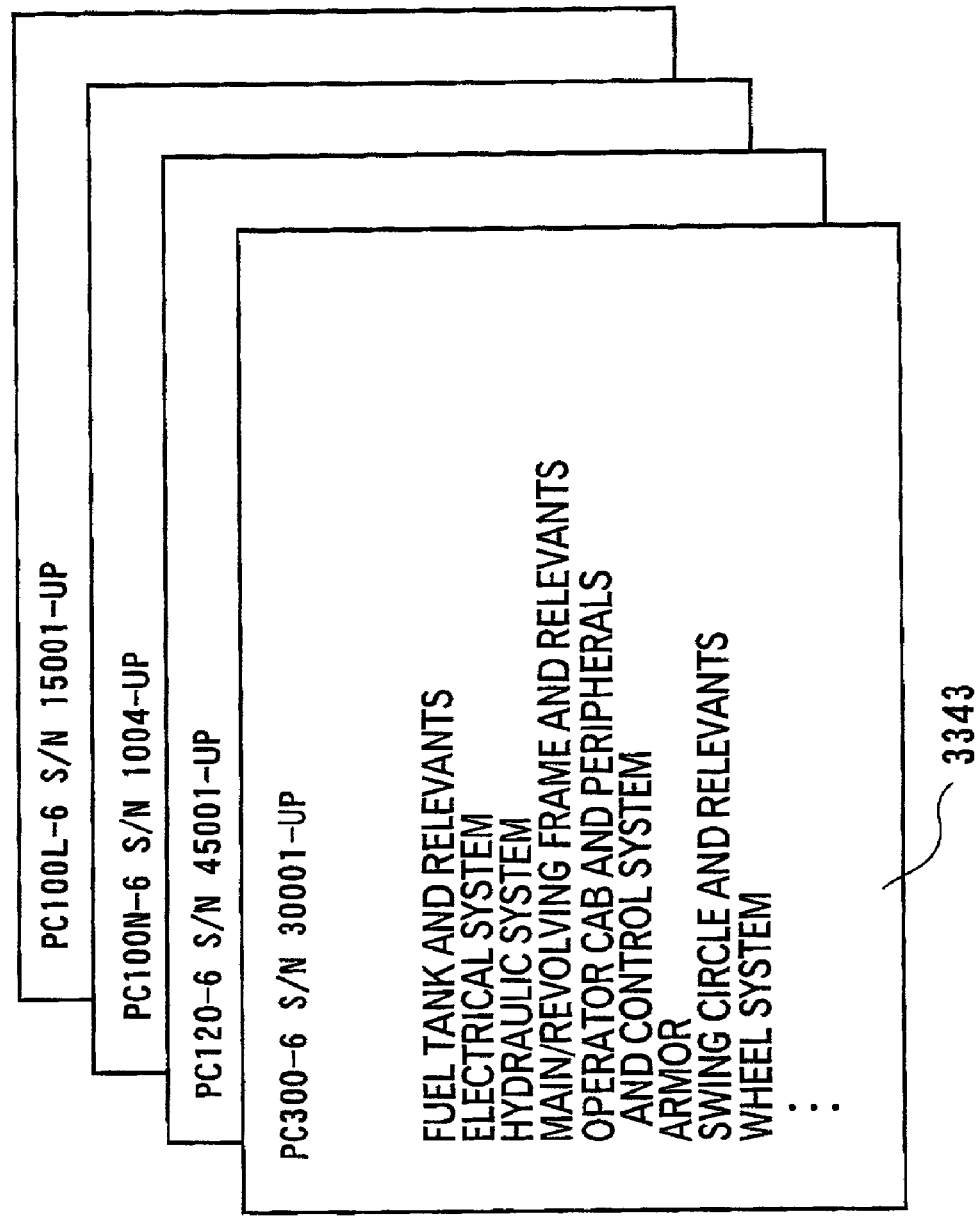
FIG. 36 is a schematic diagram to show a module table stored at the retailer server in the third embodiment.
Figure 39:
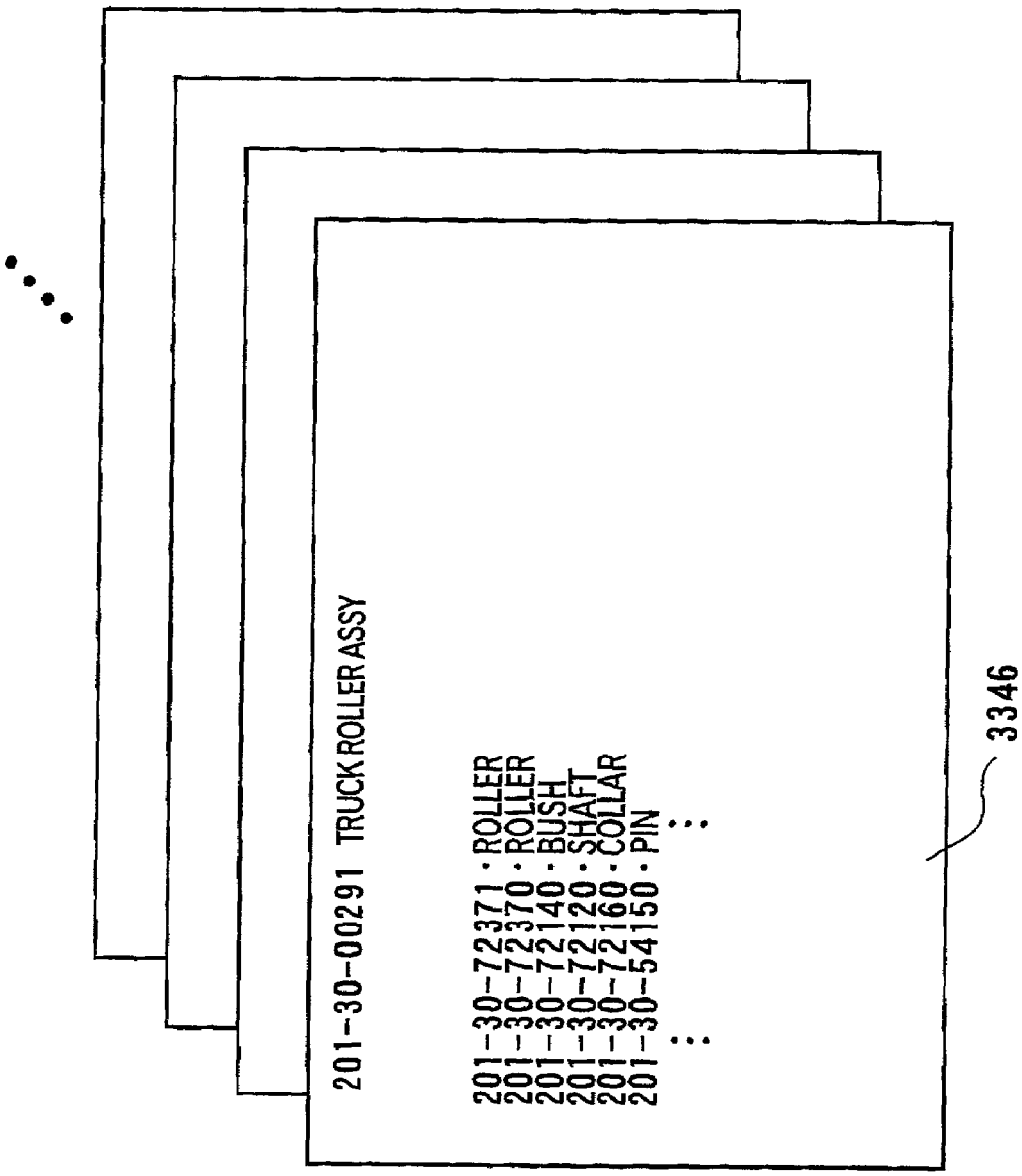
FIG. 39 is a schematic diagram to show an assembly article table stored at the retailer server in the third embodiment.

The module table 3343 of FIG. 36 stores the name of modules for each type: for example, the type "PC100-6 S/N 40001-UP" is constituted of such modules as "Fuel tank and related parts," "Electric system," . . . .

The drawing table 3344 shown in FIG. 37 stores the titles of drawings carrying the graphics data of the modules, and the graphics data. For example, the modules for "Footwork" are included in a number of drawings such as "Truck shoe (flat type)," "Truck shoe (triple geared)(#31152)," . . . . The graphics data are stored as bit map files.

The parts table 3345 shown in FIG. 38 stores, for all the parts whose graphics data are stored in the drawings, their ID Nos., names, and used numbers together with their indices. For example, the drawing depicting footwork modules titled "Truck roller (#52374-)" stores the graphics data of the. parts such as "201-30-00291," "201-30-72371," . . . together with the indices such as "A," "1," . . . . Two parts in the parts table 3345 having the same name but different ID Nos. are distinguished by different indices attached to them. The assembly table 3346 stores the ID Nos. and names of pieces for each assembly. For example, "201-30-00291" of the parts table 3345 is an assembly which is constituted of pieces such as "201-30-72371," "201-30-72371," "201-30-72410," . . . .

Host Computer

Figure 40:
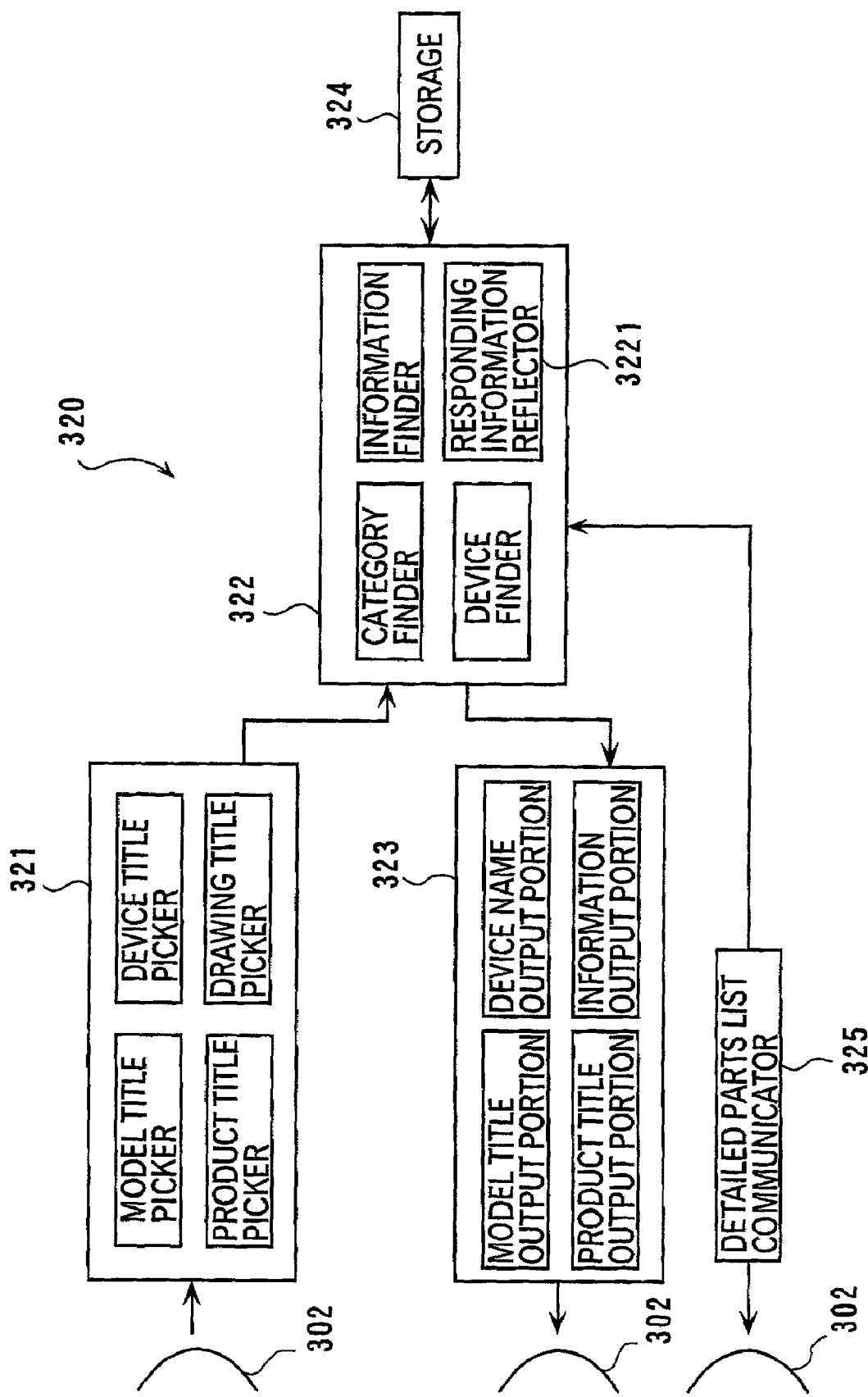
FIG. 40 is a block diagram to show a host computer of the third embodiment.
Figure 42:
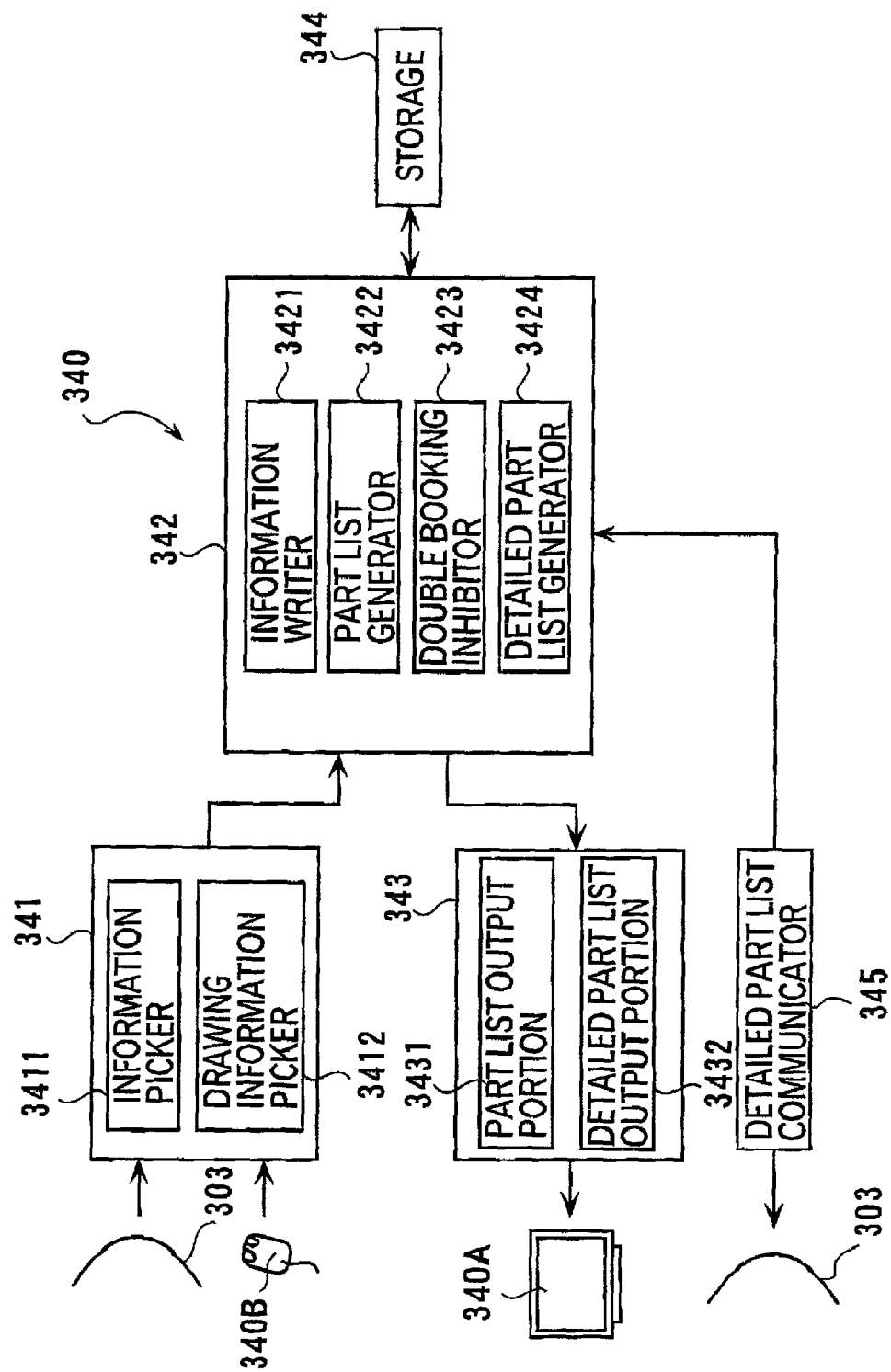
FIG. 42 is a block diagram to show the client terminals of the third embodiment.

As shown in FIG. 40, the host computer 320 is basically composed, like the agent's server 330, of a signal acquiring means 321, control means 322, output delivering means 323, memory means 324 consisting of a hard disk to serve as a recording medium, and a parts check list transmitting/receiving means 325 or mailing software. The control means 322 of host computer 320 comprises a response preparing means 3221.

The function of the response preparing means 3221 will be described later.

Figure 46:
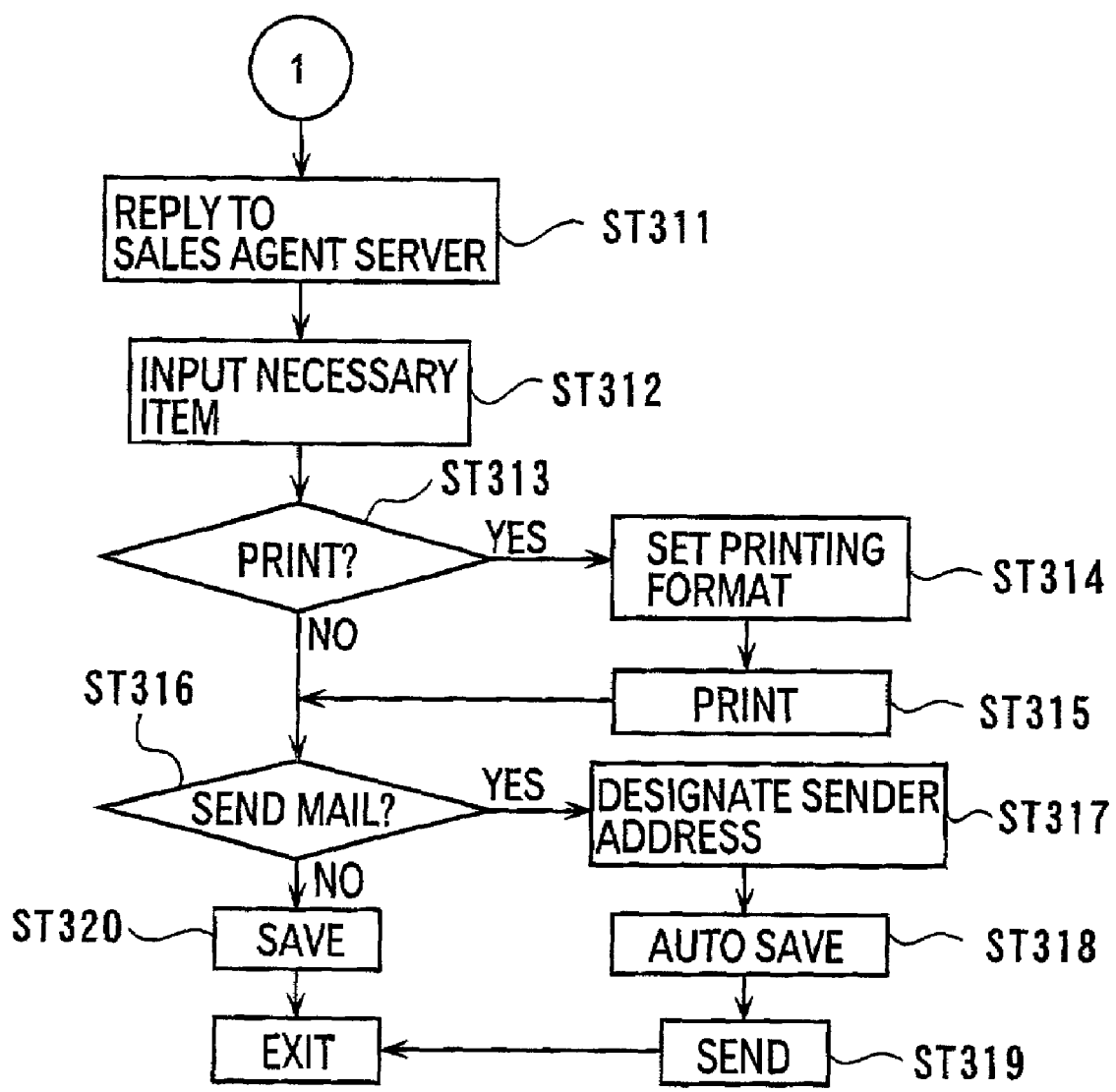
FIG. 46 is a flowchart continuing from that of FIG. 45.

The memory means 324 stores, in addition to the tables stored at the agent's server 330, a price table 3241 as shown in FIG. 41. The price table 3241 stores the price for each of the parts constituting a construction machine, together with the ID No. and name of that part. The memory means 324 further stores a stock table 3242 (FIG. 46). The stock table (not illustrated here) stores the number of stored goods at the manufacturer. However, the price table 3241 and stock table 3242 may be stored in the agent's server as appropriate according to their content.

In addition, the memory means 324 stores the means 321, 322, 323 and 325 which are all computer programs.

The tables stored in the memory means 324 are updated whenever their data are altered, and thus they contain latest data. For example, if the ID No. of a part is altered, the corresponding ID No. stored in a table is substituted for the new No. and index data attached to the old ID No. is transferred to the new ID No. If the shape of a part is changed, the corresponding graphics data stored in a drawing is changed accordingly.

User Terminal

The user terminal 340 has functions to acquire necessary information about a desired part via a network, and to prepare a parts check list based on the information, and consists of a personal computer. Specifically, the user terminal 340 comprises an information acquiring means 341, control means 342, output delivering means 343, a memory means consisting of a hard disk to serve as a recording medium, and a parts check list transmitting/receiving means 345 or mailing software. Incidentally, the network terminal (not illustrated here) of the manufacturer or of the sales agent has the same configuration as does the user terminal.

As a feature characteristic with this embodiment, the information acquiring means 341 comprises a character data acquiring means 3411 and graphics data acquiring means 3412.

The control means 342 comprises a data writing means 3421, parts list preparing means 3422, double selection preventing means 3423, and parts check list preparing means 3424.

The output delivering means 342 comprises a parts list delivering means 3431 and parts check list delivering means 3432.

The memory means 344 stores the data tables 3441 as shown in FIG. 43. In addition, the memory means 324 stores the means 341, 342, 343 and 345 which are all computer programs.

The functions of those means, and the data table 3441 will be described later.

[Operation of Third Embodiment]

Figure 44:
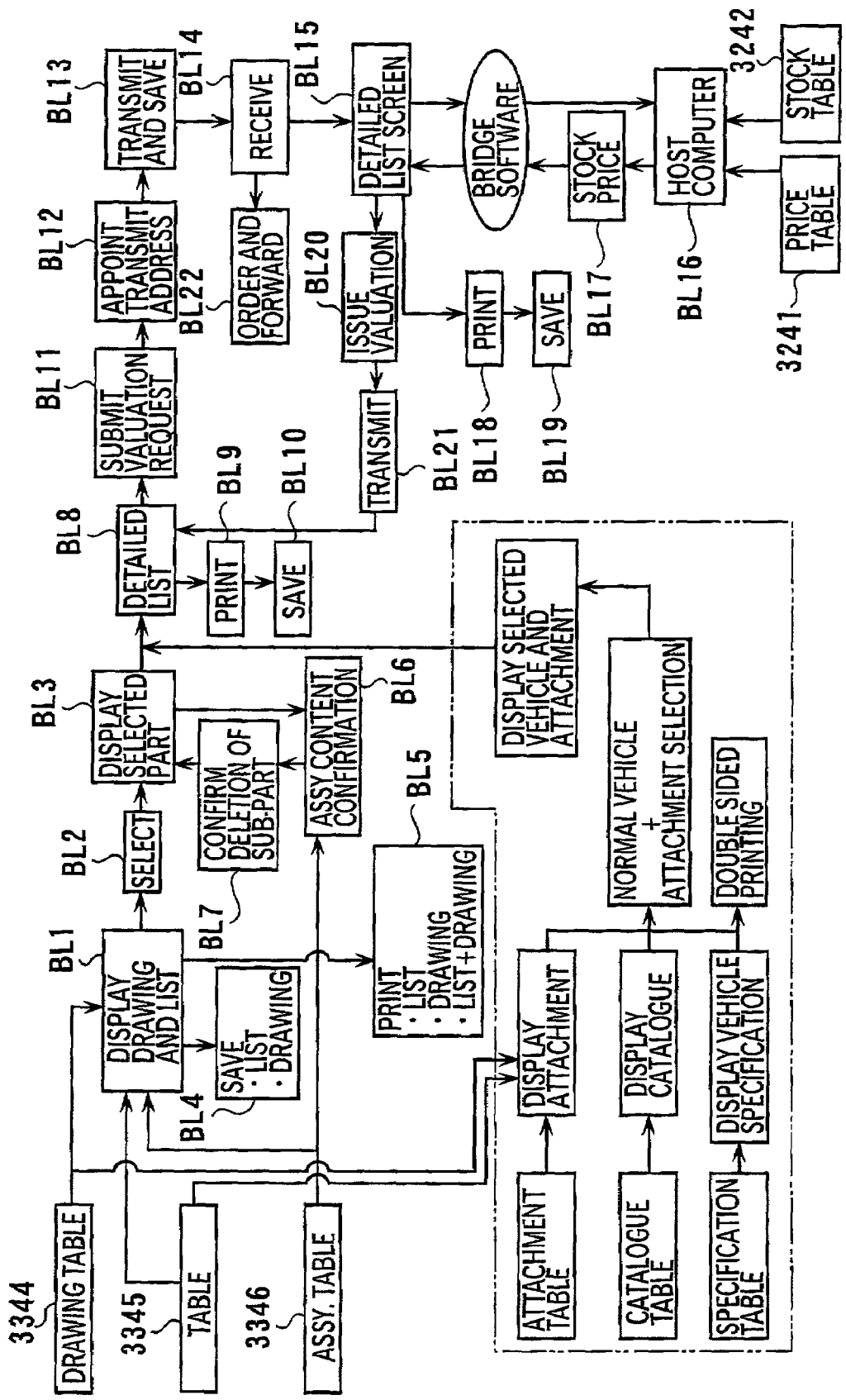
FIG. 44 is a block diagram to show the steps introduced before and after preparation of a parts check list according to the third embodiment.
Figure 45:
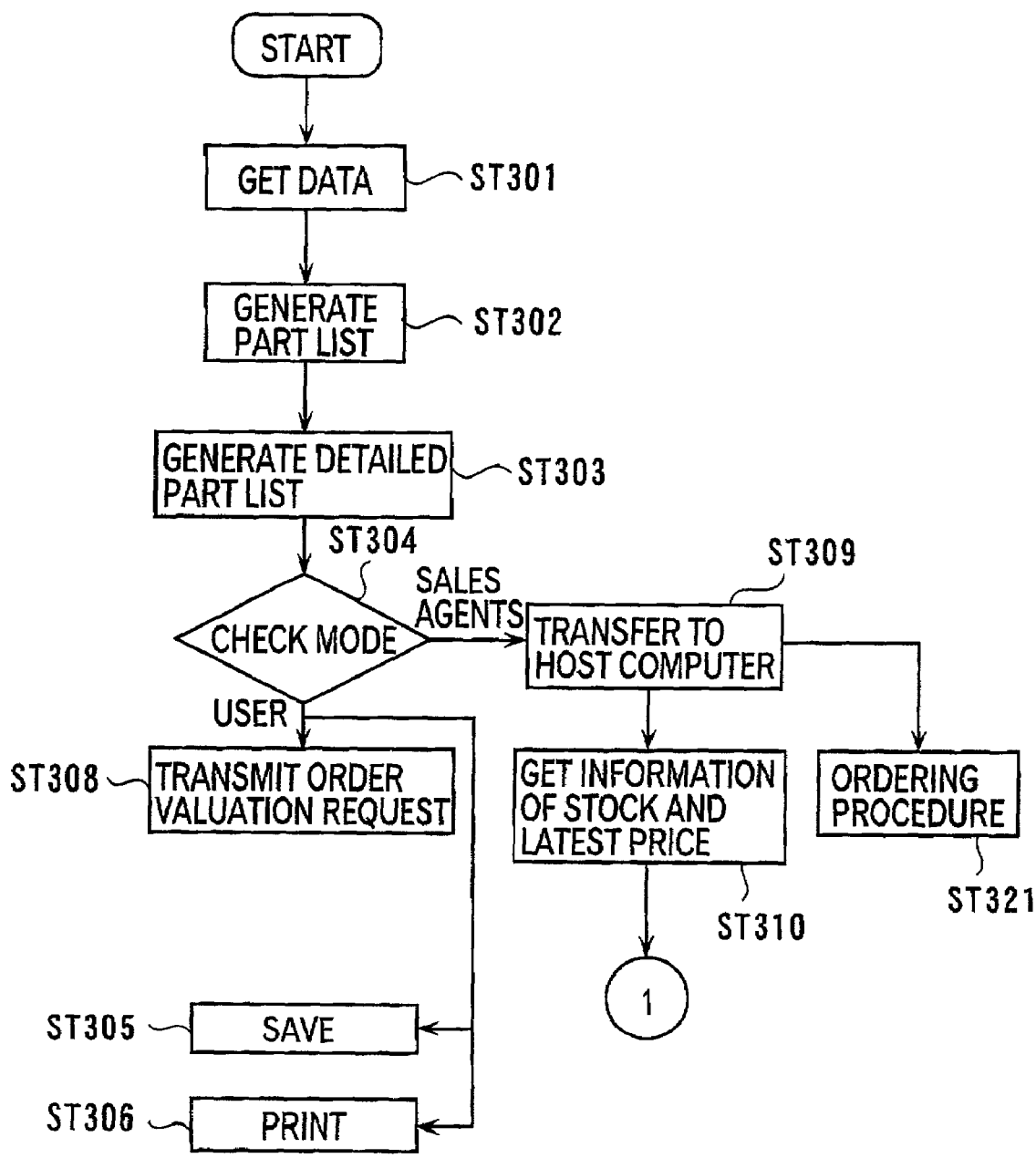
FIG. 45 is a flowchart to show the flow of steps required for preparation of a parts check list according to the third embodiment.

According to this embodiment, following procedures will ensue. Preparation of a parts check list by a user and its transmission or reception of such a list FIG. 44 shows the procedures necessary for preparing a parts check list using the present system 301, divided into a number of blocks to give an overview of the system operation. FIGS. 45 and 46 are flowcharts to show the principal procedures necessary for preparing a parts check list. FIGS. 47 to 55 show the displays presented on the monitor 340A of the user terminal 340.

The procedures necessary for preparing a parts check list will be described with reference to those figures, and further the functions of means 3311–3314, 3321–3324, and 3331–3334 in agent's server 330, of the response preparing means 3221 in host computer 320, and of means 3411, 3412, 3421–3424, 3431 and 3432 in user terminal 340 will be described in association.

Figure 47:
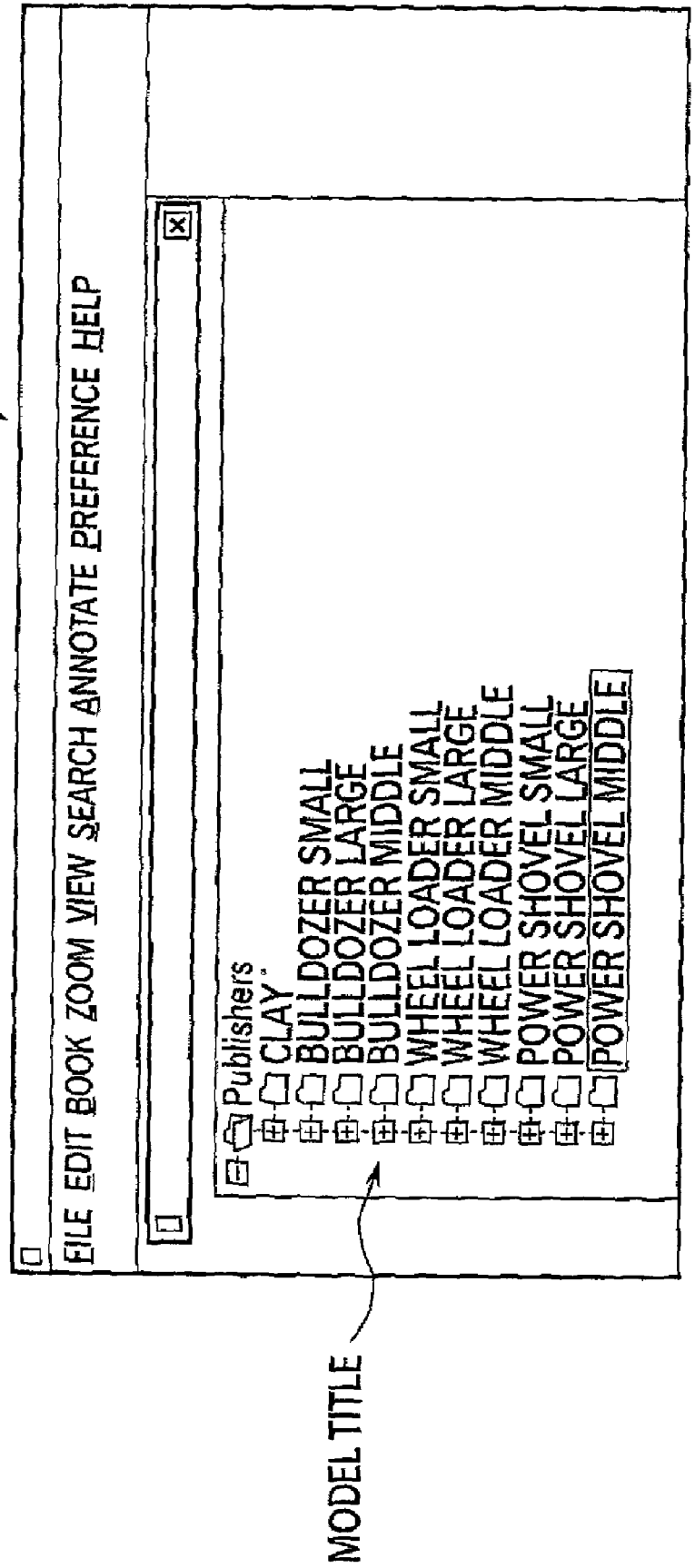
FIG. 47 shows a screen where a model of construction machine is displayed according to the third embodiment.

Firstly, turning to block 1 ("block" will be represented by "BL" in the figures and texts hereinafter) of FIG. 44, when the system 301 is activated, the model name delivering means 3331 of agent's server 330 fetches the model names of construction machines from the model table 3341 stored in the memory means 334, and causes the user terminal 340 to present a display 340A as shown in FIG. 47.

Seeing this, the user selects a model that may possibly contain a part she wants to get, using a mouse 40B or input feeding device. In FIG. 47, a "hydraulic shovel, middle-sized" is selected.

Figure 48:
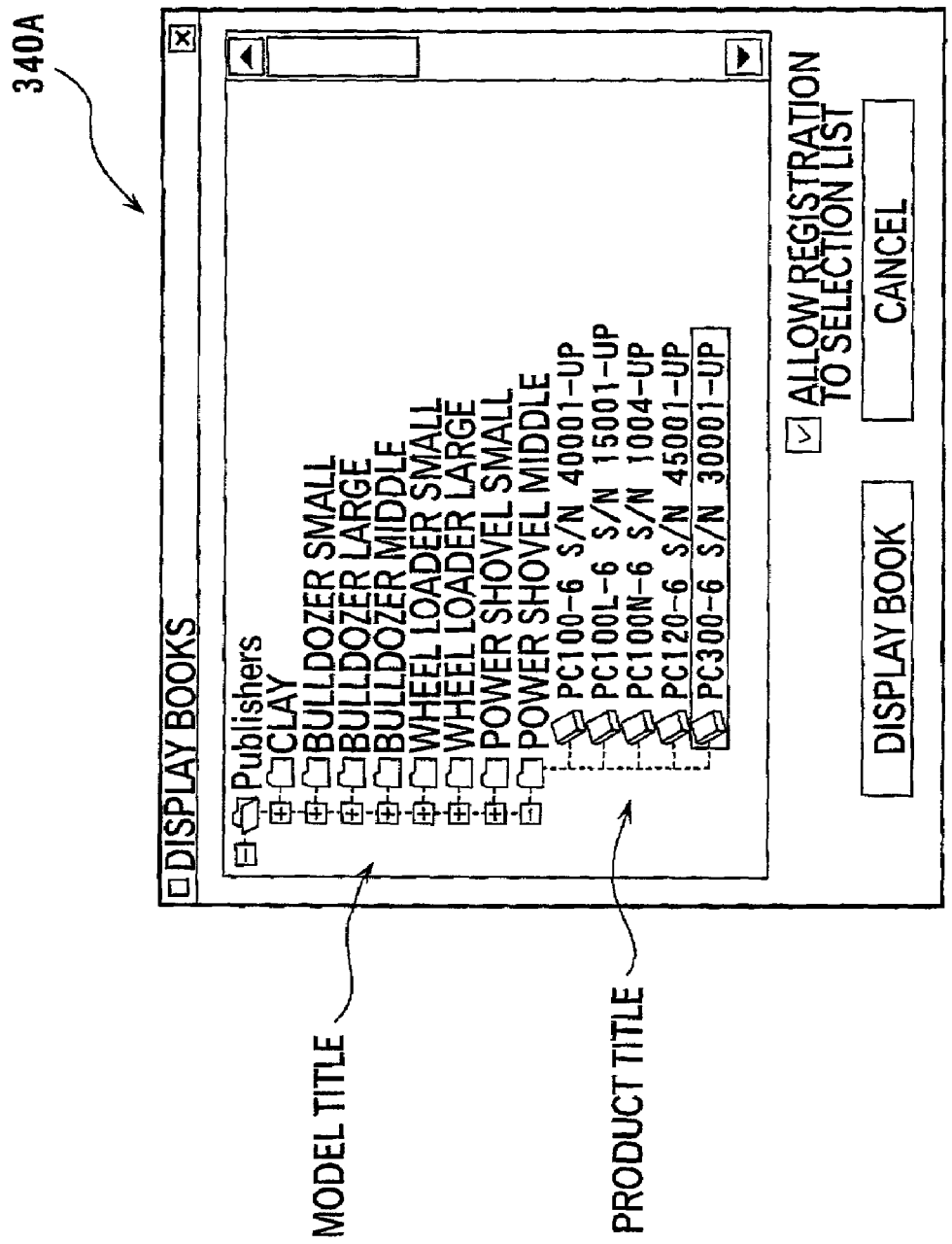
FIG. 48 illustrates how type names are displayed in the third embodiment.

The agent's server 330 receives signals carrying the data of "hydraulic shovel, middle-sized" via the model name acquiring means 3311. The type searching means 3321 of the control means 332 searches through the type table 3342 for the name of type corresponding with the model name, and fetches it. Then, the type name delivering means 3332 delivers the name of type to the user terminal 340 to give a display 340A as shown in FIG. 48 where the name is represented as an element in a hierarchical structure.

The user selects a type that may possibly contain the part she wants to get. In FIG. 48, the type "PC300-6 S/N 30001-UP" is selected.

Agent's server 330 receives signals carrying the data of "PC300-6 S/N 30001-UP" via the type name acquiring means 3312. The module searching means 3322 searches through the module table 3343 for the name of module corresponding with the type name, and fetches it. Then, the module name delivering means 3333 delivers the name of module to the user terminal 340 to give a display 340A as shown in FIG. 49 to show the name.

Finding the part she needs constitutes a footwork device, she selects "Footwork" on display.

Agent's server 330 receives signals carrying the data of the footwork device via the module name acquiring means 3313. The information searching means 3323 searches through the drawing table 3344 for the drawings carrying the graphics data of the module here concerned, and fetches them. Then, the information delivering means 3334 delivers the titles of the drawings to the user terminal 340 to give a display 340A as shown in FIG. 50.

The user selects the title "Truck roller (#52374)" which represents a drawing carrying the graphics data of the part she needs.

Figure 51:
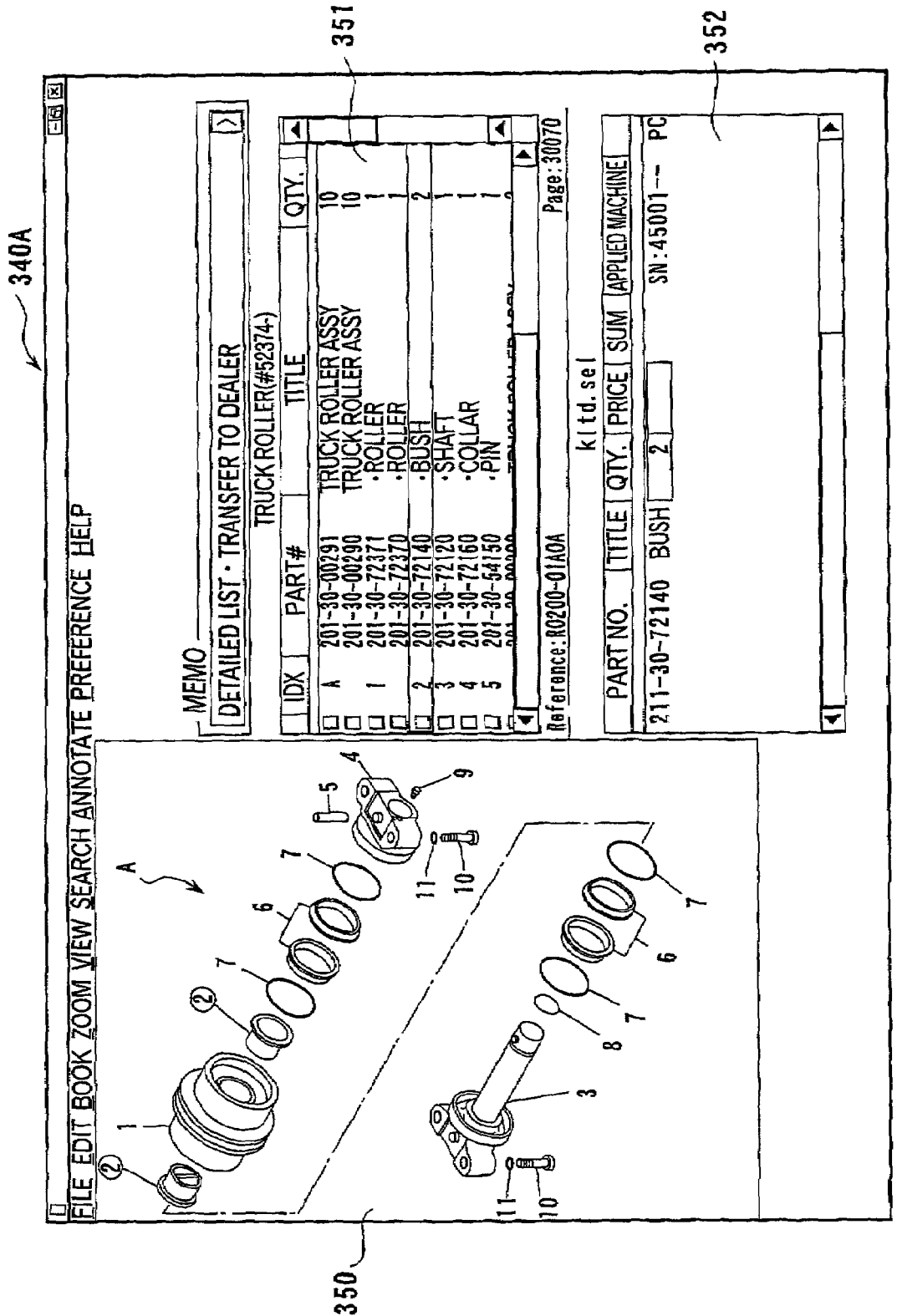
FIG. 51 shows the display through which parts are selected in the third embodiment.

Agent's server 330 receives signals carrying the title of drawing "Truck roller (#52374)" via the drawing title acquiring means 3314. The information searching means 3323 searches through the drawing table 3344 for the corresponding graphics data, and fetches them. Then, the information delivering means 3334 delivers the graphics data to the user terminal 340 to give a display as shown in FIG. 51 where layouts based on the graphics data are shown on the left side.

Further, agent's server 330 acquires a drawing titled "Truck roller (#52374)" via the drawing title acquiring means 3314. The information searching means 3323 searches through the parts table 3344 for the data of parts depicted in the drawing such as their ID Nos., names, used numbers, etc., and fetches them. Then, the information delivering means 3334 delivers the data to the user terminal 340 to give a display as shown in FIG. 51 where the data are given as a table 351 at the middle stage of the right column beside the layouts 350. The symbol attached to the layout 350 representing a part is correspondent with the index data attached to the same part listed in the table 351.

The above procedures are mainly achieved between the user terminal 340 and the agent's server 330 based on the browser function of user terminal 340. The subsequent procedures are mainly achieved solely by the user terminal 340 mainly based on the parts check list preparing software (including means 3422–3424, 3431 and 3432) installed in the user terminal 340.

Firstly at step 1 of FIG. 45 ("step" will be represented by "ST" in the following figures and texts), the user terminal 340 acquires the graphics data, index data, ID No., name, used number of the part here concerned from agent's server 330 via the character data acquiring means 3411 or one element of the information acquiring means 341. The information writing means 3421 of control means 342 stores these data in the memory means 344 as a data table 3441 as shown in FIG. 43. The graphics data are divided by individual parts, and classified separately as bit map files.

Later, the parts list preparing means 3422 of control means 342 fetches a list template stored in advance in the memory means 344, and delivers it to the display 340A via the parts list delivering means such that a list of parts 352 is presented at the lower stage of right column beside the layout 350 and table 351. These are the procedures executed in BL1.

In BL2 of FIG. 44, the user identifies the part she needs in the layout 350, and selects the symbol attached to the part using a mouse 40B. The user may select the line enclosing the part. In FIG. 51, a part identified by symbol "2" is selected. The system is preferably so configured as to allow the selected symbol to be circled (FIG. 51), or marked with a line or arrow, or the part to change its color or shade, so that the selected part may be easily noted, and that the occurrence of duplicate selection may be safely prevented.

The graphics data acquiring means 3412 at the user terminal 340 acquires the graphics data of a part identified by the symbol "2" which is selected. In BL3, the parts list preparing means 3422 searches through the data table 3411 for the ID No., name and used number of the part correspondent with the graphics data now acquired, and fetches them. The parts list delivering means 3431 delivers the fetched data to the user terminal 340 to insert them into the parts list 352. Notably, the parts list delivering means 3431 of this embodiment also has functions to cause the monitor to display the name of models and types containing the part in the parts list 352, or to display cells for the entry of "unit price," or "purchase price" (ST 302 of FIG. 45 is completed).

In BLs 6 and 7, the double selection preventing means 342 of user terminal 340 checks whether or not the user acquires, in addition to the data of an assembly, the data of a piece constituting the assembly. If the user selects, in addition to an assembly, a piece constituting the assembly, the same piece will be doubly selected, which poses a problem. If the double selection preventing means 3423 finds the user selects a same piece doubly, it eliminates the piece from the parts list 352, thereby leaving only the assembly, and preventing double acquisition of the data of the piece.

For example, if the user selects a piece identified by symbol "2" in layout 350, thereby causing the display to give a parts list 352 containing the parts data identified by "211-30-72410," and then selects an assembly identified by symbol "A" containing the same piece identified by "211-30-72410," the parts data of the piece identified by "211-30-72410" will be eliminated, and only the parts data of assembly identified by symbol "A," such as ID No.—"201-30-00291," name—"Truck roller assembly," etc. will be left.

In BL 8, a parts check list is prepared. When the monitor of the user terminal 340 gives a display as shown in FIG. 51, the user selects "Transmission of parts check list to sales agent" in the memo presented on the upper part of Table 351. Then, the parts check list preparing means 3424 fetches the template for parts check list from the memory means 344, and the parts check list delivering means 3432 causes the monitor to present this template as a parts check list 360 as shown in FIG. 52.

At this stage, however, all the cells of parts check list 360 remain blank.

The user then selects "Fetching data (R)" from the menu bar on the screen.

In response to this, the parts check list preparing means 3424 fetches the parts data cited in the parts list 352, and the parts check list delivering means 3432 causes the parts check list 360 to be filled with those data.

The user then inserts the date of preparing the parts check list 360, the name of author, or other necessary data into appropriate cells, to complete the parts check list 360 (completion of ST 303).

Because the user must further elaborate the parts check list 360, description will be given of the subsequent procedures from the side of the user (completion of ST 304).

In BLs 9 and 10, the user may print the parts check list 360 prepared in BL 8 to keep it as a document, or save it in the hard disk. To print the parts check list 360, the user may select "File" on the menu bar on the display as shown in FIG. 52, and select "Print" from the pull-down menu. FIG. 53 shows a preview display of the parts check list 360 to be printed by the user (completion of STs 305 and 306).

On the other hand, in BLs 11 to 13, if the user requests an estimate from the sales agent, or orders a part from the sales agent, she boots up the parts check list transmitting/receiving means 345 consisting of mailing software. The parts check list transmitting/receiving means 345 transmits the parts check list 360 to the address of the sales agent stored in the agent's server 330, and stores the transmission log in the terminal 340 (completion of ST308).

Procedures Taken by Sales Agent and Manufacturer for Handling Parts Check List

How the parts check list will be handled by the sales agent and the manufacturer will be described with reference again to FIGS. 44 to 46.

In BL 14 of FIG. 44, the customer service personnel of the sales agent manipulates a terminal connected to the in-house intranet 3, to receive the parts check list 360 from the agent's server 330, and, in BL 15, causes the monitor to display the parts check list as shown in FIG. 54. The personnel finds the parts check list 360 is delivered by the user as a prerequisite for an estimate, and spaces for the unit prices, sums, availability, and scheduled date of delivery of the parts remain blank.

Then, the personnel selects "On-line writing" on the menu bar on the display as shown in FIG. 54. In response to this, the terminal transfers the parts check list 360 to the manufacturer's host computer 320 via bridge software (completion of ST 309).

In BSs 16 and 17, the manufacturer's host computer 320 receives the parts check list 360 via bridge software. Then, the response preparing means 3221 of control means 322 searches through the price table 3241 and storage table 3242 for the unit price and storage of the parts described in the parts data of the parts check list 360, and fetches them and copies them in the parts check list 360 (completion of ST 310).

Later, the host computer 320 sends back the parts check list 360 whose blank spaces have been completely filled to the agent's server 330 via bridge software (completion of ST 311 of FIG. 46).

Again in BL 15, the sales agent receives the parts check list 360, displays it as shown in FIG. 54 (at this stage, the unit price, sum, availability and scheduled date of delivery of the parts are inserted), and enters necessary data such as the date of preparation, name of author, etc. (completion of ST 312).

Then, in BLs 18 and 19, the personnel checks whether or not the parts check list 360 should be printed. If he finds it should be printed, he will print it and keep it as a document. FIG. 55 shows a preview display of the parts check list 360 to be printed by the agent personnel (completion of STs 312 and 315).

Then, or if the personnel concludes the printing is not necessary, in BLs 20 and 21, the personnel uses the parts check list 360 as an estimate, and transmits it to the user via the transmitting/receiving means (mailing software). For this purpose, the personnel may only notify the user's address written as the sender of the list before transmission.

If the personnel sends the parts check list as a conventional letter, he may prepare the printed parts check list 360 as a letter to post, and store the parts check list 360 as digital data (completion of STs 316–320).

Next, the user studies the data such as sum and scheduled date of delivery described in the parts check list 360 returned as an estimate, and, if she finds no problem in it, sends it again to the sales agent, using it now as an order. The procedures taken for the transmission are the same with those described with respect to BLs 11–13.

Because the parts check list 360 the sales agent receives in BL 14 now carries the data such as sums, etc., the agent transfers it to the host computer 320 in BL 22, to order the parts from the manufacturer. The procedures required for the transference of parts check list 360 to the manufacturer are the same with those as described with respect to BLs 11–13 (completion of ST 321 of FIG. 45).

If, for example, the sales agent himself stores parts in his warehouse, and determines himself the prices of them, it is not necessary for him to gain access to the host computer 320 to obtain the data about the price and availability of the parts described in the list sent by the user for estimation, or it is only necessary for him to respond to the user's request based on the price determined by him and the stock condition of his warehouse. Further, if all the parts listed in the user's order are stored in the agent's warehouse, the agent does not need to order the parts from the manufacturer, but just gather the required parts in the warehouse to deliver them to the user (same with the "Delivery" of BL 22).

Sometimes, the manufacturer modifies certain parts in their shape or in their material, to improve thereby their reliability. Then, the manufacturer updates the drawing table and parts table stored in the host computer 320 by correcting graphic data and ID Nos. as appropriate.

Such updating is monitored by an updating means 3324 at the agent's server 330. The updating means 3324, whenever updating is introduced in the host computer 320, automatically downloads the updated data, and transfers them to the agent's server 330 to update the corresponding drawing table 3344 and parts table 3345 there.

[Advantages of Third Embodiment]

Following advantages will be ensured according to this embodiment.

(1) According to the parts check list preparing system 301, in order to prepare a parts check list to be attached to a request for an estimate or to an order, the user simply causes the monitor 340A of terminal 340 to present a drawing 350 carrying the layout of a necessary part and selects the part on drawing 350 using a mouse 40B. Then, a parts check list 360 is automatically prepared based on the ID No. of the selected part. Accordingly, the user will be relieved of laborious works such as searching through parts lists using the ID No. and name of parts as a clue, or copying of the found data, etc.

(2) The user terminal 340 contains the double selection preventing means 3423, which can eliminate, even if the user selects an assembly and a piece constituting the assembly at the same time, the parts data of piece, to leave thereby only the parts data of assembly. Therefore, selecting, in addition to an assembly, a piece constituting the assembly will be securely prevented.

(3) The manufacturer's host computer 320 stores the price table 3241 listing the price data of parts, and the storage table 3242 listing the stock data, and it further comprises the response preparing means 3221 to copy those data into a parts check list 360. Therefore, it will be possible for the sales agent, when he receives a parts check list 360 attached to a request for an estimate from a user, to transfer it as it is to the manufacturer's host computer 320, to thereby allow the computer to copy the necessary data into the parts check list 360 to turn the list to an estimate, and to quickly deliver the estimate based on accurate data. This will improve efficiency of the work required for the preparation of an estimate.

(4) Because the user terminal 340 obtains data necessary for preparing a parts check list 360 from the nearby agent's server 330, the response characteristics of communication is better than would be possible if the user terminal obtains data from the remote manufacturer's host computer 320. Thus, the drawing 350 and table 351 will be more speedily displayed, and the parts check list 360 be prepared more quickly.

(5) Because both the host computer 320 and the agent's server 330 have the same function, and include a database of the same content, it will be possible for the host computer 320 to back up the agent's server 330, even if the agent's server 330 is used up in the frequent accesses from users, or the data of agent's server are destroyed as a result of accident. Therefore, unexpected failure of the system will be safely avoided.

In addition, because the sales agent is relieved of the necessity of preparing a back-up for the database, the agent's server 330 does not need to be a high performance, large capacity machine, which is economical.

(6) In order to identify a necessary part, the user simply selects, starting from the model of a construction machine, the appropriate names of type, module, etc. arranged in hierarchical order, by referring to the graphics images on display. Thus, she will be able to securely reach the necessary part even if her knowledge is at a far lower level than those of the personnel of sales agent and of manufacturer. This demonstrates the convenience of this system.

(7) When the user selects a necessary part, both the parts list 352 and the drawing list 350 are presented on display. Therefore, it will be possible for the user to check that the parts data of the part she has selected are properly inserted in the parts list 352. In this respect too, the convenience of system is demonstrable.

(8) Exchange of a parts check list 360 among the host computer 320, agent's server 330 and user terminal 340 is achieved via the parts check list preparing means 325, 335 and 345 consisting of mailing software, which will dispense with the need for printing, mailing by post, bringing mail to the post office, etc. This improves efficiency in the transactions for the sale and purchase of parts.

[Variant of Third Embodiment]

The parts check list preparing system/method of this invention is not limited to the third embodiment, but may include following variants.

The parts check list preparing system 301 of the above embodiment prepares parts check lists based on the data of the tables 3341–3346 or on the data from the database stored in agent's server 330, to use them as a material to be attached to request for an estimate, estimate, and order. This system may be further provided with a search function through which any one data from among drawings, ID Nos. of parts, types, modules, etc. are utilized to locate the other data.

The system is further provided with a function through which the user or the sales agent can alter the used number of part or its price.

The system is further provided with a function through which the user can leave a note on any desired display. The function may be so introduced as to allow the note to be only accessible by the user or the sales agent inserting the note, or may be so introduced as to allow both parties to gain access to the note.

The parts check list preparing system of this invention can be used not only for the purchase or sale of parts, but also for the preparation of a request for the estimate or ordering of a construction machine. The flow of procedures necessary for preparing a parts check list used for the above purpose are described in the enclosure surrounded by two dot-dash lines of FIG. 44.

Specifically, the agent's server 330 may store an accessory table which lists accessories such as buckets classified by models, catalogue table which lists the data in catalogues, and specification table which lists data such as performance, size, etc., classified by models. The user, for a construction machine she is using, fetches relevant data and causes the monitor to display them, selects parts on the layout of the machine, thereby obtaining data of the parts, arranges the data into a parts list, and finally inserts the list into a parts check list.

In this case too, the user can accurately inform the sales agent of the ID No. of the accessories, as well as the ID No. of the machine.

It is not always necessary for the memory means 334 of agent's server 330 to store the same data as does the memory means 324 of the host computer 320. If, for example, the sales agent exclusively deals with the sale of bulldozers, the memory means 334 of agent's server 330 does not need to store the data of wheel loaders and hydraulic shovels. This accepted, the hard disk of agent's server may have a smaller capacity which is economical, and ensures a higher responsivity because of its smaller amount of data being handled. Further, the time required for downloading data from the host computer 320 will be shortened which will save labor.

In the above embodiment, the parts check list was initially prepared by the user. However, the parts check list may be prepared by the sales agent or by a network terminal of the manufacturer. If, for example, the user has no terminal connected to the network, the sales agent may prepare, on behalf of the user, a parts check list, insert necessary data such as price, availability, etc., into it, transmit it to the manufacturer, while the agent may print the same parts check list, and send it to the user by fax, mail, or hand.

In the above embodiment, description was given with respect to a parts check list about the parts of a construction machine. The parts to be described in the parts check list of this invention may include, in addition to the parts of construction machines, the parts of merchandise in a wide variety of fields, such as the parts of general machines and instruments, automobiles, houses, leisure goods, goods necessary for subsistence, or merchandise itself.

Figure 56:
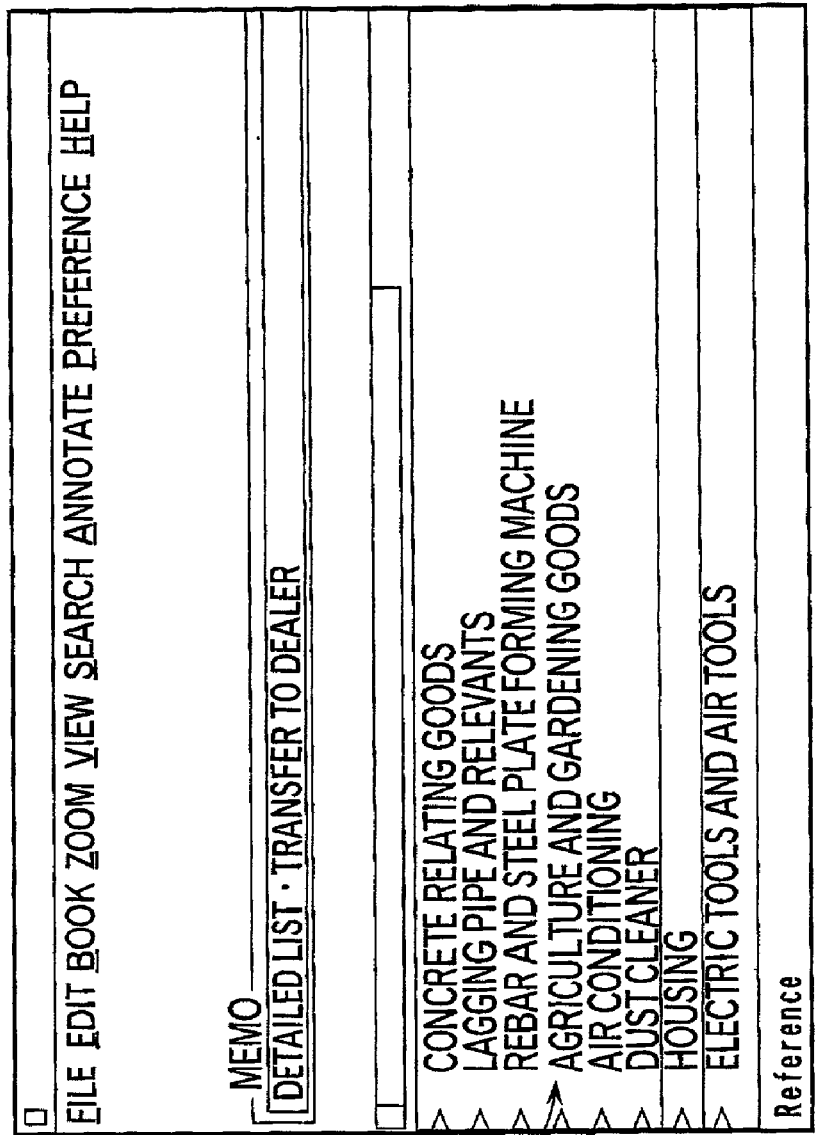
FIG. 56 is a variant of the third embodiment to show how the names of goods are displayed.
Figure 57:
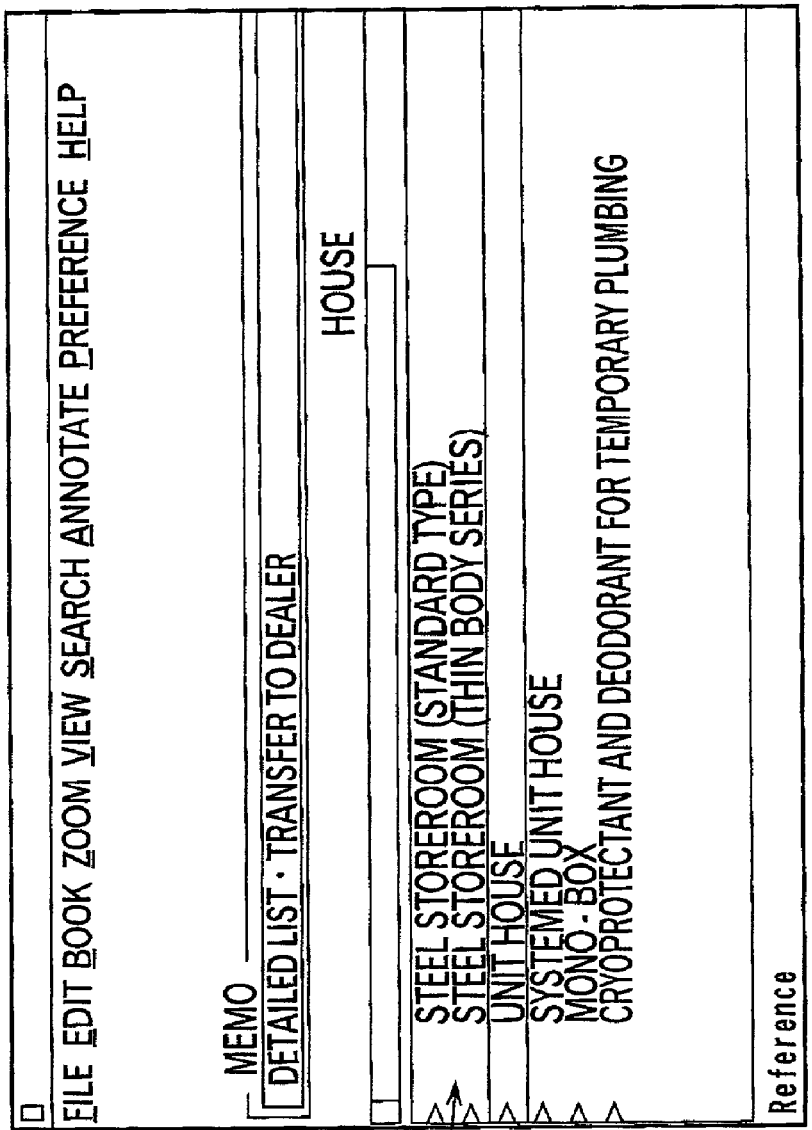
FIG. 57 is the same variant of FIG. 56 to show how the titles of drawings are displayed.

FIGS. 56 to 58 shows the examples of parts check lists including the parts of goods other than construction machines.

The monitor 340A of user terminal shown in FIG. 56 presents the titles of goods such as "Concrete-related materials," "Land-holding pipe-related materials," "Iron-rod, iron-plate processing machines," "Farming- and gardening-related machines." These titles of goods are stored in the network server's memory means as a table of good names.

On this display, if the user selects, for example, "House," the monitor will display the titles of drawings such as "Steel-made depository (standard)," "Steel-made depository (flat type)," . . . as shown in FIG. 57. The titles of drawings are stored in the memory means of the server and user terminal as tables of drawings and data, and each drawing table stores the graphic data corresponding with the title of the drawing.

Accordingly, if the user selects a drawing titled "Unit house," the monitor 340A of user terminal will present a drawing 350 giving the pictures of unit houses as shown in FIG. 58. In association, the index data, type, ID No., beam interval, ceiling height, etc. of each unit house to be inserted into a parts data table 351 are displayed.

If the user selects a unit house identified by symbol "KU7060" in the drawing 350, the data of parts of the unit house correspondent with the graphics data identified by that symbol will be arranged into a list which also serves as a merchandise list.

Next, the parts check list preparing means (see FIG. 42) at the user terminal prepares a parts check list based on the data contained in the merchandise list, which also serves as a goods check list.

As described above, this system also allows a parts or goods check list to be accurately and quickly prepared, even if the list concerns with other goods than the parts of construction machines.

The network which serves as a base of the parts check list preparing system of this invention is not limited to that described with respect to the above embodiment, but may include any desired network. For example, the smallest acceptable network may include a network comprising a manufacturer's or agent's network server and a user terminal connected with each other on an on-line basis.

The user network terminal (user terminal) may include, in addition to personal computers, for example, portable telephones and PDAs (portable digital assistants) having a browser function. Such a terminal allows the user to gain access to the network to utilize the present system, even if the user is at a construction site where no commercial communication lines or power lines are available.

To utilize the present system by connecting a network server and a network terminal via a network is of course within the scope of this invention, but to reproduce the function of this system using a stand-alone type computer will be also included in the scope of this invention as claimed in claim 1. This is because even with such a system it will be possible to profit from the feature characteristic with this invention, that is, quick and secure preparation of a parts check list based on the graphics data and parts data fetched from a database.

The recording medium to be incorporated in this invention may include, in addition to a hard disk to form a memory means of a network terminal, an optical disk which may be used for storing programs to be installed in the hard disk, or, in short, any recording medium that can store the computer programs necessary for running this system.

[Fourth Embodiment]

FIGS. 59 to 65 show an information storing system 401 representing a fourth embodiment of this invention.

Figure 59:
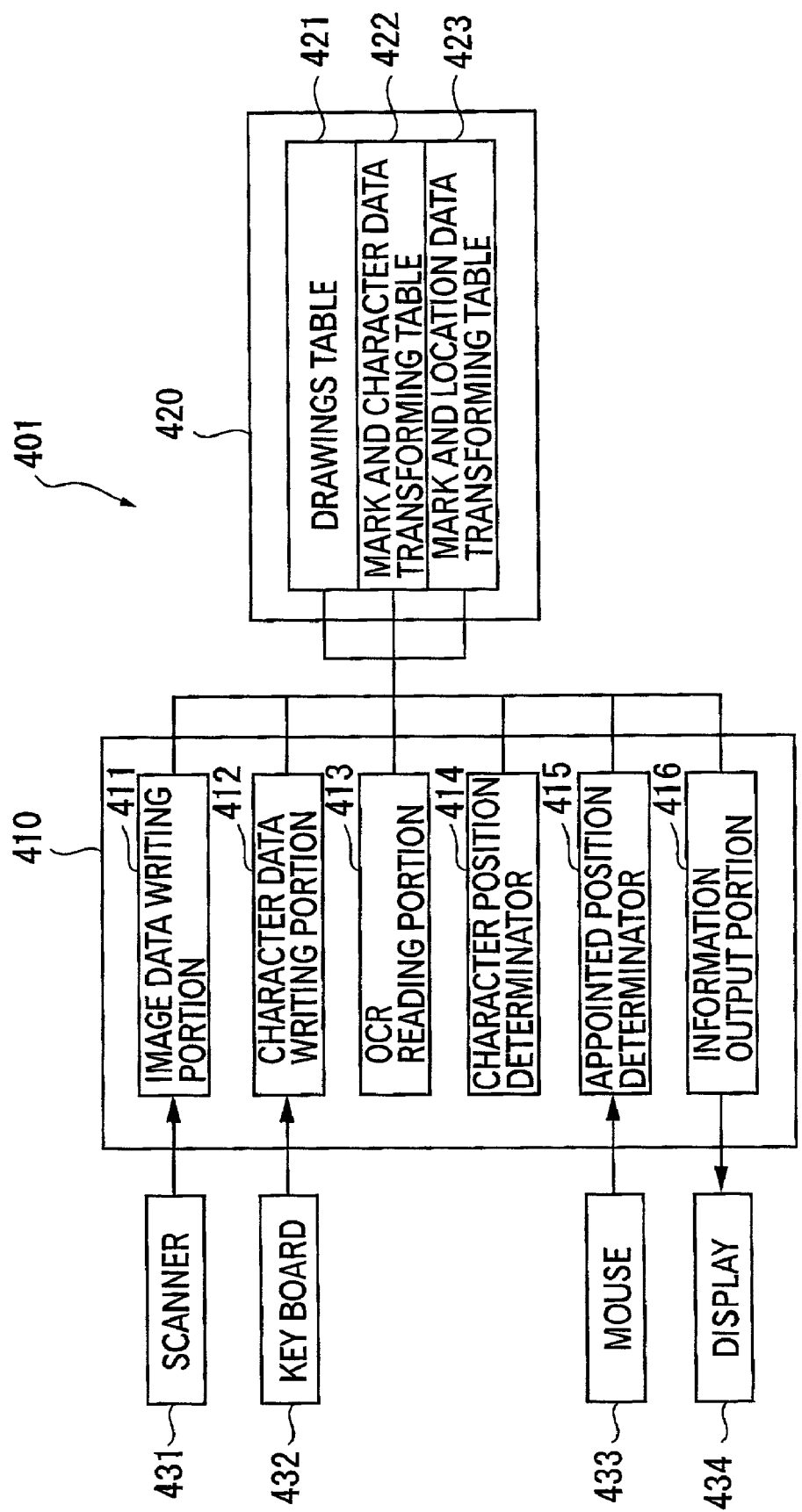
FIG. 59 is a block diagram to show an information accumulating system representing a fourth embodiment of this invention.

The information storing system 401 shown in FIG. 59 is a system by which to convert, for example, assemblage layouts and parts lists related with the layouts into digital data using computer technology, and comprises a control means 410 consisting of a CPU and memory, and a memory means 420 consisting of a hard disk, the control means 410 having a scanner 431 to serve as an information collecting means, a keyboard 432 to serve as a character data feeding means 432, a mouse to serve as a selecting means, and a display 434 connected thereto.

The control means 410 comprises an image data writing means 411, a character data writing means 412, an OCR reading means to serve as a character reading means 413, a character position defining means 414, nominated position defining means 415, and output delivering means 416. These means 411 to 416 are actually software executed by the control means 410.

The memory means 420 stores a drawing table 421 shown in FIG. 60, a symbol/character conversion table 422 shown in FIG. 61, and a symbol/coordinate conversion table 423 shown in FIG. 62. The means 411 to 416 consisting of software are also stored in this memory means 420.

The functions of the means 411 to 416 of control means 410 will be described together with the tables 421 to 423 of memory means 420.

The image data writing means 411 has a function to write the image data of an assemblage layout acquired with scanner 431, into memory means 420 as a drawing table 421, and will attach, if a title and file name are fed via keyboard 432, the title and name to each assemblage layout, and store the layout classified by title and file name.

In this embodiment, FIG. 60 illustrates how the assemblage layouts of modules of a construction machine are acquired as image data. The title of layouts includes "Truckshoe (flat type)," "Truck-shoe (triple geared)(#31152-," "Truck frame (#3001-32999),"..., and they exist as bit map files.

The character data writing means 412 has a function to collect, for each part with a symbol depicted in the assemblage layout, the character data of that part, and write the character data into the symbol/character data conversion table 422 in a text file format.

The symbol/character conversion table 422 shown in FIG. 61 shows how character data of the parts depicted in the assemblage layout of truck roller (#52374-) of drawing table 421 are stored in memory. This assemblage layout is also shown in FIG. 64 as drawing 441.

Figure 64:
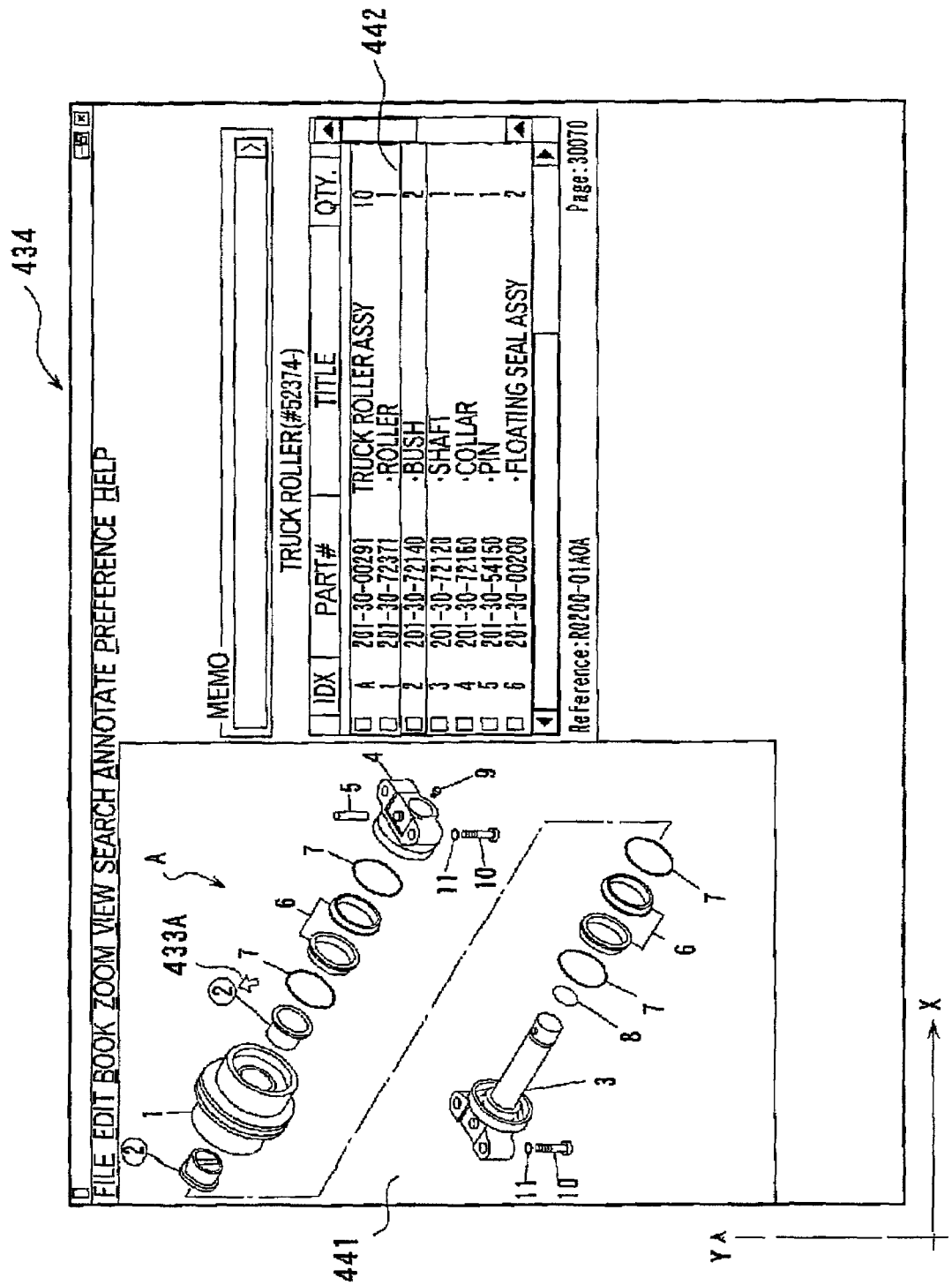
FIG. 64 illustrates how the display works in the fourth embodiment.

In FIGS. 61 and 64, the character data include the index No. (IDX), ID No., name, used numbers of each part correspondent with the symbol attached to the part, and mainly fed via keyboard 432. For example, for a part represented by symbol "2" depicted in layout 441, stored are "2" as IDX, "201-30-72140" as ID No., "Bush" as name, and "2" as used number.

The OCR reading means 413 has a function to identify characters appearing as symbols in the graphics data of an assemblage layout read by a scanner 431, and convert them into text data.

For the graphics data of all layouts whose titles are listed in layout table 421, symbols contained in the data are read by the OCR reading means 413, and the symbols are then converted into text data which are stored in the symbol storing areas of tables 422, 23 classified by layouts, as represented by the layout of truck roller (#52374-) shown in FIGS. 61 and 62. In the symbol/character conversion table 422 of FIG. 61, the number attached to the symbol thus stored is made equal to the IDX number of the character data.

The character position defining means 414 has a function to determine at what position the symbol read by the OCR reading means is printed in the layout.

Figure 65:
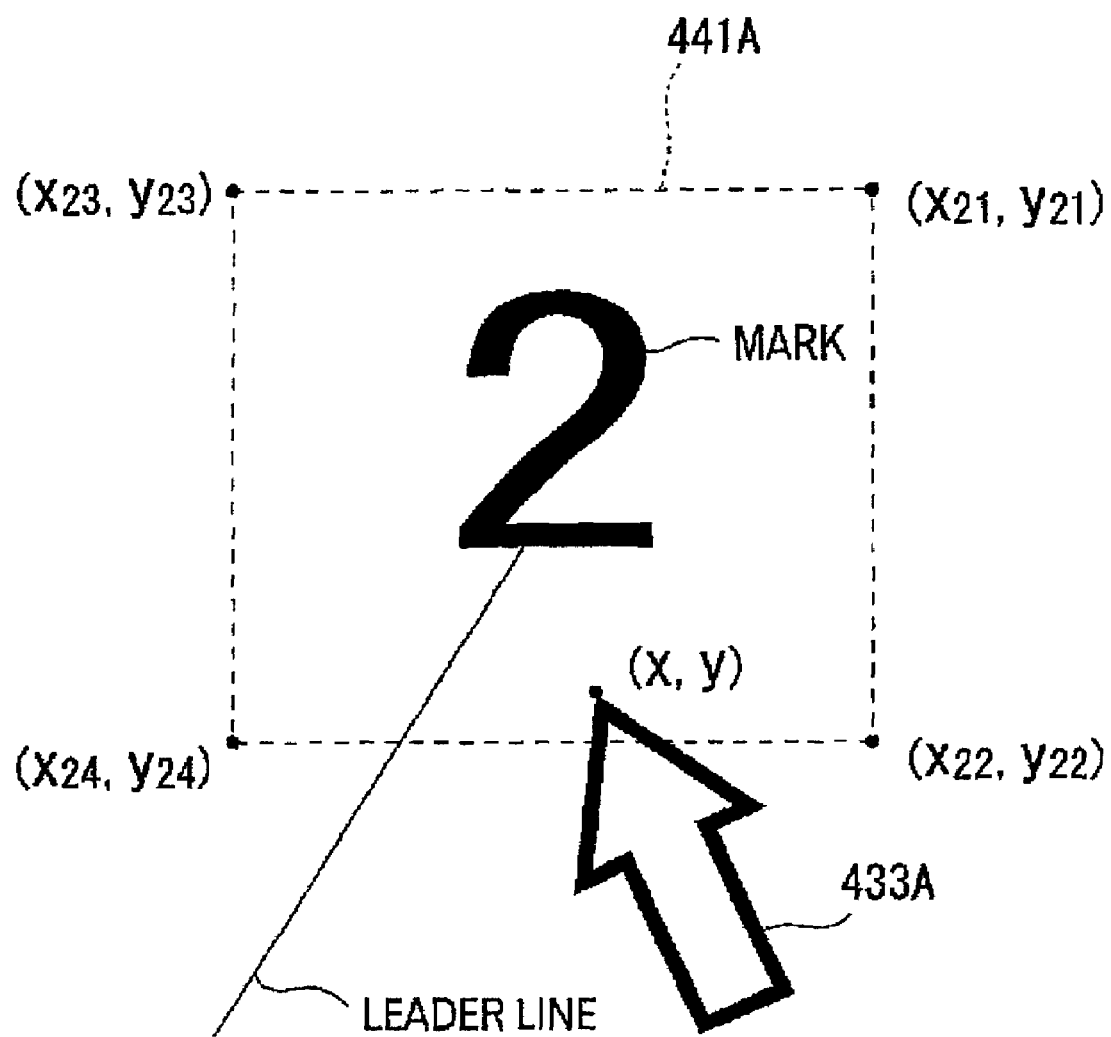
FIG. 65 shows the enlarged display of the fourth embodiment for illustration.

When layout 441 is positioned properly with respect to the screen, the character position defining means 414 determines, for one symbol "2" (lower symbol) read by the OCR reading means 413, it is located at the center of a two-dimensional area 441A defined by four coordinate points (X21, Y21), (X22, Y22), (X23, Y23) and (X24, Y24) on the screen as shown in FIG. 65, and stores these coordinate data in connection with symbol "2" in the symbol/coordinate data conversion table 423. Similar operation is performed for other symbols "A," "1," "3," .... If the same symbol is printed at two or more different sites in a layout as with symbol "2," the coordinate data of each site is registered into the symbol/coordinate conversion table 423 in connection with the symbol.

The aforementioned means 411 to 414 mainly work for the storage of information, while the remaining nominated position defining means 415 and output delivering means 416 have a function to nominate data stored in memory to put them on display. Specifically, this is achieved as follows:

The nominated position defining means 415 has a function to determine by calculation, for a symbol selected by a mouse pointer 433A (FIGS. 64 and 65) of a mouse 433 on layout 441 or on the image data presented on display 434, the coordinates of the symbol with respect to the display 434.

For example, in FIGS. 64 and 65, if the user selects symbol "2" by pointing it with mouse pointer 433A, and clicks mouse 433, the position defining means 415 determines by calculation the coordinates (X, Y) of the tip of the mouse pointer 433A.

The output delivering means 416 fetches, based on the title of layout nominated via a display (not illustrated here), image data corresponding with the title from the layout table 421, and causes the display 434 to present the data, and further fetches character data corresponding with the image data from the symbol/character conversion table 422, and causes the display to present the character data beside the image data.

For example, if the user selects truck roller (#52374-) as the title of layout, the output delivering means 416 fetches the graphics data of this layout from the layout table 421, causes the monitor 434 to present the graphics data as a display 441, and then fetches all the character data corresponding with the graphics data from the symbol/character conversion table 422, and causes the monitor 434 to display the character data as a parts list 442 beside the graphics data.

Another function of the output delivering means 416 is to determine in which coordinate data contained in the symbol/coordinate data conversion table 423 the coordinate data of the mouse pointer 433A determined by the nominated position defining means 415 lies, then identifies the symbol specified by the coordinate data based on the result, locates the symbol in the symbol/character conversion table 422, and highlights the character data related with the symbol, and the symbol itself.

Specifically, if the user selects symbol "2" in layout 441 by pointing and clicking with mouse, the output delivering means 416 determines that the coordinates (X, Y) of the mouse pointer 433A are in an area surrounded by the coordinate points (X21, Y21), (X22, Y22), (X23, Y23) and (X24, Y24), and thus identifies "2" in the symbol/coordinate data conversion table as corresponding with the coordinate data. Later, the same means identifies character data named "2 201-30-72140, bush 2 ... " as corresponding with symbol "2" in the symbol/character conversion table 422, emphasizes the color or brightness of these character data to make them distinguishable from other data in the parts list 422, and converts "2" on display 441 to "(2)."

[Operation of Fourth Embodiment]

Figure 63:
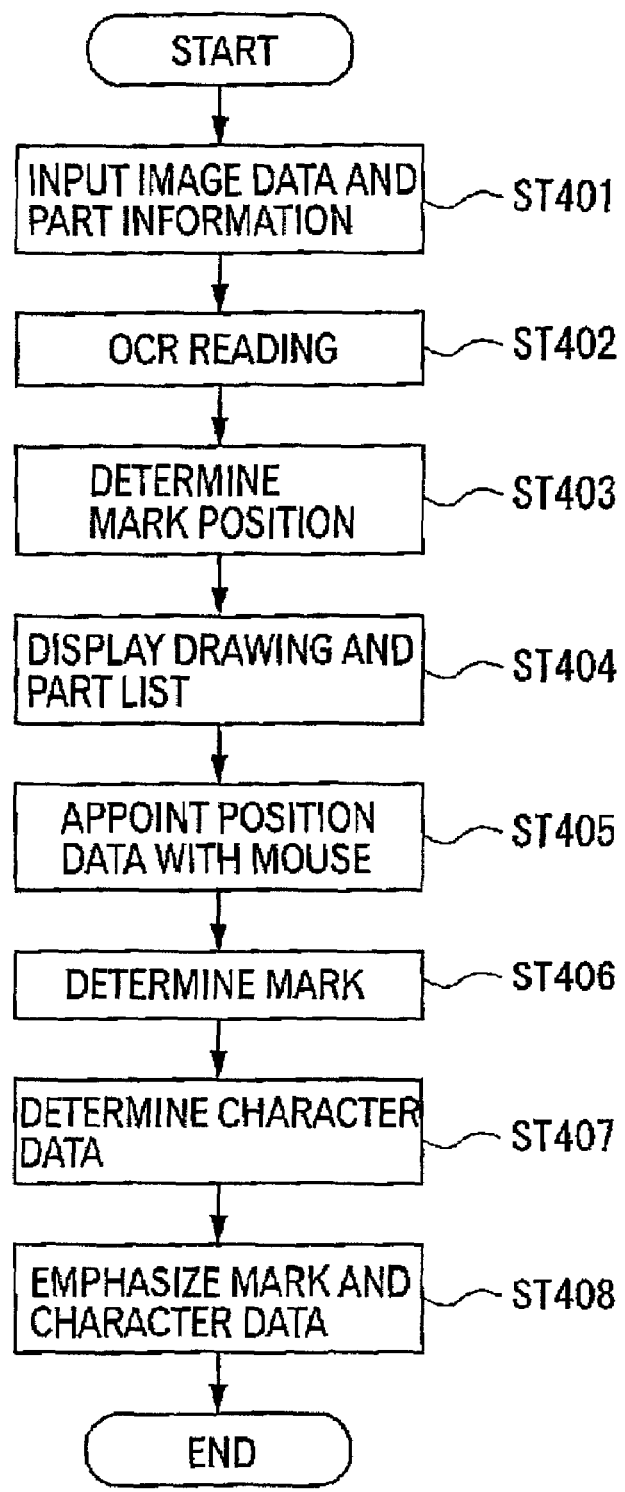
FIG. 63 is a flowchart of the fourth embodiment.

FIG. 63 is a flowchart to show the flow of procedures taken for the storage of data to the display of data in this embodiment. The operation of this embodiment will be described in a sequential order with reference to FIG. 63.

At ST (step) 1, the user prepares assemblage layouts and lists the user wants to manage as digital data. For a layout printed on paper, the user must acquire the layout printed on paper with a scanner 431, convert it into image data in a bit map format, and stores it in a layout table 421. In addition, the user must enter the name of layout via keyboard 432. For a list, the user must enter a heading representative of the content of the list via keyboard 432 as text data, and stores it in a symbol/character conversion table 422.

At ST 402, the user causes the OCR reading means 413 to read the image data in the layout table 421, thereby converting symbols in the image data into text data, and stores the text (character) data in the symbol/character conversion table 422 and in a symbol/coordinate data conversion table 423.

At ST 403, the character position determining means 414 determines the position of a symbol when a layout reproduced from the image data is placed properly with respect to the display 434, defines the position with four coordinate data given by the four points defining a boundary area 441A, and stores the coordinate data in the symbol/coordinate data conversion table 423.

The above procedures are for storing data.

At ST 404, if the user wants to see a certain layout, she may feed the name of layout she wants to have on display via a display 434 to present an appropriate input port (not illustrated here). She may feed, for example, "Truck roller (#52374-)," to have a display 441. Meantime, the output delivering means 416 fetches all the character data corresponding with symbols "A," "1," "2," "3," . . . in display 441 from the symbol/character data conversion table 422, and causes the monitor to present the character data as a parts list 442 on display together with layout 441.

At ST 405, if the user finds there is one among the parts of layout 441 that she particularly wants to know in detail, she may select it by pointing the symbol attached to the part, for example, "2" with the mouse pointer 433A of mouse 433 on layout 441.

At ST 406, when symbol "2" is selected with mouse pointer 433A, the nominated position determining means 415 determines by calculation the coordinate data (X, Y) of the nominated data, and identifies symbol "2" in the symbol/coordinate data conversion table 423, based on the coordinate data (X, Y).

At STs 407 and 408, the output delivering means 416 identifies, based on symbol "2" thus identified, the corresponding character data "2 201-30-72140 bush 2 . . . " in the symbol/character data conversion table 422, highlights the character data in question in a parts list 442, and emphasizes symbol "2" by converting it into "(2)" on display 441.

[Advantages of Fourth Embodiment]

According to this embodiment, following advantages will be ensured.

(1) According to this information storing system 401, even if assemblage layouts and parts listed related with each other exist as printed documents, the assemblage layout is converted with a scanner 431 into digital data, and the data of the part cited in the list are manually fed via a keyboard 432 to converted into character data existing as digital data, it will be possible to save the cost required for consumption of paper, printing of paper and storage of paper. This will bring about a great reduction in cost required for document management.

(2) Because symbols in image data are read with an OCR reading means 413, and the symbol thus read is related with corresponding character data via a symbol/character data conversion table 422, it is possible to easily acquire a layout 441, a symbol in the layout 441, and a parts list 442 carrying the character data related with the symbol, and to present them side by side on the same display 434.

(3) If, for example, the user selects a symbol "2" in layout 441 or an image reproduced from image data, with a mouse-pointer 433A, the user will be able to locate symbol "2" in the symbol/coordinate data conversion table 423 as defined by the coordinate data of (X21, Y21), (X22, Y22), (X23, Y23), and (X24, Y24) containing within the coordinate data (X, Y) determined as the position nominated by the user, and further to locate the character data "2 201-30-72140, bush 2 . . . " corresponding with symbol "2" in the symbol/character data conversion table 422. Therefore, as a result of selecting a symbol present on layout, the user can automatically obtain the character data related with the symbol, and the character data and symbol thus acquired are highlighted distinctly. Therefore, more accurate acquisition of the parts data of a necessary part will be ensured than would be possible with a system where no such devise as above is introduced.

(4) Because the coordinate data stored in the symbol/coordinate data conversion table 423 include, for example, the coordinate data of a two-dimensional, rectangular area 441A as defined by four summits each defined by the coordinates (X21, Y21), (X22, Y22), (X23, Y23) and (X24, Y24), and the rectangle is so selected as to position symbol "2" at its center, it will be possible for the user, when she nominates a symbol with the tip of mouse-pointer 433A, to define a considerably large area without sacrificing the precision of nomination. Accordingly, when the user wants to nominate a symbol, it will be possible for her to laxly nominate a position close to the symbol with mouse-pointer 433A, without damaging her intended purpose.

[Variant of Fourth Embodiment]

This invention is not limited to the above-described embodiments, but may include other constitutions as long as they meet the object of the present invention, and naturally includes following variants.

According to the above embodiment, if the user selects a symbol in layout 441 with mouse-pointer 433A, the character data (parts data) of the part identified by the symbol are located in the parts list 442. This is achieved by the nominated position determining means 415 of control means 410 shown in FIG. 59. However, a character data locating means may be introduced in stead of the nominated position determining means 415, so that the means in question may locate, whenever any desired character data in the parts list 442 is selected with mouse-pointer 433A, a symbol corresponding with the character data in the symbol/character data conversion table 422, and further locate coordinate data corresponding with the symbol in the symbol/coordinate data conversion table 423.

In such a system, if the user selects any desired character data in the parts list 442, she will be able to obtain the coordinate data with respect to the screen of a symbol corresponding with the character data. Then, the symbol giving the coordinate data in question will be highlighted on display, to emphasize its visibility, and thus it will be easy to locate the symbol in the layout on display. This constitution is included in claim 4 of this invention.

Both the character data locating means and the nominated position determining means 415 of the above embodiment may be implemented in the control means 410.

The coordinate data to be stored in the symbol/coordinate data conversion table 423 may include, in addition to those defining the four summits of a rectangular area 441A, those defining three, five or more points of a boundary area.

The character data of the above embodiment include the parts data of a part depicted in a layout 441, but the character data according to this invention is not limited to such data, but may include any special items cited in a layout such as numbers indicating the type of standard (specification), etc.

The image data are not limited to a layout either. What is derived via a scanner 431 from the texts and figures of a book, or from a list existing as a printed document may be stored and managed as image data. In such a case, data possibly related with the list now converted to image data are preferably fed as character data via keyboard 432. Such data include, for example, the author of the list, date of preparation, purpose of preparation, etc.

In summing up, the image data according to this invention include any desired data on a printed document, and the character data also include any data related with the image data.

In the above embodiment, character data are fed via keyboard 432. However, data fed via other means than keyboard are also included in this invention. For example, feeding of character data may be achieved by using a scanner 431 and OCR reading means (or a system obtained by integrally uniting the two apparatuses). In this case, the scanner 431 and OCR reading means 413 forms, in combination, the character feeding means of this invention.

What is claimed is:

1. A parts check list preparing system, comprising:
a means to store a database comprising the graphics data of a layout of a part, and the parts data of the part;
a means to fetch the graphics data of a part necessary for preparing a parts check list that shows parts information in a tabular form;
a means to cause a layout reproduced from the graphics data of the part to be presented on display;
a means to select the part in the layout;
a means to fetch the parts data corresponding with the graphics data of the selected part from the database;
a means to arrange the parts data into a list, and to cause the list to be presented on display together with the layout;
a means to automatically prepare the parts check list based on the parts list;
a means for ordering the part by transmitting the prepared parts check list based on the parts list,
a network server and a network terminal connected with each other via a network, the network server comprising:
(A) a server's memory means to store the title of layouts of parts, the graphics data of the layouts, and the parts data of those parts;
(B) a layout title acquiring means to acquire the title of a layout arbitrarily chosen by the network terminal;
(C) an information searching means to search through the server's memory means for the graphics data corresponding with the acquired title of the layout, and the parts data of the part reproduced from the graphics data of the layout title;
(D) an output delivering means to deliver, as output, the searched graphics data and parts data to the network terminal, and to cause the display device of the network terminal to present the layout reproduced from the graphics data,
and the network terminal comprising:
(a) a terminal's memory means to store the graphics data and parts data provided by the network server;
(b) a layout data acquiring means to acquire the graphics data of a part selected from the layout displayed on the terminal's display device;
(c) a parts list preparing means to search through the terminal's memory means for the parts data corresponding with the graphics data just acquired;
(d) a parts list delivering means to deliver the parts data thus acquired to the display device, and to insert the parts data into the parts list displayed together with the layout; and (e) a parts check list preparing means to prepare a parts check list based on the part data in the parts list,
(f) a duplicate acquisition preventing means to cause, if the network terminal selects the parts data of any one of plural parts, and the parts data of an assembly composed of those plural parts, the network terminal to obtain only the parts data of the assembly.

2. The parts check list preparing system according to claim 1,
wherein the server's memory means stores a price table containing price data of each part, and a storage table containing a storage data of each part; and
wherein the network server comprises a response preparing means which searches through the price table and storage table for the price data and storage data of the parts listed in. the parts check list, and makes the parts check list reflect the search result.

3. The parts check list preparing system according to claim 1,
wherein at least two network servers different in communication distances to the network terminal are introduced; and
wherein the network terminal gains access to a network server shorter in communication distance.

4. The parts check list preparing system according to claim 3,
wherein the network server shorter in communication distance checks whether or not any alteration is introduced in the graphics data and/or parts data stored in the network server longer in communication distance; and
wherein it updates its own graphics data and/or parts data in accordance with the alteration whenever it finds an alteration is introduced.

5. The parts check list preparing system according to claim 1, wherein the part is a constitutive element of a construction machine.

6. A parts check list preparing method, comprising the steps of:
in addition to fetching the graphics data of a part necessary for preparing a parts check list that shows parts information in a tabular form from a database comprising the graphics data of parts and the parts data thereof, causing a display device to present a layout based on said graphics data on display;
after selecting the part in the layout on display, fetching the parts data corresponding with the graphics data of the selected part from the database;
arranging the acquired parts data into a list and causing the display device to present the list together with the layout;
automatically preparing the parts check list based on the parts list; and
ordering the parts by transmitting the prepared parts check list based on the parts list, and, when the parts information and assembly parts information on an assembly composed of the parts are selected, obtaining only the parts data of the assembly.

7. A computer program embodied in a computer-readable recording medium, the computer program causing a computer system to execute the parts check list preparing method according to claim 6.

* * * * *